United States Patent
Lin et al.

(10) Patent No.: US 12,025,772 B2
(45) Date of Patent: Jul. 2, 2024

(54) OPTICAL IMAGING LENS

(71) Applicant: Genius Electronic Optical (Xiamen) Co., Ltd., Fujian (CN)

(72) Inventors: Maozong Lin, Fujian (CN); Baina Chen, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 466 days.

(21) Appl. No.: 17/189,259

(22) Filed: Mar. 2, 2021

(65) Prior Publication Data

US 2022/0196975 A1    Jun. 23, 2022

(30) Foreign Application Priority Data

Dec. 18, 2020  (CN) .......................... 202011503679.8

(51) Int. Cl.
*G02B 13/00*  (2006.01)
*G02B 9/64*  (2006.01)
*G02B 27/00*  (2006.01)

(52) U.S. Cl.
CPC ........... *G02B 13/0025* (2013.01); *G02B 9/64* (2013.01); *G02B 27/0025* (2013.01)

(58) Field of Classification Search
CPC .............................. G02B 9/64; G02B 13/0045
See application file for complete search history.

(56) References Cited

U.S. PATENT DOCUMENTS

2020/0209593 A1    7/2020  Hirano
2020/0209594 A1*   7/2020  Hirano ..................... G02B 9/64

FOREIGN PATENT DOCUMENTS

| CN | 111766688 A | 10/2020 |
|---|---|---|
| CN | 111812809 B | 11/2020 |
| CN | 111812823 B | 11/2020 |
| JP | 2020-109436 | 7/2020 |

* cited by examiner

*Primary Examiner* — Joseph P Martinez
(74) *Attorney, Agent, or Firm* — Winston Hsu

(57) ABSTRACT

An optical imaging lens includes a first lens element to a ninth lens element, and each lens element has an object-side surface and an image-side surface. A periphery region of the image-side surface of the first lens element is concave, the second lens element has negative refracting power, the eighth lens element has negative refracting power, and an optical axis region of the object-side surface of the ninth lens element is concave. Lens elements included by the optical imaging lens are only the nine lens elements described above, and the optical imaging lens satisfies the distance from the object-side surface of the first lens element to an image plane on the optical axis is less than or equal to 15.000 mm.

20 Claims, 45 Drawing Sheets

Field of view 1.0
-0.01 0 0.025
(mm)
Longitudinal spherical aberration

Image Height 5.200(mm)
-0.015 0 0.025
(mm)
Sagittal field curvature

Image Height 5.200(mm)
-0.01 0 0.03
(mm)
Tangential field curvature

Image Height 5.200(mm)
0 -45
(%)
Distortion

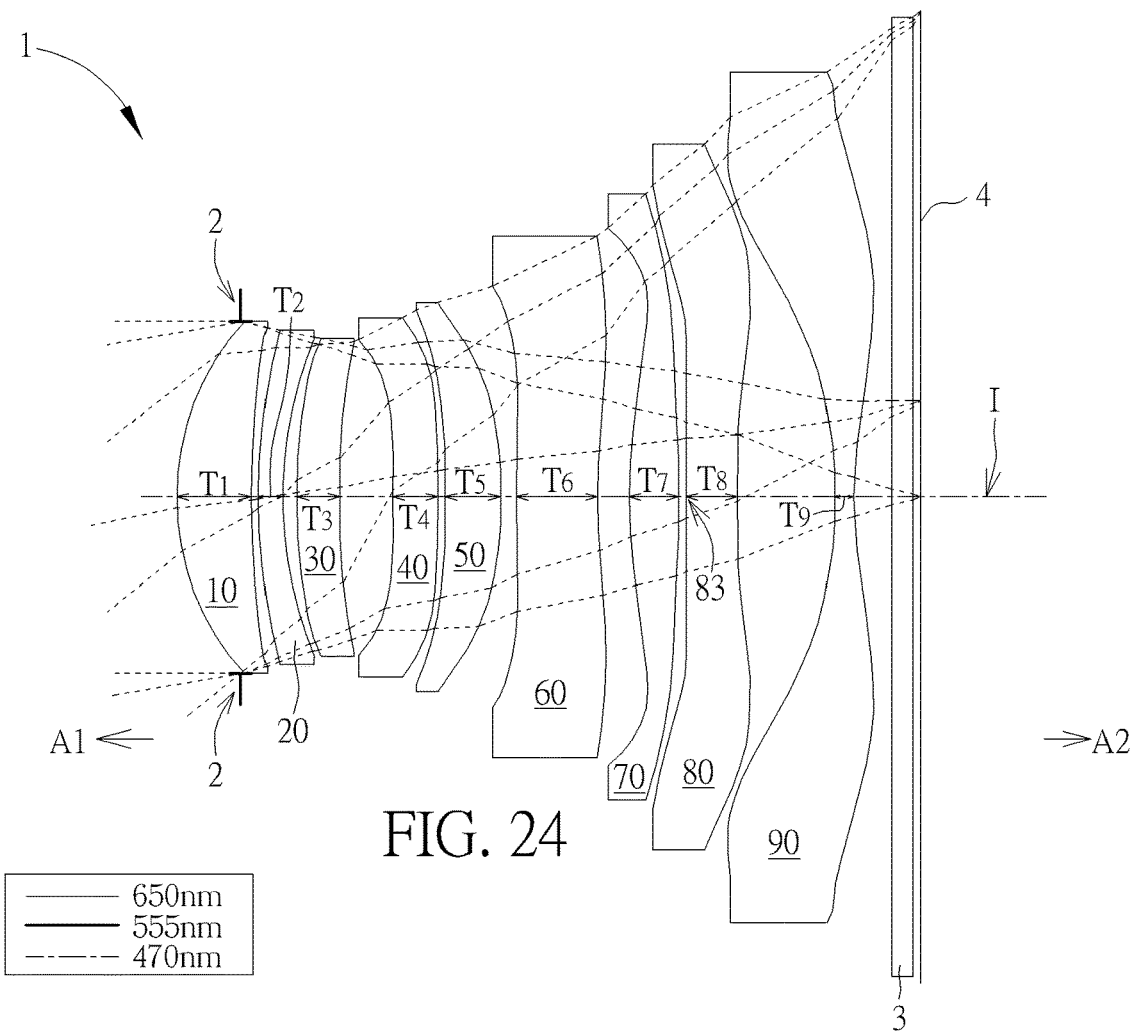
FIG. 24
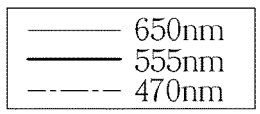
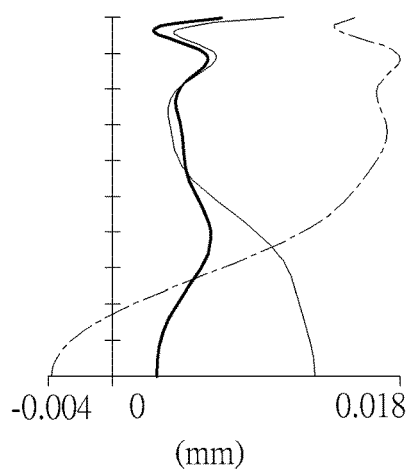
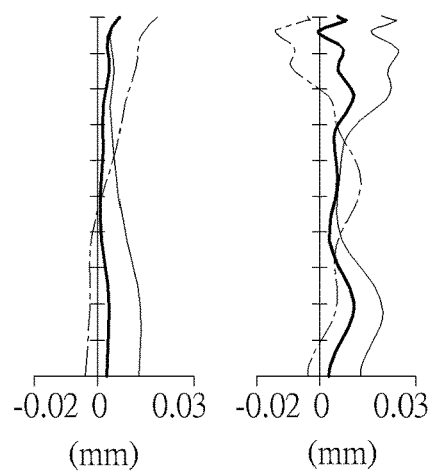
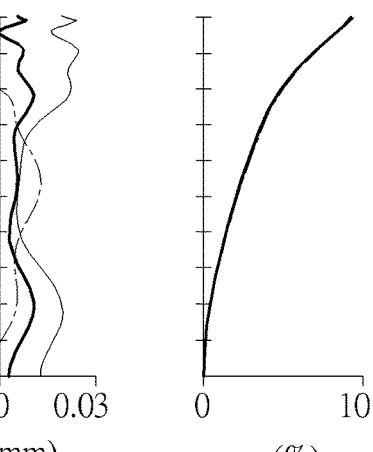
FIG. 25A  FIG. 25B  FIG. 25C  FIG. 25D

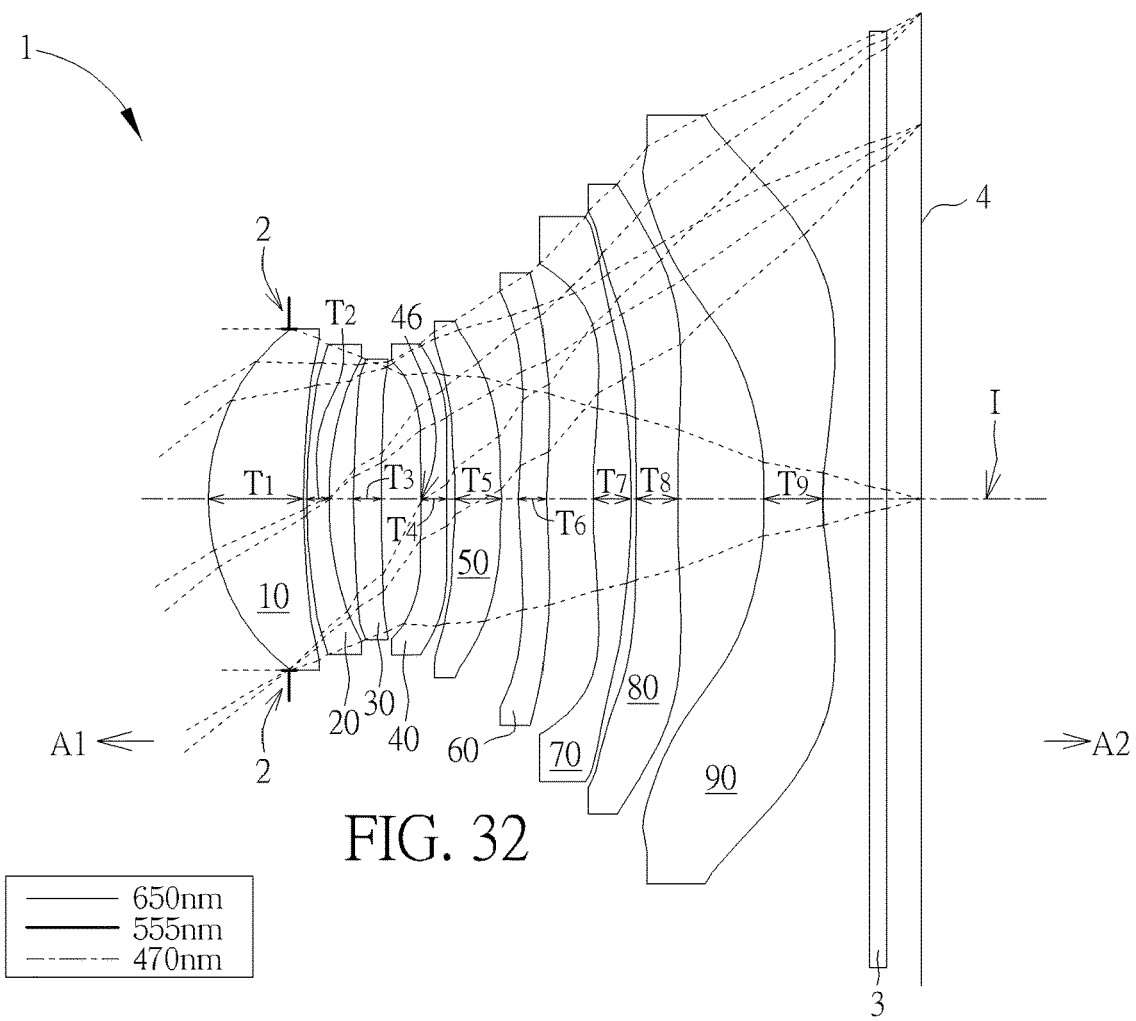
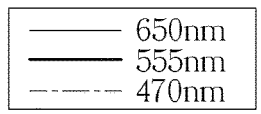
FIG. 32
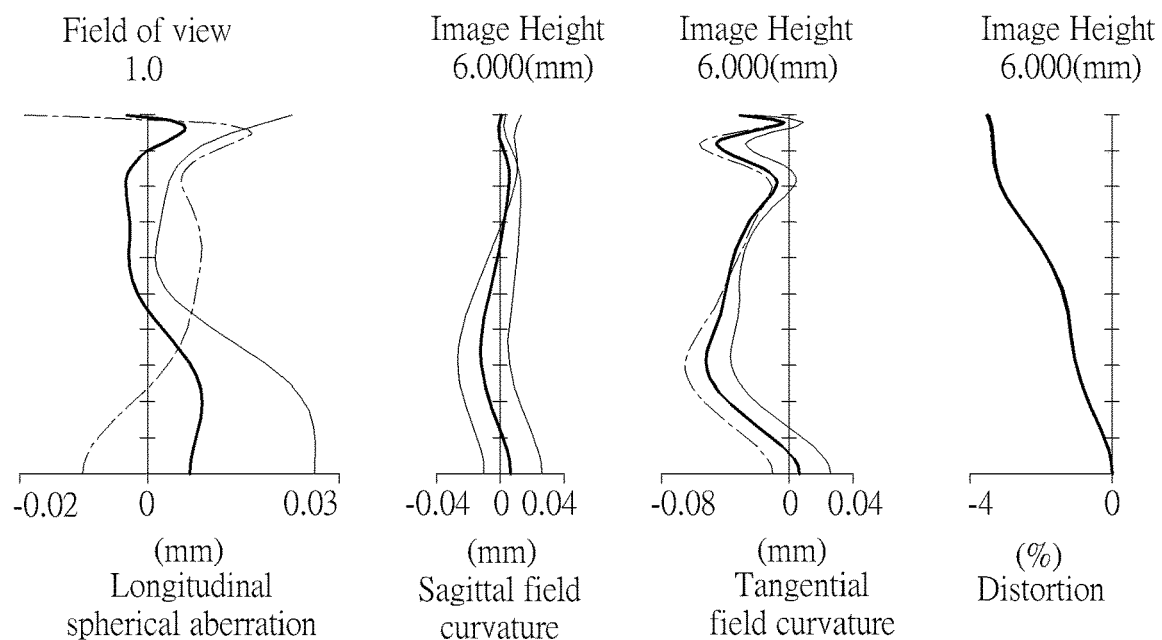
FIG. 33A  FIG. 33B  FIG. 33C  FIG. 33D

| First Embodiment | | | | | | | |
|---|---|---|---|---|---|---|---|
| EFL=6.602 mm; HFOV=38.836 degrees; TTL=7.822mm; Fno=2.000 ; ImgH=6.000mm | | | | | | | |
| No. | | Radius of Curvature (mm) | Ape. Stop Distance Lens Thickness Air Gap (mm) | Material | Refractive Index | Abbe No. | Focal Length (mm) |
| | Object | Infinity | Infinity | | | | |
| 2 | Ape. Stop | Infinity | -0.582 | | | | |
| 11 | First Lens | 2.688 | 1.060 | T1 Plastic | 1.545 | 55.987 | 6.045 |
| 12 | | 12.433 | 0.050 | G12 | | | |
| 21 | Second Lens | 6.175 | 0.271 | T2 Plastic | 1.671 | 19.243 | -13.371 |
| 22 | | 3.607 | 0.212 | G23 | | | |
| 31 | Third Lens | 6.013 | 0.316 | T3 Plastic | 1.545 | 55.987 | 33.957 |
| 32 | | 8.732 | 0.652 | G34 | | | |
| 41 | Fourth Lens | -16.457 | 0.332 | T4 Plastic | 1.671 | 19.243 | -116.808 |
| 42 | | -20.947 | 0.070 | G45 | | | |
| 51 | Fifth Lens | -9.908 | 0.448 | T5 Plastic | 1.545 | 55.987 | 140.872 |
| 52 | | -8.918 | 0.235 | G56 | | | |
| 61 | Sixth Lens | 7.945 | 0.237 | T6 Plastic | 1.661 | 20.373 | -54.679 |
| 62 | | 6.446 | 0.557 | G67 | | | |
| 71 | Seventh Lens | 6.576 | 0.468 | T7 Plastic | 1.545 | 55.987 | 6.475 |
| 72 | | -7.461 | 0.050 | G78 | | | |
| 81 | Eighth Lens | -40.553 | 0.529 | T8 Plastic | 1.545 | 55.987 | -32.027 |
| 82 | | 30.913 | 1.248 | G89 | | | |
| 91 | Ninth Lens | -5.875 | 0.200 | T9 Plastic | 1.545 | 55.987 | -4.828 |
| 92 | | 4.844 | 0.400 | G9F | | | |
| 3 | Filter | Infinity | 0.210 | TF | 1.517 | 64.167 | |
| | | Infinity | 0.276 | GFP | | | |
| 4 | Image Plane | Infinity | | | | | |

FIG. 34

| No. | K | $a_2$ | $a_4$ | $a_6$ | $a_8$ | $a_{10}$ |
|---|---|---|---|---|---|---|
| 11 | 0.000000E+00 | 0.000000E+00 | 1.337211E-03 | -8.588496E-05 | 5.382154E-04 | -3.607843E-04 |
| 12 | 0.000000E+00 | 0.000000E+00 | -1.129282E-02 | 1.308180E-02 | -8.884240E-03 | 5.007602E-03 |
| 21 | 0.000000E+00 | 0.000000E+00 | -2.072214E-02 | 1.159956E-02 | -3.297096E-03 | 4.793303E-04 |
| 22 | 2.307696E+00 | 0.000000E+00 | -1.492312E-02 | -5.884035E-04 | 3.446398E-03 | -1.865875E-03 |
| 31 | 0.000000E+00 | 0.000000E+00 | -2.227322E-03 | -4.496428E-03 | 1.312618E-03 | 6.933635E-04 |
| 32 | 0.000000E+00 | 0.000000E+00 | -3.115916E-03 | -4.171741E-03 | 2.889887E-03 | -1.691646E-03 |
| 41 | 0.000000E+00 | 0.000000E+00 | -1.540557E-02 | -2.978866E-02 | 4.407210E-02 | -5.278545E-02 |
| 42 | 0.000000E+00 | 0.000000E+00 | 3.076158E-02 | -1.019158E-01 | 1.133177E-01 | -8.754174E-02 |
| 51 | 0.000000E+00 | 0.000000E+00 | 6.313653E-02 | -1.311617E-01 | 1.256031E-01 | -7.717373E-02 |
| 52 | 0.000000E+00 | 0.000000E+00 | 2.753136E-02 | -6.155066E-02 | 4.155073E-02 | -1.836850E-02 |
| 61 | 0.000000E+00 | 0.000000E+00 | -1.343861E-02 | -1.276116E-02 | 1.086521E-02 | -6.356180E-03 |
| 62 | 0.000000E+00 | 0.000000E+00 | -4.776304E-02 | 1.412250E-02 | -3.181337E-03 | -4.791006E-04 |
| 71 | 0.000000E+00 | 0.000000E+00 | -2.781537E-02 | 2.127953E-03 | 2.782578E-03 | -2.201622E-03 |
| 72 | -3.871943E+01 | 0.000000E+00 | -1.032693E-02 | 5.099111E-03 | -1.501057E-03 | 3.245635E-04 |
| 81 | 0.000000E+00 | 0.000000E+00 | 2.180717E-02 | -1.976797E-02 | 5.388881E-03 | -7.424287E-04 |
| 82 | 0.000000E+00 | 0.000000E+00 | 3.441039E-02 | -2.638224E-02 | 8.355875E-03 | -1.696934E-03 |
| 91 | 0.000000E+00 | 0.000000E+00 | -1.331173E-02 | 1.568488E-03 | -3.582387E-04 | 8.702312E-05 |
| 92 | -2.297078E+01 | 0.000000E+00 | -1.585650E-02 | 1.880483E-03 | -1.838882E-04 | 1.562912E-05 |

| No. | $a_{12}$ | $a_{14}$ | $a_{16}$ | $a_{18}$ | $a_{20}$ |
|---|---|---|---|---|---|
| 11 | 1.614175E-04 | -3.829073E-05 | 4.067363E-06 | | |
| 12 | -2.205494E-03 | 6.149696E-04 | -7.242638E-05 | | |
| 21 | -2.583897E-04 | 1.967758E-04 | -3.766630E-05 | | |
| 22 | 2.562989E-04 | 1.608584E-04 | -3.858731E-05 | | |
| 31 | -1.927008E-04 | 5.665445E-05 | -1.131253E-05 | | |
| 32 | 1.205745E-03 | -3.116870E-04 | 1.906475E-05 | | |
| 41 | 3.963376E-02 | -1.904291E-02 | 5.804574E-03 | -1.021430E-03 | 7.783701E-05 |
| 42 | 4.588309E-02 | -1.610184E-02 | 3.655217E-03 | -4.882009E-04 | 2.922431E-05 |
| 51 | 3.238736E-02 | -9.225770E-03 | 1.685514E-03 | -1.752496E-04 | 7.785496E-06 |
| 52 | 6.150001E-03 | -1.535468E-03 | 2.503703E-04 | -2.197849E-05 | 7.333732E-07 |
| 61 | 2.723485E-03 | -7.709494E-04 | 1.318629E-04 | -1.222566E-05 | 4.700123E-07 |
| 62 | 7.348858E-04 | -2.690275E-04 | 4.862855E-05 | -4.424891E-06 | 1.618245E-07 |
| 71 | 8.293544E-04 | -2.001606E-04 | 3.072459E-05 | -2.719721E-06 | 1.047108E-07 |
| 72 | -8.197222E-05 | 1.605511E-05 | -1.787034E-06 | 1.011700E-07 | -2.288286E-09 |
| 81 | 5.188501E-05 | -1.310068E-06 | -9.845759E-09 | -1.629288E-09 | 1.292820E-10 |
| 82 | 2.357400E-04 | -2.232672E-05 | 1.369773E-06 | -4.849638E-08 | 7.437270E-10 |
| 91 | -1.048585E-05 | 6.921195E-07 | -2.613074E-08 | 5.344740E-10 | -4.624000E-12 |
| 92 | -1.233365E-06 | 8.028558E-08 | -3.526186E-09 | 8.747500E-11 | -9.120000E-13 |

FIG. 35

| Second Embodiment ||||||||
|---|---|---|---|---|---|---|---|
| EFL=11.923 mm; HFOV=26.578 degrees; TTL=14.999mm; Fno=1.600 ; ImgH=6.000mm ||||||||
| No. | | Radius of Curvature (mm) | Ape. Stop Distance Lens Thickness Air Gap (mm) | Material | | Refractive Index | Abbe No. | Focal Length (mm) |
| | Object | Infinity | Infinity | | | | |
| 2 | Ape. Stop | Infinity | -1.667 | | | | |
| 11 | First Lens | 5.160 | 2.047 | T1 | Plastic | 1.545 | 55.987 | 11.347 |
| 12 | | 26.493 | 0.208 | G12 | | | |
| 21 | Second Lens | 12.302 | 0.525 | T2 | Plastic | 1.671 | 19.243 | -27.516 |
| 22 | | 7.284 | 0.519 | G23 | | | |
| 31 | Third Lens | 23.042 | 0.585 | T3 | Plastic | 1.545 | 55.987 | 97.145 |
| 32 | | 40.359 | 0.897 | G34 | | | |
| 41 | Fourth Lens | -56.562 | 0.508 | T4 | Plastic | 1.671 | 19.243 | -115.842 |
| 42 | | -203.209 | 0.117 | G45 | | | |
| 51 | Fifth Lens | -14.759 | 0.809 | T5 | Plastic | 1.545 | 55.987 | 74.275 |
| 52 | | -11.032 | 0.479 | G56 | | | |
| 61 | Sixth Lens | 22.282 | 0.863 | T6 | Plastic | 1.661 | 20.373 | -115.983 |
| 62 | | 17.032 | 0.951 | G67 | | | |
| 71 | Seventh Lens | 11.532 | 1.169 | T7 | Plastic | 1.545 | 55.987 | 12.486 |
| 72 | | -16.099 | 0.050 | G78 | | | |
| 81 | Eighth Lens | 31.236 | 1.031 | T8 | Plastic | 1.545 | 55.987 | -41.374 |
| 82 | | 12.960 | 1.863 | G89 | | | |
| 91 | Ninth Lens | -18.064 | 1.134 | T9 | Plastic | 1.545 | 55.987 | -9.361 |
| 92 | | 7.291 | 0.700 | G9F | | | |
| 3 | Filter | Infinity | 0.210 | TF | | 1.517 | 64.167 |
| | | Infinity | 0.336 | GFP | | | |
| 4 | Image Plane | Infinity | | | | | |

FIG. 36

| No. | K | $a_2$ | $a_4$ | $a_6$ | $a_8$ | $a_{10}$ | $a_{12}$ | $a_{14}$ | $a_{16}$ | $a_{18}$ | $a_{20}$ |
|---|---|---|---|---|---|---|---|---|---|---|---|
| 11 | 0.000000E+00 | 0.000000E+00 | 1.014273E-04 | 1.279944E-05 | 5.880408E-07 | -8.965499E-08 | 1.197805E-08 | -6.346060E-10 | 2.630300E-11 | | |
| 12 | 0.000000E+00 | 0.000000E+00 | -1.901615E-03 | 7.083537E-04 | -1.351867E-04 | 1.629368E-05 | -1.137860E-06 | 4.304485E-08 | -6.808970E-10 | | |
| 21 | 0.000000E+00 | 0.000000E+00 | -3.647476E-03 | 8.257336E-04 | -1.434070E-04 | 1.696211E-05 | -1.012041E-06 | 2.220618E-08 | 9.804600E-11 | | |
| 22 | 2.139742E+00 | 0.000000E+00 | -1.744886E-03 | -1.462735E-04 | 6.002166E-05 | -1.456653E-05 | 2.371892E-06 | -1.791770E-07 | 4.869871E-09 | | |
| 31 | 0.000000E+00 | 0.000000E+00 | 1.800981E-03 | -1.210321E-03 | 2.774023E-04 | -4.329296E-05 | 5.142629E-06 | -3.469063E-07 | 9.738362E-09 | | |
| 32 | 0.000000E+00 | 0.000000E+00 | 1.124961E-03 | -1.155522E-03 | 3.138031E-04 | -5.360165E-05 | 6.507984E-06 | -4.643178E-07 | 1.443897E-08 | | |
| 41 | 0.000000E+00 | 0.000000E+00 | -2.580952E-03 | -1.917112E-03 | 6.985017E-04 | -1.780492E-04 | 2.930294E-05 | -3.275140E-06 | 2.470923E-07 | -1.140786E-08 | 2.411330E-10 |
| 42 | 0.000000E+00 | 0.000000E+00 | 5.022380E-03 | -4.950590E-03 | 1.361584E-03 | -2.364745E-04 | 2.594959E-05 | -1.760671E-06 | 7.185695E-08 | -1.773027E-09 | 2.692200E-11 |
| 51 | 0.000000E+00 | 0.000000E+00 | 1.090170E-02 | -5.677368E-03 | 1.216998E-03 | -1.360672E-04 | 4.696672E-06 | 7.769403E-07 | -1.140878E-07 | 6.090413E-09 | -1.208080E-10 |
| 52 | 0.000000E+00 | 0.000000E+00 | 2.988702E-03 | -2.442788E-03 | 4.660953E-04 | -5.440432E-05 | 4.537583E-06 | -2.831937E-07 | 1.285012E-08 | -3.772790E-10 | 5.371000E-12 |
| 61 | 0.000000E+00 | 0.000000E+00 | -1.982448E-03 | -6.921037E-04 | 1.237656E-04 | -8.975289E-06 | 2.237633E-07 | 1.108088E-08 | -1.066853E-09 | 3.326400E-11 | -3.800000E-13 |
| 62 | 0.000000E+00 | 0.000000E+00 | -5.464462E-03 | 3.267433E-04 | -3.463294E-05 | 5.803119E-06 | -5.670769E-07 | 2.981749E-08 | -8.619120E-10 | 1.297100E-11 | -7.900000E-14 |
| 71 | 0.000000E+00 | 0.000000E+00 | -3.202309E-03 | -1.659110E-05 | 2.236860E-05 | -2.420694E-06 | 1.525221E-07 | -7.645016E-09 | 2.778410E-10 | -5.964000E-12 | 5.600000E-14 |
| 72 | -5.861142E+01 | 0.000000E+00 | -1.862777E-03 | 1.924409E-04 | -5.131226E-06 | -1.032955E-06 | 1.084784E-07 | -4.628673E-09 | 1.023620E-10 | -1.151000E-12 | 5.000000E-15 |
| 81 | 0.000000E+00 | 0.000000E+00 | 2.000845E-04 | 8.363674E-06 | -7.469443E-06 | -3.672092E-07 | 8.747471E-08 | -4.793305E-09 | 1.247500E-10 | -1.615000E-12 | 8.000000E-15 |
| 82 | 0.000000E+00 | 0.000000E+00 | 1.953169E-03 | -1.838269E-04 | 1.661325E-06 | 4.766385E-07 | -3.062656E-08 | 9.248930E-10 | -1.568300E-11 | 1.440000E-13 | -1.000000E-15 |
| 91 | 0.000000E+00 | 0.000000E+00 | -3.896494E-03 | 4.426249E-04 | -3.267682E-05 | 1.839097E-06 | -6.639865E-08 | 1.455022E-09 | -1.872300E-11 | 1.300000E-13 | 0.000000E+00 |
| 92 | -1.282960E+01 | 0.000000E+00 | -2.351157E-03 | 1.603854E-04 | -9.443549E-06 | 3.946742E-07 | -1.171821E-08 | 2.322440E-10 | -2.836000E-12 | 1.900000E-14 | 0.000000E+00 |

FIG. 37

| Third Embodiment | | | | | | | |
|---|---|---|---|---|---|---|---|
| EFL=6.376 mm; HFOV=37.947degrees; TTL=8.231mm; Fno=1.600；ImgH=6.000mm | | | | | | | |
| No. | | Radius of Curvature (mm) | Ape. Stop Distance Lens Thickness Air Gap (mm) | Material | Refractive Index | Abbe No. | Focal Length (mm) |
| | Object | Infinity | Infinity | | | | |
| 2 | Ape. Stop | Infinity | -0.798 | | | | |
| 11 | First Lens | 2.984 | 1.112 | T1 | Plastic | 1.545 | 55.987 | 6.230 |
| 12 | | 21.041 | 0.069 | G12 | | | |
| 21 | Second Lens | 7.731 | 0.295 | T2 | Plastic | 1.671 | 19.243 | -13.943 |
| 22 | | 4.186 | 0.248 | G23 | | | |
| 31 | Third Lens | 9.876 | 0.303 | T3 | Plastic | 1.545 | 55.987 | 36.599 |
| 32 | | 19.305 | 0.614 | G34 | | | |
| 41 | Fourth Lens | -10.750 | 0.306 | T4 | Plastic | 1.567 | 37.533 | -791.648 |
| 42 | | -11.126 | 0.079 | G45 | | | |
| 51 | Fifth Lens | -11.248 | 0.479 | T5 | Plastic | 1.545 | 55.987 | 68.116 |
| 52 | | -8.767 | 0.409 | G56 | | | |
| 61 | Sixth Lens | 10.414 | 0.652 | T6 | Plastic | 1.661 | 20.373 | -27.950 |
| 62 | | 6.515 | 0.458 | G67 | | | |
| 71 | Seventh Lens | 6.260 | 0.627 | T7 | Plastic | 1.545 | 55.987 | 6.467 |
| 72 | | -7.823 | 0.051 | G78 | | | |
| 81 | Eighth Lens | -176.968 | 0.501 | T8 | Plastic | 1.545 | 55.987 | 4995.905 |
| 82 | | -166.358 | 1.062 | G89 | | | |
| 91 | Ninth Lens | -5.820 | 0.200 | T9 | Plastic | 1.545 | 55.987 | -4.538 |
| 92 | | 4.370 | 0.400 | G9F | | | |
| 3 | Filter | Infinity | 0.210 | TF | | 1.517 | 64.167 | |
| | | Infinity | 0.154 | GFP | | | |
| 4 | Image Plane | Infinity | | | | | |

FIG. 38

| No. | K | $a_2$ | $a_4$ | $a_6$ | $a_8$ | $a_{10}$ |
|---|---|---|---|---|---|---|
| 11 | 0.000000E+00 | 0.000000E+00 | 1.225198E-03 | 2.053727E-04 | 3.930584E-05 | 1.077950E-06 |
| 12 | 0.000000E+00 | 0.000000E+00 | -4.584593E-03 | 1.934609E-03 | 1.177327E-03 | -1.111097E-03 |
| 21 | 0.000000E+00 | 0.000000E+00 | -1.373792E-02 | -4.736278E-04 | 5.035102E-03 | -3.000292E-03 |
| 22 | 2.285437E+00 | 0.000000E+00 | -9.085334E-03 | -4.976673E-03 | 5.148273E-03 | -2.252232E-03 |
| 31 | 0.000000E+00 | 0.000000E+00 | 2.645883E-03 | -6.785750E-03 | 3.425967E-03 | -1.650200E-03 |
| 32 | 0.000000E+00 | 0.000000E+00 | -2.366010E-03 | -2.519524E-03 | 7.075372E-04 | 5.976136E-05 |
| 41 | 0.000000E+00 | 0.000000E+00 | -2.094657E-02 | -1.770477E-02 | 2.322452E-02 | -2.318782E-02 |
| 42 | 0.000000E+00 | 0.000000E+00 | 2.444072E-02 | -7.668567E-02 | 6.825416E-02 | -4.306363E-02 |
| 51 | 0.000000E+00 | 0.000000E+00 | 5.057052E-02 | -7.968931E-02 | 5.809762E-02 | -2.822966E-02 |
| 52 | 0.000000E+00 | 0.000000E+00 | 2.319198E-03 | -1.727782E-02 | 8.260185E-03 | -2.604882E-03 |
| 61 | 0.000000E+00 | 0.000000E+00 | -2.300424E-02 | 6.600966E-03 | -5.776342E-03 | 3.433388E-03 |
| 62 | 0.000000E+00 | 0.000000E+00 | -3.580582E-02 | 1.457997E-02 | -7.763832E-03 | 3.025444E-03 |
| 71 | 0.000000E+00 | 0.000000E+00 | -1.755215E-02 | 4.556774E-03 | -3.747616E-05 | -7.329465E-04 |
| 72 | -6.931654E+01 | 0.000000E+00 | -1.019834E-02 | 4.927741E-03 | -7.967264E-04 | -1.100247E-04 |
| 81 | 0.000000E+00 | 0.000000E+00 | 5.015356E-03 | -3.358942E-03 | -4.130495E-04 | 3.690239E-04 |
| 82 | 0.000000E+00 | 0.000000E+00 | 1.206206E-02 | -3.489029E-03 | -5.497844E-04 | 3.414747E-04 |
| 91 | 0.000000E+00 | 0.000000E+00 | -1.739492E-02 | 5.310474E-03 | -1.586691E-03 | 2.971454E-04 |
| 92 | -1.881889E+01 | 0.000000E+00 | -4.711539E-03 | -6.397447E-04 | 2.078606E-04 | -2.445885E-05 |

| No. | $a_{12}$ | $a_{14}$ | $a_{16}$ | $a_{18}$ | $a_{20}$ |
|---|---|---|---|---|---|
| 11 | -1.440599E-06 | 9.794527E-07 | -8.538501E-08 | | |
| 12 | 4.264043E-04 | -8.434154E-05 | 6.909559E-06 | | |
| 21 | 9.923012E-04 | -1.890908E-04 | 1.580841E-05 | | |
| 22 | 6.784384E-04 | -1.074718E-04 | 5.373975E-06 | | |
| 31 | 8.802353E-04 | -2.008240E-04 | 1.592968E-05 | | |
| 32 | 8.049387E-05 | -2.720404E-05 | 1.880071E-06 | | |
| 41 | 1.537962E-02 | -6.944026E-03 | 2.031630E-03 | -3.454603E-04 | 2.567819E-05 |
| 42 | 1.925631E-02 | -6.043467E-03 | 1.294649E-03 | -1.717260E-04 | 1.059849E-05 |
| 51 | 8.965707E-03 | -1.685022E-03 | 1.589191E-04 | -3.928562E-06 | -2.312647E-07 |
| 52 | 6.702565E-04 | -1.763651E-04 | 4.567139E-05 | -7.461943E-06 | 4.971556E-07 |
| 61 | -1.267251E-03 | 2.978855E-04 | -4.353741E-05 | 3.585681E-06 | -1.261126E-07 |
| 62 | -7.839651E-04 | 1.324758E-04 | -1.407248E-05 | 8.514946E-07 | -2.221079E-08 |
| 71 | 3.048309E-04 | -6.355964E-05 | 7.562225E-06 | -4.913399E-07 | 1.355336E-08 |
| 72 | 5.485976E-05 | -7.905753E-06 | 5.668322E-07 | -2.058500E-08 | 3.008900E-10 |
| 81 | -8.018653E-05 | 9.409913E-06 | -6.483130E-07 | 2.462107E-08 | -3.976450E-10 |
| 82 | -6.215061E-05 | 5.972319E-06 | -3.255912E-07 | 9.514871E-09 | -1.158410E-10 |
| 91 | -3.166616E-05 | 1.999042E-06 | -7.471498E-08 | 1.534797E-09 | -1.339800E-11 |
| 92 | 1.606378E-06 | -6.236878E-08 | 1.356691E-09 | -1.358300E-11 | 2.700000E-14 |

FIG. 39

| Fourth Embodiment |||||||
|---|---|---|---|---|---|---|
| EFL=6.328 mm; HFOV=39.707 degrees; TTL=8.090mm; Fno=1.600 ; ImgH=6.000mm |||||||
| No. | Radius of Curvature (mm) | Ape. Stop Distance Lens Thickness Air Gap (mm) | Material | Refractive Index | Abbe No. | Focal Length (mm) |
| Object | Infinity | Infinity | | | | |
| 2  Ape. Stop | Infinity | -0.788 | | | | |
| 11 First Lens | 2.985 | 1.052 | T1 Plastic | 1.545 | 55.987 | 6.573 |
| 12 | 15.510 | 0.064 | G12 | | | |
| 21 Second Lens | 7.160 | 0.264 | T2 Plastic | 1.671 | 19.243 | -16.625 |
| 22 | 4.313 | 0.307 | G23 | | | |
| 31 Third Lens | 12.116 | 0.271 | T3 Plastic | 1.545 | 55.987 | 50.359 |
| 32 | 21.480 | 0.559 | G34 | | | |
| 41 Fourth Lens | -30.813 | 0.268 | T4 Plastic | 1.671 | 19.243 | -49.658 |
| 42 | -367.374 | 0.095 | G45 | | | |
| 51 Fifth Lens | -11.468 | 0.533 | T5 Plastic | 1.545 | 55.987 | 45.291 |
| 52 | -7.965 | 0.390 | G56 | | | |
| 61 Sixth Lens | 6.663 | 0.292 | T6 Plastic | 1.661 | 20.373 | -103.308 |
| 62 | 5.969 | 0.574 | G67 | | | |
| 71 Seventh Lens | 6.808 | 0.531 | T7 Plastic | 1.545 | 55.987 | 6.950 |
| 72 | -8.346 | 0.050 | G78 | | | |
| 81 Eighth Lens | 879.199 | 0.423 | T8 Plastic | 1.545 | 55.987 | -220.080 |
| 82 | 105.744 | 1.409 | G89 | | | |
| 91 Ninth Lens | -5.800 | 0.200 | T9 Plastic | 1.545 | 55.987 | -4.819 |
| 92 | 4.878 | 0.400 | G9F | | | |
| 3  Filter | Infinity | 0.210 | TF | 1.517 | 64.167 | |
| | Infinity | 0.198 | GFP | | | |
| 4  Image Plane | Infinity | | | | | |

FIG. 40

| No. | K | $a_2$ | $a_4$ | $a_6$ | $a_8$ | $a_{10}$ |
|---|---|---|---|---|---|---|
| 11 | 0.000000E+00 | 0.000000E+00 | 1.103751E-03 | 4.795043E-04 | -2.174617E-04 | 1.561766E-04 |
| 12 | 0.000000E+00 | 0.000000E+00 | -1.233695E-02 | 1.474551E-02 | -8.750519E-03 | 3.267079E-03 |
| 21 | 0.000000E+00 | 0.000000E+00 | -2.465575E-02 | 1.930192E-02 | -1.052826E-02 | 3.785711E-03 |
| 22 | 2.212885E+00 | 0.000000E+00 | -1.585972E-02 | 5.874079E-03 | -1.669734E-03 | -5.335643E-04 |
| 31 | 0.000000E+00 | 0.000000E+00 | -9.550661E-04 | -2.344953E-03 | 1.436327E-03 | -1.377222E-03 |
| 32 | 0.000000E+00 | 0.000000E+00 | -1.974735E-03 | -3.638889E-03 | 3.965102E-03 | -3.242150E-03 |
| 41 | 0.000000E+00 | 0.000000E+00 | -1.985506E-02 | -2.232779E-02 | 2.397897E-02 | -1.896851E-02 |
| 42 | 0.000000E+00 | 0.000000E+00 | 1.872572E-02 | -6.482067E-02 | 5.559170E-02 | -3.224020E-02 |
| 51 | 0.000000E+00 | 0.000000E+00 | 4.702558E-02 | -7.458343E-02 | 5.271908E-02 | -2.390712E-02 |
| 52 | 0.000000E+00 | 0.000000E+00 | 8.931129E-03 | -2.973133E-02 | 1.813894E-02 | -7.874402E-03 |
| 61 | 0.000000E+00 | 0.000000E+00 | -1.694957E-02 | 1.205464E-03 | -2.056877E-03 | 1.574568E-03 |
| 62 | 0.000000E+00 | 0.000000E+00 | -3.542310E-02 | 1.281503E-02 | -7.086936E-03 | 3.015262E-03 |
| 71 | 0.000000E+00 | 0.000000E+00 | -1.539274E-02 | 1.018459E-03 | 1.683162E-03 | -1.204175E-03 |
| 72 | -8.547307E+01 | 0.000000E+00 | -1.950948E-02 | 1.498159E-02 | -5.371410E-03 | 1.049367E-03 |
| 81 | 0.000000E+00 | 0.000000E+00 | -5.774139E-04 | 5.111050E-03 | -4.784397E-03 | 1.562058E-03 |
| 82 | 0.000000E+00 | 0.000000E+00 | 1.399347E-02 | -5.766534E-03 | 4.480068E-05 | 2.622687E-04 |
| 91 | 0.000000E+00 | 0.000000E+00 | -1.494307E-02 | 2.245843E-03 | -4.517547E-04 | 8.739846E-05 |
| 92 | -1.232108E+01 | 0.000000E+00 | -1.023957E-02 | 7.512250E-04 | 4.484046E-06 | -6.234337E-06 |

| No. | $a_{12}$ | $a_{14}$ | $a_{16}$ | $a_{18}$ | $a_{20}$ | |
|---|---|---|---|---|---|---|
| 11 | -5.297209E-05 | 1.015854E-05 | -7.207918E-07 | | | |
| 12 | -6.716590E-04 | 6.302536E-05 | -1.365576E-06 | | | |
| 21 | -6.553115E-04 | 1.869712E-05 | 5.292516E-06 | | | |
| 22 | 7.285468E-04 | -2.134845E-04 | 1.963783E-05 | | | |
| 31 | 8.675689E-04 | -1.739735E-04 | 9.244561E-06 | | | |
| 32 | 1.676279E-03 | -3.981515E-04 | 3.719192E-05 | | | |
| 41 | 9.537071E-03 | -3.178327E-03 | 6.914192E-04 | -9.128720E-05 | 5.776595E-06 | |
| 42 | 1.262783E-02 | -3.316363E-03 | 5.639292E-04 | -5.609776E-05 | 2.495041E-06 | |
| 51 | 7.290354E-03 | -1.475688E-03 | 1.928233E-04 | -1.509070E-05 | 5.556134E-07 | |
| 52 | 2.698055E-03 | -6.905925E-04 | 1.203007E-04 | -1.243998E-05 | 5.730287E-07 | |
| 61 | -5.540669E-04 | 1.095497E-04 | -1.271839E-05 | 8.154339E-07 | -2.231541E-08 | |
| 62 | -8.145080E-04 | 1.374217E-04 | -1.420167E-05 | 8.281278E-07 | -2.088565E-08 | |
| 71 | 3.723233E-04 | -6.636457E-05 | 7.059654E-06 | -4.207251E-07 | 1.089398E-08 | |
| 72 | -1.252153E-04 | 9.760849E-06 | -5.076993E-07 | 1.655041E-08 | -2.576690E-10 | |
| 81 | -2.752917E-04 | 2.914972E-05 | -1.859088E-06 | 6.589840E-08 | -9.980610E-10 | |
| 82 | -5.700823E-05 | 5.884828E-06 | -3.317082E-07 | 9.774680E-09 | -1.173860E-10 | |
| 91 | -9.349438E-06 | 5.664824E-07 | -1.979472E-08 | 3.743590E-10 | -2.979000E-12 | |
| 92 | 6.030840E-07 | -3.001123E-08 | 8.425570E-10 | -1.236600E-11 | 7.100000E-14 | |

FIG. 41

| | Fifth Embodiment | | | | | |
|---|---|---|---|---|---|---|
| EFL=6.562mm; HFOV=38.506 degrees; TTL=8.259mm; Fno=1.600;ImgH=6.000mm | | | | | | |
| No. | | Radius of Curvature (mm) | Ape. Stop Distance Lens Thickness Air Gap (mm) | Material | Refractive Index | Abbe No. | Focal Length (mm) |
| | Object | Infinity | Infinity | | | | |
| 2 | Ape. Stop | Infinity | -0.874 | | | | |
| 11 | First Lens | 2.940 | 1.174 | T1 Plastic | 1.545 | 55.987 | 6.337 |
| 12 | | 16.744 | 0.050 | G12 | | | |
| 21 | Second Lens | 7.309 | 0.312 | T2 Plastic | 1.671 | 19.243 | -14.731 |
| 22 | | 4.146 | 0.275 | G23 | | | |
| 31 | Third Lens | 8.778 | 0.299 | T3 Plastic | 1.545 | 55.987 | 39.763 |
| 32 | | 14.555 | 0.571 | G34 | | | |
| 41 | Fourth Lens | -33.440 | 0.308 | T4 Plastic | 1.671 | 19.243 | -97.410 |
| 42 | | -68.035 | 0.088 | G45 | | | |
| 51 | Fifth Lens | -13.350 | 0.586 | T5 Plastic | 1.567 | 37.533 | 36.659 |
| 52 | | -8.274 | 0.392 | G56 | | | |
| 61 | Sixth Lens | 15.049 | 0.389 | T6 Plastic | 1.661 | 20.373 | -22.251 |
| 62 | | 7.396 | 0.310 | G67 | | | |
| 71 | Seventh Lens | 6.264 | 0.496 | T7 Plastic | 1.545 | 55.987 | 6.590 |
| 72 | | -8.228 | 0.047 | G78 | | | |
| 81 | Eighth Lens | 642.754 | 0.698 | T8 Plastic | 1.545 | 55.987 | -90.985 |
| 82 | | 46.117 | 1.142 | G89 | | | |
| 91 | Ninth Lens | -6.085 | 0.317 | T9 Plastic | 1.545 | 55.987 | -4.839 |
| 92 | | 4.760 | 0.400 | G9F | | | |
| 3 | Filter | Infinity | 0.210 | TF | 1.517 | 64.167 | |
| | | Infinity | 0.197 | GFP | | | |
| 4 | Image Plane | Infinity | | | | | |

FIG. 42

| No. | K | $a_2$ | $a_4$ | $a_6$ | $a_8$ | $a_{10}$ |
|---|---|---|---|---|---|---|
| 11 | 0.000000E+00 | 0.000000E+00 | 9.303886E-04 | 2.969722E-04 | -1.031724E-04 | 8.061542E-05 |
| 12 | 0.000000E+00 | 0.000000E+00 | -9.745006E-03 | 9.741261E-03 | -4.479045E-03 | 1.328627E-03 |
| 21 | 0.000000E+00 | 0.000000E+00 | -1.889893E-02 | 9.519346E-03 | -2.508116E-03 | 8.769774E-05 |
| 22 | 2.204849E+00 | 0.000000E+00 | -1.189634E-02 | 4.017757E-04 | 1.369197E-03 | -8.451137E-04 |
| 31 | 0.000000E+00 | 0.000000E+00 | 7.536228E-04 | -3.381696E-03 | 1.317155E-03 | -3.253062E-04 |
| 32 | 0.000000E+00 | 0.000000E+00 | -2.122920E-03 | -2.498447E-03 | 1.627341E-03 | -8.026997E-04 |
| 41 | 0.000000E+00 | 0.000000E+00 | -2.014218E-02 | -1.810208E-02 | 1.889611E-02 | -1.590042E-02 |
| 42 | 0.000000E+00 | 0.000000E+00 | 1.355173E-02 | -5.160784E-02 | 4.255353E-02 | -2.516259E-02 |
| 51 | 0.000000E+00 | 0.000000E+00 | 3.683996E-02 | -5.632895E-02 | 4.022510E-02 | -1.957682E-02 |
| 52 | 0.000000E+00 | 0.000000E+00 | 2.457750E-03 | -2.214078E-02 | 1.289181E-02 | -5.418854E-03 |
| 61 | 0.000000E+00 | 0.000000E+00 | -1.160189E-02 | -3.142898E-03 | 4.290425E-04 | 3.009608E-04 |
| 62 | 0.000000E+00 | 0.000000E+00 | -3.500933E-02 | 1.113314E-02 | -5.005686E-03 | 1.911356E-03 |
| 71 | 0.000000E+00 | 0.000000E+00 | -2.569165E-02 | 4.081558E-03 | 1.306160E-03 | -1.180690E-03 |
| 72 | -8.600281E+01 | 0.000000E+00 | -1.863795E-02 | 1.509341E-02 | -5.310687E-03 | 8.788003E-04 |
| 81 | 0.000000E+00 | 0.000000E+00 | -2.092637E-03 | 5.478188E-03 | -4.396094E-03 | 1.292274E-03 |
| 82 | 0.000000E+00 | 0.000000E+00 | 1.176170E-02 | -5.366028E-03 | 5.036324E-04 | 5.020112E-05 |
| 91 | 0.000000E+00 | 0.000000E+00 | -1.419053E-02 | 3.267471E-03 | -9.852056E-04 | 1.991623E-04 |
| 92 | -1.661719E+01 | 0.000000E+00 | -9.936919E-03 | 1.121960E-03 | -1.469468E-04 | 1.748086E-05 |

| No. | $a_{12}$ | $a_{14}$ | $a_{16}$ | $a_{18}$ | $a_{20}$ |
|---|---|---|---|---|---|
| 11 | -2.334813E-05 | 3.662755E-06 | -1.574008E-07 | | |
| 12 | -2.083863E-04 | 1.172545E-05 | 3.309828E-07 | | |
| 21 | 2.467531E-04 | -7.946972E-05 | 7.794180E-06 | | |
| 22 | 2.324142E-04 | 5.078936E-06 | -6.853267E-06 | | |
| 31 | -4.643303E-05 | 1.171387E-04 | -2.228943E-05 | | |
| 32 | 2.541786E-04 | 2.284230E-06 | -5.952626E-06 | | |
| 41 | 8.813693E-03 | -3.300845E-03 | 8.024835E-04 | -1.125515E-04 | 6.834146E-06 |
| 42 | 1.030738E-02 | -2.875020E-03 | 5.311530E-04 | -5.900399E-05 | 2.993900E-06 |
| 51 | 6.575075E-03 | -1.455248E-03 | 2.013424E-04 | -1.576905E-05 | 5.375471E-07 |
| 52 | 1.865968E-03 | -4.815119E-04 | 8.321012E-05 | -8.450031E-06 | 3.842136E-07 |
| 61 | -8.630393E-05 | 1.599748E-06 | 2.200442E-06 | -3.337339E-07 | 1.617867E-08 |
| 62 | -4.798902E-04 | 7.634889E-05 | -7.552741E-06 | 4.285319E-07 | -1.067578E-08 |
| 71 | 3.549644E-04 | -5.929013E-05 | 5.809744E-06 | -3.154887E-07 | 7.437175E-09 |
| 72 | -5.892765E-05 | -1.660696E-06 | 5.172096E-07 | -3.050198E-08 | 6.194870E-10 |
| 81 | -2.047158E-04 | 1.966742E-05 | -1.163784E-06 | 3.942055E-08 | -5.882380E-10 |
| 82 | -1.717716E-05 | 1.838981E-06 | -9.930171E-08 | 2.674870E-09 | -2.766900E-11 |
| 91 | -2.229003E-05 | 1.458612E-06 | -5.628723E-08 | 1.193400E-09 | -1.076100E-11 |
| 92 | -1.403500E-06 | 7.115320E-08 | -2.211486E-09 | 3.878000E-11 | -2.950000E-13 |

FIG. 43

| Sixth Embodiment ||||||||
|---|---|---|---|---|---|---|---|
| EFL=6.068mm; HFOV=43.547 degrees; TTL=8.155mm; Fno=1.600 ; ImgH=6.000mm ||||||||
| No. | | Radius of Curvature (mm) | Ape. Stop Distance Lens Thickness Air Gap (mm) | | Material | Refractive Index | Abbe No. | Focal Length (mm) |
| | Object | Infinity | Infinity | | | | | |
| 2 | Ape. Stop | Infinity | -0.683 | | | | | |
| 11 | First Lens | 2.993 | 0.815 | T1 | Plastic | 1.545 | 55.987 | 7.178 |
| 12 | | 11.428 | 0.139 | G12 | | | | |
| 21 | Second Lens | 6.206 | 0.219 | T2 | Plastic | 1.671 | 19.243 | -23.305 |
| 22 | | 4.391 | 0.288 | G23 | | | | |
| 31 | Third Lens | 25.848 | 0.375 | T3 | Plastic | 1.545 | 55.987 | 29.932 |
| 32 | | -44.277 | 0.265 | G34 | | | | |
| 41 | Fourth Lens | -2212.768 | 0.333 | T4 | Plastic | 1.671 | 19.243 | -63.352 |
| 42 | | 43.776 | 0.062 | G45 | | | | |
| 51 | Fifth Lens | -33.322 | 0.543 | T5 | Plastic | 1.545 | 55.987 | 27.354 |
| 52 | | -10.376 | 0.403 | G56 | | | | |
| 61 | Sixth Lens | 53.987 | 0.479 | T6 | Plastic | 1.661 | 20.373 | -19.454 |
| 62 | | 10.426 | 0.263 | G67 | | | | |
| 71 | Seventh Lens | 7.707 | 0.692 | T7 | Plastic | 1.545 | 55.987 | 7.209 |
| 72 | | -7.798 | 0.050 | G78 | | | | |
| 81 | Eighth Lens | 543.202 | 1.190 | T8 | Plastic | 1.545 | 55.987 | -91.394 |
| 82 | | 45.688 | 1.187 | G89 | | | | |
| 91 | Ninth Lens | -6.043 | 0.253 | T9 | Plastic | 1.545 | 55.987 | -4.956 |
| 92 | | 4.976 | 0.300 | G9F | | | | |
| 3 | Filter | Infinity | 0.210 | TF | | 1.517 | 64.167 | |
| | | Infinity | 0.086 | GFP | | | | |
| 4 | Image Plane | Infinity | | | | | | |

FIG. 44

| No. | K | $a_2$ | $a_4$ | $a_6$ | $a_8$ | $a_{10}$ |
|---|---|---|---|---|---|---|
| 11 | 0.000000E+00 | 0.000000E+00 | 6.273965E-04 | 1.191790E-03 | -1.595883E-03 | 1.274819E-03 |
| 12 | 0.000000E+00 | 0.000000E+00 | -4.622959E-03 | 2.330151E-03 | 8.209059E-04 | -1.055972E-03 |
| 21 | 0.000000E+00 | 0.000000E+00 | -1.708994E-02 | 3.706914E-03 | 4.946019E-03 | -5.054713E-03 |
| 22 | 1.970674E+00 | 0.000000E+00 | -1.443600E-02 | 1.915895E-03 | 3.071436E-03 | -2.881261E-03 |
| 31 | 0.000000E+00 | 0.000000E+00 | 7.652783E-04 | -2.179330E-03 | 4.073398E-04 | 7.866475E-04 |
| 32 | 0.000000E+00 | 0.000000E+00 | -3.848876E-03 | -6.534148E-03 | 6.418227E-03 | -3.586323E-03 |
| 41 | 0.000000E+00 | 0.000000E+00 | -1.947295E-02 | -1.377180E-02 | 5.226175E-03 | 5.442245E-03 |
| 42 | 0.000000E+00 | 0.000000E+00 | 1.405799E-02 | -4.327502E-02 | 2.432504E-02 | -3.822502E-03 |
| 51 | 0.000000E+00 | 0.000000E+00 | 3.135868E-02 | -4.244506E-02 | 1.836202E-02 | 2.390835E-03 |
| 52 | 0.000000E+00 | 0.000000E+00 | -4.747398E-03 | -1.114619E-02 | 6.947200E-03 | -3.729828E-03 |
| 61 | 0.000000E+00 | 0.000000E+00 | -1.653399E-02 | 3.365055E-03 | -4.630967E-03 | 3.275946E-03 |
| 62 | 0.000000E+00 | 0.000000E+00 | -3.750112E-02 | 1.851143E-02 | -1.104943E-02 | 4.544480E-03 |
| 71 | 0.000000E+00 | 0.000000E+00 | -3.234243E-02 | 1.805849E-02 | -6.932110E-03 | 1.353022E-03 |
| 72 | -7.129140E+01 | 0.000000E+00 | -2.004276E-02 | 1.717997E-02 | -6.686323E-03 | 1.387215E-03 |
| 81 | 0.000000E+00 | 0.000000E+00 | 3.611737E-04 | 2.843552E-03 | -3.519017E-03 | 1.322511E-03 |
| 82 | 0.000000E+00 | 0.000000E+00 | 1.040932E-02 | -4.525488E-03 | 6.240676E-04 | -3.081918E-05 |
| 91 | 0.000000E+00 | 0.000000E+00 | -1.349756E-02 | 2.638043E-03 | -7.754697E-04 | 1.547674E-04 |
| 92 | -1.351786E+01 | 0.000000E+00 | -7.173911E-03 | 5.778373E-04 | -4.613071E-05 | 4.900101E-06 |
| No. | $a_{12}$ | $a_{14}$ | $a_{16}$ | $a_{18}$ | $a_{20}$ | |
| 11 | -5.359717E-04 | 1.147230E-04 | -9.744349E-06 | | | |
| 12 | 4.389811E-04 | -7.951672E-05 | 5.165182E-06 | | | |
| 21 | 2.285302E-03 | -5.034423E-04 | 4.345951E-05 | | | |
| 22 | 1.103239E-03 | -1.797938E-04 | 7.544020E-06 | | | |
| 31 | -6.808564E-04 | 2.421823E-04 | -2.667369E-05 | | | |
| 32 | 1.327753E-03 | -2.965837E-04 | 3.327962E-05 | | | |
| 41 | -9.258728E-03 | 5.971269E-03 | -2.105670E-03 | 3.970916E-04 | -3.117026E-05 | |
| 42 | -4.021762E-03 | 2.883914E-03 | -8.424219E-04 | 1.200672E-04 | -6.778594E-06 | |
| 51 | -7.398521E-03 | 4.023807E-03 | -1.072062E-03 | 1.442124E-04 | -7.795128E-06 | |
| 52 | 1.872768E-03 | -7.234535E-04 | 1.859568E-04 | -2.744723E-05 | 1.728236E-06 | |
| 61 | -1.262970E-03 | 2.950136E-04 | -4.181981E-05 | 3.263401E-06 | -1.056621E-07 | |
| 62 | -1.179001E-03 | 1.947677E-04 | -2.013126E-05 | 1.198742E-06 | -3.157729E-08 | |
| 71 | -1.016121E-04 | -9.232621E-06 | 2.578088E-06 | -2.066819E-07 | 6.089776E-09 | |
| 72 | -1.686886E-04 | 1.237723E-05 | -5.256238E-07 | 1.081247E-08 | -5.015500E-11 | |
| 81 | -2.714375E-04 | 3.358727E-05 | -2.476387E-06 | 9.968237E-08 | -1.681190E-09 | |
| 82 | -2.299946E-06 | 4.435234E-07 | -2.827408E-08 | 8.533500E-10 | -1.014600E-11 | |
| 91 | -1.645032E-05 | 9.954184E-07 | -3.485218E-08 | 6.609940E-10 | -5.274000E-12 | |
| 92 | -4.787394E-07 | 3.004941E-08 | -1.084008E-09 | 2.059500E-11 | -1.600000E-13 | |

FIG. 45

| \multicolumn{8}{|c|}{Seventh Embodiment} |
|---|---|---|---|---|---|---|---|
| \multicolumn{8}{|c|}{EFL=6.508mm; HFOV=38.644 degrees; TTL=8.344mm; Fno=1.600 ; ImgH=6.000mm} |
| No. | | Radius of Curvature (mm) | Ape. Stop Distance Lens Thickness Air Gap (mm) | | Material | Refractive Index | Abbe No. | Focal Length (mm) |
| | Object | Infinity | Infinity | | | | | |
| 2 | Ape. Stop | Infinity | -0.823 | | | | | |
| 11 | First Lens | 2.995 | 0.898 | T1 | Plastic | 1.545 | 55.987 | 6.858 |
| 12 | | 13.351 | 0.057 | G12 | | | | |
| 21 | Second Lens | 6.540 | 0.244 | T2 | Plastic | 1.671 | 19.243 | -18.459 |
| 22 | | 4.230 | 0.406 | G23 | | | | |
| 31 | Third Lens | 9.044 | 0.308 | T3 | Plastic | 1.545 | 55.987 | 35.203 |
| 32 | | 16.868 | 0.640 | G34 | | | | |
| 41 | Fourth Lens | -24.291 | 0.230 | T4 | Plastic | 1.671 | 19.243 | -40.887 |
| 42 | | -197.996 | 0.131 | G45 | | | | |
| 51 | Fifth Lens | -10.094 | 0.509 | T5 | Plastic | 1.545 | 55.987 | 42.567 |
| 52 | | -7.164 | 0.449 | G56 | | | | |
| 61 | Sixth Lens | 5.380 | 0.276 | T6 | Plastic | 1.661 | 20.373 | 116.227 |
| 62 | | 5.662 | 0.773 | G67 | | | | |
| 71 | Seventh Lens | 9.282 | 0.526 | T7 | Plastic | 1.545 | 55.987 | 7.490 |
| 72 | | -7.171 | 0.116 | G78 | | | | |
| 81 | Eighth Lens | -44.380 | 0.904 | T8 | Plastic | 1.545 | 55.987 | -1342.211 |
| 82 | | -47.580 | 0.639 | G89 | | | | |
| 91 | Ninth Lens | -5.872 | 0.347 | T9 | Plastic | 1.545 | 55.987 | -4.422 |
| 92 | | 4.190 | 0.400 | G9F | | | | |
| 3 | Filter | Infinity | 0.210 | TF | | 1.517 | 64.167 | |
| | | Infinity | 0.280 | GFP | | | | |
| 4 | Image Plane | Infinity | | | | | | |

FIG. 46

| No. | K | $a_2$ | $a_4$ | $a_6$ | $a_8$ | $a_{10}$ |
|---|---|---|---|---|---|---|
| 11 | 0.000000E+00 | 0.000000E+00 | 1.481149E-03 | 3.321742E-04 | -1.643982E-04 | 1.511141E-04 |
| 12 | 0.000000E+00 | 0.000000E+00 | -7.908529E-03 | 6.948511E-03 | -2.283563E-03 | 1.156743E-04 |
| 21 | 0.000000E+00 | 0.000000E+00 | -1.887914E-02 | 8.826034E-03 | -1.161579E-03 | -9.656343E-04 |
| 22 | 2.152074E+00 | 0.000000E+00 | -1.408156E-02 | 1.817533E-03 | 2.213382E-03 | -2.035236E-03 |
| 31 | 0.000000E+00 | 0.000000E+00 | -2.258336E-03 | -7.542186E-04 | -5.635988E-04 | 1.030246E-03 |
| 32 | 0.000000E+00 | 0.000000E+00 | -2.693987E-03 | -1.863013E-03 | 1.172714E-03 | -4.366612E-04 |
| 41 | 0.000000E+00 | 0.000000E+00 | -7.154219E-03 | -5.126748E-02 | 5.843035E-02 | -4.544676E-02 |
| 42 | 0.000000E+00 | 0.000000E+00 | 2.836213E-02 | -8.555685E-02 | 7.959395E-02 | -5.084941E-02 |
| 51 | 0.000000E+00 | 0.000000E+00 | 4.236447E-02 | -6.365923E-02 | 4.301954E-02 | -1.908682E-02 |
| 52 | 0.000000E+00 | 0.000000E+00 | 1.590337E-04 | -1.939154E-02 | 1.306588E-02 | -6.653725E-03 |
| 61 | 0.000000E+00 | 0.000000E+00 | -2.381140E-02 | 7.892553E-03 | -4.368131E-03 | 1.693022E-03 |
| 62 | 0.000000E+00 | 0.000000E+00 | -3.268248E-02 | 1.469384E-02 | -7.419988E-03 | 2.594064E-03 |
| 71 | 0.000000E+00 | 0.000000E+00 | -1.372035E-02 | 3.521637E-03 | 9.293296E-04 | -1.223808E-03 |
| 72 | -8.215232E+01 | 0.000000E+00 | -2.523859E-02 | 2.445062E-02 | -1.105468E-02 | 2.852581E-03 |
| 81 | 0.000000E+00 | 0.000000E+00 | -8.174589E-03 | 1.216228E-02 | -7.782683E-03 | 2.293463E-03 |
| 82 | 0.000000E+00 | 0.000000E+00 | 8.655776E-04 | 4.770997E-04 | -1.200466E-03 | 3.125853E-04 |
| 91 | 0.000000E+00 | 0.000000E+00 | -1.875359E-02 | 5.345586E-03 | -1.307980E-03 | 2.087369E-04 |
| 92 | -1.061699E+01 | 0.000000E+00 | -1.318720E-02 | 2.128131E-03 | -2.221775E-04 | 1.686346E-05 |

| No. | $a_{12}$ | $a_{14}$ | $a_{16}$ | $a_{18}$ | $a_{20}$ | |
|---|---|---|---|---|---|---|
| 11 | -5.599134E-05 | 9.930046E-06 | -5.600459E-07 | | | |
| 12 | 1.795832E-04 | -5.019607E-05 | 4.091614E-06 | | | |
| 21 | 6.590926E-04 | -1.523906E-04 | 1.210382E-05 | | | |
| 22 | 8.456928E-04 | -1.478915E-04 | 6.617596E-06 | | | |
| 31 | -4.968996E-04 | 1.570370E-04 | -1.919929E-05 | | | |
| 32 | 2.073782E-04 | -3.658069E-05 | 3.828025E-06 | | | |
| 41 | 2.327825E-02 | -7.863246E-03 | 1.690684E-03 | -2.096502E-04 | 1.132739E-05 | |
| 42 | 2.213353E-02 | -6.485860E-03 | 1.239362E-03 | -1.401517E-04 | 7.107336E-06 | |
| 51 | 5.538594E-03 | -9.941406E-04 | 1.055112E-04 | -6.289301E-06 | 1.862036E-07 | |
| 52 | 2.758950E-03 | -8.265996E-04 | 1.583615E-04 | -1.687567E-05 | 7.548928E-07 | |
| 61 | -4.101092E-04 | 6.198512E-05 | -5.843505E-06 | 3.261305E-07 | -8.421594E-09 | |
| 62 | -5.954053E-04 | 8.890231E-05 | -8.442678E-06 | 4.700263E-07 | -1.170819E-08 | |
| 71 | 4.395673E-04 | -8.542891E-05 | 9.636475E-06 | -5.965851E-07 | 1.575161E-08 | |
| 72 | -4.595874E-04 | 4.699631E-05 | -2.958971E-06 | 1.045800E-07 | -1.588966E-09 | |
| 81 | -3.846400E-04 | 3.923596E-05 | -2.412361E-06 | 8.220928E-08 | -1.192950E-09 | |
| 82 | -3.769604E-05 | 2.314096E-06 | -5.574377E-08 | -7.072450E-10 | 4.264300E-11 | |
| 91 | -1.917247E-05 | 1.026347E-06 | -3.148349E-08 | 5.041810E-10 | -3.150000E-12 | |
| 92 | -9.491380E-07 | 3.800598E-08 | -1.013623E-09 | 1.604400E-11 | -1.130000E-13 | |

FIG. 47

| Eighth Embodiment ||||||||
|---|---|---|---|---|---|---|---|
| EFL=5.927mm; HFOV=23.383 degrees; TTL=7.530mm; Fno=1.600 ; ImgH=2.600mm ||||||||
| No. | | Radius of Curvature (mm) | Ape. Stop Distance Lens Thickness Air Gap (mm) | | Material | Refractive Index | Abbe No. | Focal Length (mm) |
| | Object | Infinity | Infinity | | | | | |
| 2 | Ape. Stop | Infinity | -0.776 | | | | | |
| 11 | First Lens | 2.654 | 1.001 | T1 | Plastic | 1.545 | 55.987 | 6.158 |
| 12 | | 10.903 | 0.087 | G12 | | | | |
| 21 | Second Lens | 5.977 | 0.223 | T2 | Plastic | 1.671 | 19.243 | -14.924 |
| 22 | | 3.700 | 0.186 | G23 | | | | |
| 31 | Third Lens | 5.846 | 0.328 | T3 | Plastic | 1.545 | 55.987 | 31.666 |
| 32 | | 8.654 | 0.523 | G34 | | | | |
| 41 | Fourth Lens | -25.301 | 0.433 | T4 | Plastic | 1.671 | 19.243 | -85.893 |
| 42 | | -45.069 | 0.062 | G45 | | | | |
| 51 | Fifth Lens | -10.166 | 0.485 | T5 | Plastic | 1.545 | 55.987 | 30.802 |
| 52 | | -6.444 | 0.217 | G56 | | | | |
| 61 | Sixth Lens | 10.252 | 0.353 | T6 | Plastic | 1.661 | 20.373 | -30.209 |
| 62 | | 6.702 | 0.444 | G67 | | | | |
| 71 | Seventh Lens | 6.164 | 0.532 | T7 | Plastic | 1.545 | 55.987 | 6.983 |
| 72 | | -9.701 | 0.051 | G78 | | | | |
| 81 | Eighth Lens | 7.470 | 0.507 | T8 | Plastic | 1.545 | 55.987 | -121.192 |
| 82 | | 6.551 | 0.873 | G89 | | | | |
| 91 | Ninth Lens | -11.705 | 0.429 | T9 | Plastic | 1.545 | 55.987 | -4.439 |
| 92 | | 3.098 | 0.400 | G9F | | | | |
| 3 | Filter | Infinity | 0.210 | TF | | 1.517 | 64.167 | |
| | | Infinity | 0.187 | GFP | | | | |
| 4 | Image Plane | Infinity | | | | | | |

FIG. 48

| No. | K | $a_2$ | $a_4$ | $a_6$ | $a_8$ | $a_{10}$ |
|---|---|---|---|---|---|---|
| 11 | 0.000000E+00 | 0.000000E+00 | 6.042827E-04 | 3.345140E-04 | 3.594043E-04 | -3.315592E-04 |
| 12 | 0.000000E+00 | 0.000000E+00 | -4.255264E-03 | 1.437079E-03 | -2.053345E-03 | 2.294242E-03 |
| 21 | 0.000000E+00 | 0.000000E+00 | 2.108247E-03 | -2.874600E-02 | 2.545106E-02 | -1.118914E-02 |
| 22 | 1.980818E+00 | 0.000000E+00 | 2.003223E-02 | -6.936421E-02 | 6.691600E-02 | -3.857703E-02 |
| 31 | 0.000000E+00 | 0.000000E+00 | 2.498856E-02 | -6.676259E-02 | 7.271998E-02 | -4.996155E-02 |
| 32 | 0.000000E+00 | 0.000000E+00 | 6.256563E-03 | -3.399268E-02 | 4.724465E-02 | -3.944021E-02 |
| 41 | 0.000000E+00 | 0.000000E+00 | -2.225026E-02 | -2.916259E-02 | 4.415922E-02 | -4.991681E-02 |
| 42 | 0.000000E+00 | 0.000000E+00 | 5.436229E-02 | -1.680903E-01 | 1.884008E-01 | -1.354575E-01 |
| 51 | 0.000000E+00 | 0.000000E+00 | 1.145885E-01 | -2.444580E-01 | 2.413316E-01 | -1.407245E-01 |
| 52 | 0.000000E+00 | 0.000000E+00 | 6.331468E-02 | -1.659580E-01 | 1.609213E-01 | -9.707248E-02 |
| 61 | 0.000000E+00 | 0.000000E+00 | 3.132479E-02 | -1.187229E-01 | 1.208051E-01 | -7.117128E-02 |
| 62 | 0.000000E+00 | 0.000000E+00 | -2.054633E-02 | -4.128061E-02 | 5.044447E-02 | -2.829249E-02 |
| 71 | 0.000000E+00 | 0.000000E+00 | -2.445452E-02 | -1.457501E-02 | 1.392851E-02 | -3.824694E-03 |
| 72 | -7.511467E+01 | 0.000000E+00 | -5.819211E-04 | -7.607534E-03 | 3.922524E-03 | -2.563823E-04 |
| 81 | 0.000000E+00 | 0.000000E+00 | 1.467009E-02 | -4.603762E-03 | -3.038524E-03 | 1.397774E-03 |
| 82 | 0.000000E+00 | 0.000000E+00 | 1.989159E-02 | -2.922960E-03 | -3.498117E-03 | 1.686327E-03 |
| 91 | 0.000000E+00 | 0.000000E+00 | -5.821643E-02 | 2.779555E-02 | -9.034750E-03 | 2.491705E-03 |
| 92 | -1.041314E+01 | 0.000000E+00 | -3.750523E-02 | 1.468774E-02 | -4.479555E-03 | 9.754359E-04 |

| No. | $a_{12}$ | $a_{14}$ | $a_{16}$ | $a_{18}$ | $a_{20}$ |
|---|---|---|---|---|---|
| 11 | 1.529359E-04 | -3.207152E-05 | 2.737484E-06 | | |
| 12 | -9.462014E-04 | 1.707703E-04 | -1.078498E-05 | | |
| 21 | 3.139501E-03 | -5.532789E-04 | 4.680945E-05 | | |
| 22 | 1.395883E-02 | -2.824426E-03 | 2.400664E-04 | | |
| 31 | 2.102013E-02 | -4.753610E-03 | 4.506114E-04 | | |
| 32 | 1.914526E-02 | -4.933147E-03 | 5.381671E-04 | | |
| 41 | 3.223012E-02 | -1.253711E-02 | 2.941051E-03 | -3.794925E-04 | 1.956383E-05 |
| 42 | 6.313317E-02 | -1.876585E-02 | 3.413136E-03 | -3.470916E-04 | 1.558463E-05 |
| 51 | 4.865938E-02 | -8.627642E-03 | 1.936422E-04 | 1.753780E-04 | -1.959704E-05 |
| 52 | 3.885473E-02 | -1.037200E-02 | 1.796952E-03 | -1.858479E-04 | 8.852327E-06 |
| 61 | 2.638151E-02 | -6.199059E-03 | 8.963225E-04 | -7.306647E-05 | 2.582832E-06 |
| 62 | 9.222339E-03 | -1.833597E-03 | 2.194673E-04 | -1.458031E-05 | 4.146819E-07 |
| 71 | 2.120856E-05 | 1.979146E-04 | -4.368668E-05 | 3.991618E-06 | -1.371742E-07 |
| 72 | -2.304319E-04 | 6.623212E-05 | -7.784677E-06 | 4.375326E-07 | -9.698728E-09 |
| 81 | -2.806563E-04 | 3.587006E-05 | -3.026355E-06 | 1.495544E-07 | -3.189852E-09 |
| 82 | -3.447636E-04 | 3.859458E-05 | -2.463042E-06 | 8.428421E-08 | -1.202314E-09 |
| 91 | -4.602837E-04 | 5.148611E-05 | -3.344858E-06 | 1.162192E-07 | -1.670812E-09 |
| 92 | -1.398688E-04 | 1.248169E-05 | -6.619678E-07 | 1.907380E-08 | -2.299340E-10 |

FIG. 49

| Ninth Embodiment | | | | | | | |
|---|---|---|---|---|---|---|---|
| EFL=5.898mm; HFOV=37.532 degrees; TTL=7.483mm; Fno=1.600；ImgH=5.200mm | | | | | | | |
| No. | | Radius of Curvature (mm) | Ape. Stop Distance Lens Thickness Air Gap (mm) | Material | | Refractive Index | Abbe No. | Focal Length (mm) |
| | Object | Infinity | Infinity | | | | |
| 2 | Ape. Stop | Infinity | -0.730 | | | | |
| 11 | First Lens | 2.738 | 0.967 | T1 | Plastic | 1.545 | 55.987 | 5.988 |
| 12 | | 14.701 | 0.066 | G12 | | | |
| 21 | Second Lens | 6.899 | 0.250 | T2 | Plastic | 1.671 | 19.243 | -13.115 |
| 22 | | 3.827 | 0.146 | G23 | | | |
| 31 | Third Lens | 5.175 | 0.377 | T3 | Plastic | 1.545 | 55.987 | 32.845 |
| 32 | | 7.085 | 0.603 | G34 | | | |
| 41 | Fourth Lens | -26.104 | 0.376 | T4 | Plastic | 1.671 | 19.243 | 374.839 |
| 42 | | -23.809 | 0.077 | G45 | | | |
| 51 | Fifth Lens | -7.685 | 0.533 | T5 | Plastic | 1.545 | 55.987 | 63.845 |
| 52 | | -6.452 | 0.323 | G56 | | | |
| 61 | Sixth Lens | 6.788 | 0.321 | T6 | Plastic | 1.567 | 37.533 | -45.864 |
| 62 | | 5.296 | 0.434 | G67 | | | |
| 71 | Seventh Lens | 5.621 | 0.533 | T7 | Plastic | 1.545 | 55.987 | 6.217 |
| 72 | | -8.293 | 0.071 | G78 | | | |
| 81 | Eighth Lens | 27.664 | 0.435 | T8 | Plastic | 1.545 | 55.987 | -135.251 |
| 82 | | 20.016 | 0.923 | G89 | | | |
| 91 | Ninth Lens | -6.362 | 0.200 | T9 | Plastic | 1.545 | 55.987 | -4.233 |
| 92 | | 3.673 | 0.400 | G9F | | | |
| 3 | Filter | Infinity | 0.210 | TF | | 1.517 | 64.167 | |
| | | Infinity | 0.237 | GFP | | | |
| 4 | Image Plane | Infinity | | | | | |

FIG. 50

| No. | K | $a_2$ | $a_4$ | $a_6$ | $a_8$ | $a_{10}$ |
|---|---|---|---|---|---|---|
| 11 | 0.000000E+00 | 0.000000E+00 | 1.194875E-03 | 4.594925E-05 | 5.135248E-04 | -4.392488E-04 |
| 12 | 0.000000E+00 | 0.000000E+00 | -5.373117E-03 | 1.048820E-04 | 3.308474E-03 | -2.474994E-03 |
| 21 | 0.000000E+00 | 0.000000E+00 | -1.260180E-02 | -2.786454E-03 | 6.895384E-03 | -4.048034E-03 |
| 22 | 2.074467E+00 | 0.000000E+00 | -8.481350E-03 | -6.285140E-03 | 4.922688E-03 | -2.255814E-03 |
| 31 | 0.000000E+00 | 0.000000E+00 | -1.853046E-03 | -1.726293E-03 | -1.368172E-03 | 9.381765E-04 |
| 32 | 0.000000E+00 | 0.000000E+00 | -7.067025E-03 | 7.111042E-04 | 5.868704E-04 | -1.768574E-03 |
| 41 | 0.000000E+00 | 0.000000E+00 | -2.567435E-02 | -2.535306E-02 | 3.321931E-02 | -3.244610E-02 |
| 42 | 0.000000E+00 | 0.000000E+00 | 3.663541E-02 | -1.142983E-01 | 1.076427E-01 | -6.258992E-02 |
| 51 | 0.000000E+00 | 0.000000E+00 | 8.373276E-02 | -1.576693E-01 | 1.341682E-01 | -6.653080E-02 |
| 52 | 0.000000E+00 | 0.000000E+00 | 2.587507E-02 | -7.547866E-02 | 6.268239E-02 | -3.504100E-02 |
| 61 | 0.000000E+00 | 0.000000E+00 | 6.349643E-03 | -4.074774E-02 | 3.007931E-02 | -1.369368E-02 |
| 62 | 0.000000E+00 | 0.000000E+00 | -2.699014E-02 | -6.473124E-03 | 6.893806E-03 | -2.207497E-03 |
| 71 | 0.000000E+00 | 0.000000E+00 | -1.926056E-02 | -5.815723E-04 | 5.147100E-04 | 4.886168E-04 |
| 72 | -9.717895E+01 | 0.000000E+00 | -1.337118E-02 | 1.231221E-02 | -7.035854E-03 | 2.802423E-03 |
| 81 | 0.000000E+00 | 0.000000E+00 | 8.019641E-03 | -6.484040E-03 | 1.037305E-03 | -2.278913E-04 |
| 82 | 0.000000E+00 | 0.000000E+00 | 2.659741E-02 | -1.628609E-02 | 4.515762E-03 | -9.874445E-04 |
| 91 | 0.000000E+00 | 0.000000E+00 | -2.502931E-02 | 3.867156E-03 | 2.978557E-04 | -1.955800E-04 |
| 92 | -1.086529E+01 | 0.000000E+00 | -2.516972E-02 | 5.137735E-03 | -7.405375E-04 | 7.583897E-05 |
| No. | $a_{12}$ | $a_{14}$ | $a_{16}$ | $a_{18}$ | $a_{20}$ | |
| 11 | 2.140418E-04 | -5.116062E-05 | 5.104323E-06 | | | |
| 12 | 1.020572E-03 | -2.299610E-04 | 2.206922E-05 | | | |
| 21 | 1.539565E-03 | -3.534708E-04 | 3.525285E-05 | | | |
| 22 | 6.927136E-04 | -2.224163E-05 | -2.181104E-05 | | | |
| 31 | -4.380908E-04 | 3.379323E-04 | -7.123686E-05 | | | |
| 32 | 1.290882E-03 | -3.334099E-04 | 3.592523E-05 | | | |
| 41 | 1.934491E-02 | -7.463256E-03 | 1.822021E-03 | -2.524244E-04 | 1.476646E-05 | |
| 42 | 2.263261E-02 | -4.956771E-03 | 6.025763E-04 | -3.137448E-05 | 1.481043E-07 | |
| 51 | 1.903731E-02 | -2.504957E-03 | -1.045436E-04 | 7.141147E-05 | -6.014127E-06 | |
| 52 | 1.420100E-02 | -4.105523E-03 | 8.013799E-04 | -9.475554E-05 | 5.131949E-06 | |
| 61 | 4.268760E-03 | -9.110555E-04 | 1.275569E-04 | -1.062519E-05 | 3.989564E-07 | |
| 62 | 2.844408E-04 | 1.658786E-05 | -9.897540E-06 | 1.135823E-06 | -4.410761E-08 | |
| 71 | -3.008719E-04 | 6.553806E-05 | -7.176254E-06 | 3.919344E-07 | -8.000382E-09 | |
| 72 | -7.344354E-04 | 1.182576E-04 | -1.117086E-05 | 5.684451E-07 | -1.205702E-08 | |
| 81 | 4.160333E-05 | -1.530860E-06 | -4.048019E-07 | 4.558262E-08 | -1.392108E-09 | |
| 82 | 1.681591E-04 | -2.026476E-05 | 1.562119E-06 | -6.764173E-08 | 1.239568E-09 | |
| 91 | 3.374906E-05 | -3.096467E-06 | 1.623651E-07 | -4.607361E-09 | 5.512400E-11 | |
| 92 | -5.307147E-06 | 2.449128E-07 | -7.235162E-09 | 1.291770E-10 | -1.119000E-12 | |

FIG. 51

| Tenth Embodiment ||||||||
|---|---|---|---|---|---|---|---|
| EFL=5.809 mm; HFOV=38.236 degrees; TTL=7.660mm; Fno=1.600；ImgH=5.000mm ||||||||
| No. | Radius of Curvature (mm) | Ape. Stop Distance Lens Thickness Air Gap (mm) | | Material | Refractive Index | Abbe No. | Focal Length (mm) |
| | Object | Infinity | Infinity | | | | |
| 2 | Ape. Stop | Infinity | -0.668 | | | | |
| 11 | First Lens | 2.784 | 0.772 | T1 | Plastic | 1.545 | 55.987 | 6.459 |
| 12 | | 11.897 | 0.057 | G12 | | | |
| 21 | Second Lens | 6.357 | 0.253 | T2 | Plastic | 1.671 | 19.243 | -17.021 |
| 22 | | 4.032 | 0.141 | G23 | | | |
| 31 | Third Lens | 5.749 | 0.453 | T3 | Plastic | 1.545 | 55.987 | 28.685 |
| 32 | | 8.827 | 0.551 | G34 | | | |
| 41 | Fourth Lens | -29.137 | 0.452 | T4 | Plastic | 1.671 | 19.243 | -194.400 |
| 42 | | -37.648 | 0.080 | G45 | | | |
| 51 | Fifth Lens | -7.887 | 0.566 | T5 | Plastic | 1.545 | 55.987 | 29.183 |
| 52 | | -5.410 | 0.156 | G56 | | | |
| 61 | Sixth Lens | 12.355 | 0.845 | T6 | Plastic | 1.661 | 20.373 | -20.776 |
| 62 | | 6.353 | 0.323 | G67 | | | |
| 71 | Seventh Lens | 4.712 | 0.514 | T7 | Plastic | 1.545 | 55.987 | 6.060 |
| 72 | | -10.701 | 0.060 | G78 | | | |
| 81 | Eighth Lens | 140.455 | 0.535 | T8 | Plastic | 1.545 | 55.987 | -36.832 |
| 82 | | 17.576 | 1.001 | G89 | | | |
| 91 | Ninth Lens | -6.753 | 0.200 | T9 | Plastic | 1.545 | 55.987 | -4.646 |
| 92 | | 4.108 | 0.400 | G9F | | | |
| 3 | Filter | Infinity | 0.210 | TF | | 1.517 | 64.167 |
| | | Infinity | 0.092 | GFP | | | |
| 4 | Image Plane | Infinity | | | | | |

FIG. 52

| No. | K | $a_2$ | $a_4$ | $a_6$ | $a_8$ | $a_{10}$ |
|---|---|---|---|---|---|---|
| 11 | 0.000000E+00 | 0.000000E+00 | 1.118039E-03 | 1.075232E-04 | 4.672750E-04 | -5.215077E-04 |
| 12 | 0.000000E+00 | 0.000000E+00 | -3.887782E-03 | -8.127386E-04 | 2.948968E-03 | -1.813572E-03 |
| 21 | 0.000000E+00 | 0.000000E+00 | -1.031828E-02 | -4.005566E-03 | 6.314235E-03 | -3.105753E-03 |
| 22 | 1.969127E+00 | 0.000000E+00 | -8.691095E-03 | -5.217827E-03 | 1.033717E-03 | 2.407120E-03 |
| 31 | 0.000000E+00 | 0.000000E+00 | -1.622475E-03 | -1.160999E-03 | -3.737708E-03 | 4.543537E-03 |
| 32 | 0.000000E+00 | 0.000000E+00 | -6.171351E-03 | -8.746489E-04 | 2.069596E-03 | -2.566716E-03 |
| 41 | 0.000000E+00 | 0.000000E+00 | -2.636387E-02 | -2.229955E-02 | 3.194839E-02 | -3.494398E-02 |
| 42 | 0.000000E+00 | 0.000000E+00 | 2.693140E-02 | -9.456756E-02 | 9.014863E-02 | -5.517873E-02 |
| 51 | 0.000000E+00 | 0.000000E+00 | 7.564225E-02 | -1.332221E-01 | 1.122600E-01 | -5.722182E-02 |
| 52 | 0.000000E+00 | 0.000000E+00 | 2.609656E-02 | -8.743234E-02 | 7.987252E-02 | -4.737802E-02 |
| 61 | 0.000000E+00 | 0.000000E+00 | -1.545218E-03 | -3.807909E-02 | 3.339577E-02 | -1.767368E-02 |
| 62 | 0.000000E+00 | 0.000000E+00 | -3.466855E-02 | 1.237177E-02 | -4.805157E-03 | 1.554370E-03 |
| 71 | 0.000000E+00 | 0.000000E+00 | -3.232814E-02 | 4.754594E-03 | 2.218528E-03 | -1.357974E-03 |
| 72 | 0.000000E+00 | 0.000000E+00 | 1.099024E-02 | -6.310025E-03 | 4.681109E-03 | -1.722930E-03 |
| 81 | 0.000000E+00 | 0.000000E+00 | 9.683099E-03 | -1.745911E-03 | -9.584637E-04 | 1.725661E-05 |
| 82 | 0.000000E+00 | 0.000000E+00 | 1.288425E-02 | -8.887201E-04 | -2.119933E-03 | 7.615134E-04 |
| 91 | 0.000000E+00 | 0.000000E+00 | -2.448865E-02 | 7.482860E-03 | -1.686106E-03 | 2.688441E-04 |
| 92 | -8.327372E+00 | 0.000000E+00 | -1.993665E-02 | 3.885578E-03 | -5.795117E-04 | 4.887063E-05 |

| No. | $a_{12}$ | $a_{14}$ | $a_{16}$ | $a_{18}$ | $a_{20}$ | |
|---|---|---|---|---|---|---|
| 11 | 2.906476E-04 | -8.024874E-05 | 8.958831E-06 | | | |
| 12 | 6.640578E-04 | -1.362708E-04 | 1.281666E-05 | | | |
| 21 | 9.827790E-04 | -1.762057E-04 | 1.285143E-05 | | | |
| 22 | -2.239376E-03 | 8.845034E-04 | -1.281027E-04 | | | |
| 31 | -2.750507E-03 | 9.926127E-04 | -1.351782E-04 | | | |
| 32 | 1.674012E-03 | -4.856793E-04 | 6.167947E-05 | | | |
| 41 | 2.423023E-02 | -1.101502E-02 | 3.185471E-03 | -5.278187E-04 | 3.761324E-05 | |
| 42 | 2.138444E-02 | -5.035728E-03 | 6.681026E-04 | -4.206623E-05 | 7.983394E-07 | |
| 51 | 1.661324E-02 | -1.910367E-03 | -2.558453E-04 | 9.553471E-05 | -7.529117E-06 | |
| 52 | 1.998067E-02 | -5.977852E-03 | 1.207910E-03 | -1.475586E-04 | 8.197326E-06 | |
| 61 | 6.312843E-03 | -1.524701E-03 | 2.389329E-04 | -2.209717E-05 | 9.174904E-07 | |
| 62 | -4.015935E-04 | 7.884119E-05 | -1.036242E-05 | 7.721975E-07 | -2.409715E-08 | |
| 71 | 3.079048E-04 | -4.213553E-05 | 4.014799E-06 | -2.601334E-07 | 8.429384E-09 | |
| 72 | 3.200629E-04 | -3.201292E-05 | 1.680526E-06 | -3.845864E-08 | 1.286030E-10 | |
| 81 | 8.316175E-05 | -1.806450E-05 | 1.664474E-06 | -7.340052E-08 | 1.272275E-09 | |
| 82 | -1.305325E-04 | 1.297226E-05 | -7.614920E-07 | 2.456479E-08 | -3.364100E-10 | |
| 91 | -2.721387E-05 | 1.739927E-06 | -6.888495E-08 | 1.551206E-09 | -1.523900E-11 | |
| 92 | -1.668400E-06 | -3.991630E-08 | 5.293024E-09 | -1.628600E-10 | 1.714000E-12 | |

FIG. 53

| Eleventh Embodiment | | | | | | | |
|---|---|---|---|---|---|---|---|
| EFL=5.770mm; HFOV=40.120 degrees; TTL=7.655mm; Fno=1.600；ImgH=5.200mm | | | | | | | |
| No. | | Radius of Curvature (mm) | Ape. Stop Distance Lens Thickness Air Gap (mm) | | Material | Refractive Index | Abbe No. | Focal Length (mm) |
| | Object | Infinity | Infinity | | | | | |
| 2 | Ape. Stop | Infinity | -0.681 | | | | | |
| 11 | First Lens | 2.731 | 0.750 | T1 | Plastic | 1.545 | 55.987 | 7.056 |
| 12 | | 8.467 | 0.072 | G12 | | | | |
| 21 | Second Lens | 5.101 | 0.200 | T2 | Plastic | 1.671 | 19.243 | -22.774 |
| 22 | | 3.773 | 0.176 | G23 | | | | |
| 31 | Third Lens | 5.931 | 0.355 | T3 | Plastic | 1.545 | 55.987 | 30.915 |
| 32 | | 8.948 | 0.516 | G34 | | | | |
| 41 | Fourth Lens | -27.103 | 0.465 | T4 | Plastic | 1.671 | 19.243 | -39.029 |
| 42 | | 1094.087 | 0.062 | G45 | | | | |
| 51 | Fifth Lens | -15.782 | 0.659 | T5 | Plastic | 1.545 | 55.987 | 18.060 |
| 52 | | -6.160 | 0.284 | G56 | | | | |
| 61 | Sixth Lens | 22.435 | 0.431 | T6 | Plastic | 1.661 | 20.373 | -17.644 |
| 62 | | 7.661 | 0.140 | G67 | | | | |
| 71 | Seventh Lens | 7.066 | 0.396 | T7 | Plastic | 1.567 | 37.533 | 6.282 |
| 72 | | -7.106 | 0.213 | G78 | | | | |
| 81 | Eighth Lens | 33.551 | 0.627 | T8 | Plastic | 1.545 | 55.987 | -1607.604 |
| 82 | | 32.103 | 0.932 | G89 | | | | |
| 91 | Ninth Lens | -6.481 | 0.528 | T9 | Plastic | 1.545 | 55.987 | -4.752 |
| 92 | | 4.454 | 0.400 | G9F | | | | |
| 3 | Filter | Infinity | 0.210 | TF | | 1.517 | 64.167 | |
| | | Infinity | 0.241 | GFP | | | | |
| 4 | Image Plane | Infinity | | | | | | |

FIG. 54

| No. | K | $a_2$ | $a_4$ | $a_6$ | $a_8$ | $a_{10}$ |
|---|---|---|---|---|---|---|
| 11 | 0.000000E+00 | 0.000000E+00 | -5.572580E-04 | 5.063553E-03 | -5.743082E-03 | 3.868032E-03 |
| 12 | 0.000000E+00 | 0.000000E+00 | 9.060339E-03 | -3.594153E-02 | 4.365651E-02 | -2.837750E-02 |
| 21 | 0.000000E+00 | 0.000000E+00 | 1.127528E-02 | -6.073862E-02 | 7.384556E-02 | -4.958135E-02 |
| 22 | 1.961253E+00 | 0.000000E+00 | 9.475346E-03 | -5.231952E-02 | 6.413708E-02 | -4.743318E-02 |
| 31 | 0.000000E+00 | 0.000000E+00 | 4.224757E-03 | -1.368649E-02 | 1.592527E-02 | -1.442462E-02 |
| 32 | 0.000000E+00 | 0.000000E+00 | -1.357157E-03 | -1.439613E-02 | 2.583106E-02 | -2.646751E-02 |
| 41 | 0.000000E+00 | 0.000000E+00 | -2.782350E-02 | -1.340078E-02 | 8.969709E-03 | -2.900047E-04 |
| 42 | 0.000000E+00 | 0.000000E+00 | 4.292399E-02 | -1.278451E-01 | 1.293586E-01 | -8.676031E-02 |
| 51 | 0.000000E+00 | 0.000000E+00 | 8.184427E-02 | -1.501094E-01 | 1.275673E-01 | -6.689898E-02 |
| 52 | 0.000000E+00 | 0.000000E+00 | 3.013569E-02 | -8.696186E-02 | 7.507014E-02 | -4.445465E-02 |
| 61 | 0.000000E+00 | 0.000000E+00 | 1.150384E-02 | -3.481448E-02 | 9.993581E-03 | 4.050929E-03 |
| 62 | 0.000000E+00 | 0.000000E+00 | -3.660720E-02 | 7.061880E-03 | -8.990367E-03 | 8.501197E-03 |
| 71 | 0.000000E+00 | 0.000000E+00 | -2.283104E-02 | -8.193054E-03 | 9.847844E-03 | -3.403712E-03 |
| 72 | 0.000000E+00 | 0.000000E+00 | 3.766361E-02 | -3.002128E-02 | 1.562686E-02 | -4.598089E-03 |
| 81 | 0.000000E+00 | 0.000000E+00 | 1.869629E-02 | -1.503967E-02 | 5.556483E-03 | -1.685401E-03 |
| 82 | 0.000000E+00 | 0.000000E+00 | 9.576343E-03 | 1.148294E-03 | -2.456382E-03 | 7.730332E-04 |
| 91 | 0.000000E+00 | 0.000000E+00 | -1.895642E-02 | 1.371712E-03 | 5.748904E-04 | -1.741505E-04 |
| 92 | -7.342410E+00 | 0.000000E+00 | -9.759220E-03 | -1.604308E-03 | 9.072436E-04 | -1.913915E-04 |
| No. | $a_{12}$ | $a_{14}$ | $a_{16}$ | $a_{18}$ | $a_{20}$ | |
| 11 | -1.447929E-03 | 2.855384E-04 | -2.278708E-05 | | | |
| 12 | 1.058516E-02 | -2.098035E-03 | 1.706840E-04 | | | |
| 21 | 1.966637E-02 | -4.188324E-03 | 3.656243E-04 | | | |
| 22 | 2.039436E-02 | -4.519629E-03 | 3.951285E-04 | | | |
| 31 | 7.030870E-03 | -1.565669E-03 | 1.367349E-04 | | | |
| 32 | 1.474535E-02 | -4.169130E-03 | 4.817223E-04 | | | |
| 41 | -8.350274E-03 | 8.165804E-03 | -3.674096E-03 | 8.185574E-04 | -7.237074E-05 | |
| 42 | 3.975386E-02 | -1.233210E-02 | 2.460135E-03 | -2.813246E-04 | 1.396355E-05 | |
| 51 | 2.287983E-02 | -5.132649E-03 | 7.273648E-04 | -5.838325E-05 | 2.013698E-06 | |
| 52 | 1.972226E-02 | -6.273470E-03 | 1.314819E-03 | -1.605863E-04 | 8.630127E-06 | |
| 61 | -3.611813E-03 | 1.098197E-03 | -1.698559E-04 | 1.297641E-05 | -3.686454E-07 | |
| 62 | -3.870765E-03 | 9.723531E-04 | -1.389285E-04 | 1.057651E-05 | -3.326613E-07 | |
| 71 | 5.170244E-04 | -3.149751E-05 | -1.827505E-07 | 4.516594E-08 | 3.112686E-09 | |
| 72 | 7.676822E-04 | -7.157468E-05 | 3.335307E-06 | -4.500630E-08 | -1.025260E-09 | |
| 81 | 3.476230E-04 | -4.362555E-05 | 3.194598E-06 | -1.258767E-07 | 2.064557E-09 | |
| 82 | -1.301826E-04 | 1.321157E-05 | -8.004872E-07 | 2.652775E-08 | -3.676460E-10 | |
| 91 | 2.535510E-05 | -2.161896E-06 | 1.077448E-07 | -2.893343E-09 | 3.224700E-11 | |
| 92 | 2.256494E-05 | -1.577938E-06 | 6.501029E-08 | -1.460649E-09 | 1.383400E-11 | |

FIG. 55

| Twelfth Embodiment ||||||||
|---|---|---|---|---|---|---|---|
| | EFL=5.854 mm; HFOV=37.324 degrees; TTL=7.476mm; Fno=1.600 ; ImgH=5.200mm ||||||||
| No. | | Radius of Curvature (mm) | Ape. Stop Distance Lens Thickness Air Gap (mm) | | Material | Refractive Index | Abbe No. | Focal Length (mm) |
| | Object | Infinity | Infinity | | | | | |
| 2 | Ape. Stop | Infinity | -0.725 | | | | | |
| 11 | First Lens | 2.742 | 0.969 | T1 | Plastic | 1.545 | 55.987 | 5.953 |
| 12 | | 15.288 | 0.065 | G12 | | | | |
| 21 | Second Lens | 7.022 | 0.250 | T2 | Plastic | 1.671 | 19.243 | -12.861 |
| 22 | | 3.833 | 0.143 | G23 | | | | |
| 31 | Third Lens | 5.141 | 0.380 | T3 | Plastic | 1.545 | 55.987 | 33.045 |
| 32 | | 7.000 | 0.599 | G34 | | | | |
| 41 | Fourth Lens | -25.533 | 0.377 | T4 | Plastic | 1.671 | 19.243 | 173.886 |
| 42 | | -21.110 | 0.077 | G45 | | | | |
| 51 | Fifth Lens | -7.388 | 0.528 | T5 | Plastic | 1.545 | 55.987 | 81.466 |
| 52 | | -6.497 | 0.322 | G56 | | | | |
| 61 | Sixth Lens | 6.434 | 0.320 | T6 | Plastic | 1.567 | 37.533 | -48.022 |
| 62 | | 5.115 | 0.419 | G67 | | | | |
| 71 | Seventh Lens | 5.532 | 0.547 | T7 | Plastic | 1.545 | 55.987 | 6.226 |
| 72 | | -8.520 | 0.065 | G78 | | | | |
| 81 | Eighth Lens | 25.965 | 0.450 | T8 | Plastic | 1.545 | 55.987 | -171.801 |
| 82 | | 20.214 | 0.926 | G89 | | | | |
| 91 | Ninth Lens | -6.446 | 0.221 | T9 | Plastic | 1.567 | 37.533 | -4.166 |
| 92 | | 3.804 | 0.400 | G9F | | | | |
| 3 | Filter | Infinity | 0.210 | TF | | 1.517 | 64.167 | |
| | | Infinity | 0.209 | GFP | | | | |
| 4 | Image Plane | Infinity | | | | | | |

FIG. 56

| No. | K | $a_2$ | $a_4$ | $a_6$ | $a_8$ | $a_{10}$ |
|---|---|---|---|---|---|---|
| 11 | 0.000000E+00 | 0.000000E+00 | 1.146320E-03 | 1.474661E-04 | 4.065087E-04 | -3.719232E-04 |
| 12 | 0.000000E+00 | 0.000000E+00 | -5.852472E-03 | 1.304721E-03 | 1.966532E-03 | -1.646902E-03 |
| 21 | 0.000000E+00 | 0.000000E+00 | -1.321262E-02 | -1.038131E-03 | 4.604698E-03 | -2.432796E-03 |
| 22 | 2.077602E+00 | 0.000000E+00 | -8.623068E-03 | -5.416716E-03 | 3.570583E-03 | -1.479810E-03 |
| 31 | 0.000000E+00 | 0.000000E+00 | -1.802864E-03 | -1.761432E-03 | -1.259437E-03 | 4.200584E-04 |
| 32 | 0.000000E+00 | 0.000000E+00 | -7.123870E-03 | 9.511385E-04 | 2.220294E-04 | -1.512859E-03 |
| 41 | 0.000000E+00 | 0.000000E+00 | -2.570326E-02 | -2.494650E-02 | 3.270102E-02 | -3.203880E-02 |
| 42 | 0.000000E+00 | 0.000000E+00 | 3.659973E-02 | -1.147868E-01 | 1.080987E-01 | -6.274083E-02 |
| 51 | 0.000000E+00 | 0.000000E+00 | 8.405218E-02 | -1.581268E-01 | 1.336835E-01 | -6.520663E-02 |
| 52 | 0.000000E+00 | 0.000000E+00 | 2.614648E-02 | -7.572467E-02 | 6.260922E-02 | -3.465288E-02 |
| 61 | 0.000000E+00 | 0.000000E+00 | 6.478249E-03 | -4.080522E-02 | 3.028970E-02 | -1.395636E-02 |
| 62 | 0.000000E+00 | 0.000000E+00 | -2.700848E-02 | -6.126024E-03 | 6.623855E-03 | -2.140983E-03 |
| 71 | 0.000000E+00 | 0.000000E+00 | -1.990148E-02 | 6.205117E-04 | -3.230239E-04 | 8.918196E-04 |
| 72 | 0.000000E+00 | 0.000000E+00 | 6.365300E-03 | 2.459281E-03 | -3.032415E-03 | 1.674685E-03 |
| 81 | 0.000000E+00 | 0.000000E+00 | 7.970555E-03 | -6.575543E-03 | 1.057479E-03 | -1.964566E-04 |
| 82 | 0.000000E+00 | 0.000000E+00 | 2.523110E-02 | -1.518479E-02 | 4.150192E-03 | -9.192481E-04 |
| 91 | 0.000000E+00 | 0.000000E+00 | -2.435166E-02 | 3.340733E-03 | 5.280497E-04 | -2.578827E-04 |
| 92 | -1.047317E+01 | 0.000000E+00 | -2.529314E-02 | 5.158164E-03 | -7.478041E-04 | 7.838156E-05 |
| No. | $a_{12}$ | $a_{14}$ | $a_{16}$ | $a_{18}$ | $a_{20}$ | |
| 11 | 1.894615E-04 | -4.644964E-05 | 4.745676E-06 | | | |
| 12 | 7.383573E-04 | -1.813199E-04 | 1.885970E-05 | | | |
| 21 | 9.242735E-04 | -2.362964E-04 | 2.664687E-05 | | | |
| 22 | 6.002178E-04 | -7.431923E-05 | -9.452808E-06 | | | |
| 31 | 8.694415E-05 | 1.398370E-04 | -4.561666E-05 | | | |
| 32 | 1.208148E-03 | -3.236578E-04 | 3.608691E-05 | | | |
| 41 | 1.923512E-02 | -7.534997E-03 | 1.884738E-03 | -2.701822E-04 | 1.660046E-05 | |
| 42 | 2.269725E-02 | -5.017275E-03 | 6.321947E-04 | -3.790400E-05 | 6.899653E-07 | |
| 51 | 1.796011E-02 | -2.046303E-03 | -2.158891E-04 | 8.606143E-05 | -6.826549E-06 | |
| 52 | 1.383930E-02 | -3.938229E-03 | 7.579623E-04 | -8.868819E-05 | 4.776116E-06 | |
| 61 | 4.420837E-03 | -9.590041E-04 | 1.360163E-04 | -1.140546E-05 | 4.281095E-07 | |
| 62 | 2.946292E-04 | 7.414792E-06 | -7.860264E-06 | 9.343566E-07 | -3.647653E-08 | |
| 71 | -4.272896E-04 | 9.069900E-05 | -1.020613E-05 | 5.933048E-07 | -1.370885E-08 | |
| 72 | -5.226182E-04 | 9.233637E-05 | -9.190073E-06 | 4.827248E-07 | -1.045479E-08 | |
| 81 | 2.289292E-05 | 2.854176E-06 | -9.235944E-07 | 7.637551E-08 | -2.122189E-09 | |
| 82 | 1.604270E-04 | -1.969149E-05 | 1.531722E-06 | -6.652133E-08 | 1.219330E-09 | |
| 91 | 4.416945E-05 | -4.164670E-06 | 2.275293E-07 | -6.777592E-09 | 8.550100E-11 | |
| 92 | -5.692148E-06 | 2.764932E-07 | -8.676630E-09 | 1.632310E-10 | -1.438000E-12 | |

FIG. 57

| Thirteenth Embodiment |||||||
|---|---|---|---|---|---|---|
| EFL=6.771 mm; HFOV=39.406 degrees; TTL=8.293mm; Fno=1.600 ; ImgH=5.800mm |||||||
| No. | | Radius of Curvature (mm) | Ape. Stop Distance Lens Thickness Air Gap (mm) | Material | Refractive Index | Abbe No. | Focal Length (mm) |
| | Object | Infinity | Infinity | | | | |
| 2 | Ape. Stop | Infinity | -0.994 | | | | |
| 11 | First Lens | 2.839 | 1.126 | T1 | Plastic | 1.545 | 55.987 | 6.562 |
| 12 | | 11.723 | 0.035 | G12 | | | |
| 21 | Second Lens | 6.396 | 0.261 | T2 | Plastic | 1.671 | 19.243 | -16.808 |
| 22 | | 4.028 | 0.290 | G23 | | | |
| 31 | Third Lens | 11.197 | 0.321 | T3 | Plastic | 1.545 | 55.987 | 54.176 |
| 32 | | 17.829 | 0.474 | G34 | | | |
| 41 | Fourth Lens | -254.509 | 0.323 | T4 | Plastic | 1.671 | 19.243 | -67.859 |
| 42 | | 56.143 | 0.090 | G45 | | | |
| 51 | Fifth Lens | -12.404 | 0.601 | T5 | Plastic | 1.545 | 55.987 | 48.117 |
| 52 | | -8.571 | 0.222 | G56 | | | |
| 61 | Sixth Lens | 10.484 | 0.332 | T6 | Plastic | 1.661 | 20.373 | -87.879 |
| 62 | | 8.781 | 0.527 | G67 | | | |
| 71 | Seventh Lens | 7.440 | 0.538 | T7 | Plastic | 1.545 | 55.987 | 6.806 |
| 72 | | -7.241 | 0.048 | G78 | | | |
| 81 | Eighth Lens | -96.528 | 0.467 | T8 | Plastic | 1.545 | 55.987 | -70.740 |
| 82 | | 64.551 | 0.997 | G89 | | | |
| 91 | Ninth Lens | -6.091 | 0.457 | T9 | Plastic | 1.545 | 55.987 | -5.160 |
| 92 | | 5.385 | 0.582 | G9F | | | |
| 3 | Filter | Infinity | 0.210 | TF | | 1.517 | 64.167 | |
| | | Infinity | 0.393 | GFP | | | |
| 4 | Image Plane | Infinity | | | | | |

FIG. 58

| No. | K | $a_2$ | $a_4$ | $a_6$ | $a_8$ | $a_{10}$ |
|---|---|---|---|---|---|---|
| 11 | 0.000000E+00 | 0.000000E+00 | 1.511528E-03 | -3.794290E-04 | 3.570000E-04 | -7.826956E-05 |
| 12 | 0.000000E+00 | 0.000000E+00 | -2.271545E-03 | -9.811633E-03 | 1.443786E-02 | -8.413676E-03 |
| 21 | 0.000000E+00 | 0.000000E+00 | -6.606097E-03 | -1.841174E-02 | 2.466311E-02 | -1.429351E-02 |
| 22 | 2.147848E+00 | 0.000000E+00 | -5.668703E-03 | -1.236768E-02 | 1.270931E-02 | -6.127863E-03 |
| 31 | 0.000000E+00 | 0.000000E+00 | 1.393702E-03 | -4.661957E-03 | 7.303871E-04 | 1.431673E-03 |
| 32 | 0.000000E+00 | 0.000000E+00 | -1.621010E-03 | -4.485348E-03 | 3.461786E-03 | -1.643613E-03 |
| 41 | 0.000000E+00 | 0.000000E+00 | -1.875783E-02 | -1.581216E-02 | 5.703320E-03 | 5.778360E-03 |
| 42 | 0.000000E+00 | 0.000000E+00 | 2.008874E-02 | -7.197889E-02 | 7.390548E-02 | -5.550290E-02 |
| 51 | 0.000000E+00 | 0.000000E+00 | 4.183161E-02 | -6.861783E-02 | 5.463107E-02 | -3.211141E-02 |
| 52 | 0.000000E+00 | 0.000000E+00 | 1.237933E-02 | -3.105313E-02 | 1.422497E-02 | -2.718590E-03 |
| 61 | 0.000000E+00 | 0.000000E+00 | -1.381745E-02 | 7.408914E-04 | -3.819321E-03 | 2.834622E-03 |
| 62 | 0.000000E+00 | 0.000000E+00 | -3.887983E-02 | 1.799272E-02 | -9.656592E-03 | 3.642558E-03 |
| 71 | 0.000000E+00 | 0.000000E+00 | -2.294600E-02 | 5.652567E-03 | -7.584991E-04 | -2.698706E-04 |
| 72 | -6.794803E+01 | 0.000000E+00 | -1.435083E-02 | 9.068488E-03 | -2.658306E-03 | 3.193314E-04 |
| 81 | 0.000000E+00 | 0.000000E+00 | 8.467439E-03 | -6.123270E-03 | 6.412600E-04 | 8.118900E-05 |
| 82 | 0.000000E+00 | 0.000000E+00 | 1.593611E-02 | -9.381971E-03 | 1.918056E-03 | -2.153804E-04 |
| 91 | 0.000000E+00 | 0.000000E+00 | -1.787547E-02 | 4.597281E-03 | -1.282720E-03 | 2.423855E-04 |
| 92 | -1.955149E+01 | 0.000000E+00 | -1.301550E-02 | 2.061678E-03 | -3.528790E-04 | 4.303097E-05 |

| No. | $a_{12}$ | $a_{14}$ | $a_{16}$ | $a_{18}$ | $a_{20}$ | |
|---|---|---|---|---|---|---|
| 11 | 2.121029E-06 | 2.996617E-06 | -3.287675E-07 | | | |
| 12 | 2.623145E-03 | -4.260997E-04 | 2.833670E-05 | | | |
| 21 | 4.595706E-03 | -7.834652E-04 | 5.518843E-05 | | | |
| 22 | 1.422385E-03 | -7.938682E-05 | -1.150861E-05 | | | |
| 31 | -1.147692E-03 | 4.168377E-04 | -5.238201E-05 | | | |
| 32 | 5.473443E-04 | -6.012387E-05 | -6.716749E-07 | | | |
| 41 | -1.075764E-02 | 7.181667E-03 | -2.511176E-03 | 4.575752E-04 | -3.428900E-05 | |
| 42 | 2.870342E-02 | -9.804513E-03 | 2.102096E-03 | -2.555433E-04 | 1.349303E-05 | |
| 51 | 1.413368E-02 | -4.293872E-03 | 8.231682E-04 | -8.816453E-05 | 3.994303E-06 | |
| 52 | -3.504685E-04 | 3.815791E-04 | -1.090552E-04 | 1.472350E-05 | -7.766501E-07 | |
| 61 | -9.371733E-04 | 1.735777E-04 | -1.915006E-05 | 1.199597E-06 | -3.305607E-08 | |
| 62 | -8.421120E-04 | 1.177552E-04 | -9.726536E-06 | 4.364509E-07 | -8.177012E-09 | |
| 71 | 1.245440E-04 | -2.294537E-05 | 2.283679E-06 | -1.226161E-07 | 2.901298E-09 | |
| 72 | 9.104124E-07 | -4.309520E-06 | 4.659206E-07 | -2.125640E-08 | 3.693170E-10 | |
| 81 | -2.394043E-05 | 2.188926E-06 | -8.659877E-08 | 8.603910E-10 | 2.012400E-11 | |
| 82 | 1.312971E-05 | -3.095644E-07 | -9.417322E-09 | 7.506710E-10 | -1.343400E-11 | |
| 91 | -2.594113E-05 | 1.629549E-06 | -6.027289E-08 | 1.222038E-09 | -1.051800E-11 | |
| 92 | -3.540790E-06 | 1.903785E-07 | -6.351286E-09 | 1.197520E-10 | -9.830000E-13 | |

FIG. 59

| \multicolumn{8}{|c|}{Fourteenth Embodiment} |
| \multicolumn{8}{|c|}{EFL=7.929 mm; HFOV=38.281 degrees; TTL=8.801mm; Fno=1.875 ; ImgH=6.000mm} |

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| | Object | Infinity | Infinity | | | | | |
| 2 | Ape. Stop | Infinity | -0.994 | | | | | |
| 11 | First Lens | 2.833 | 1.169 | T1 | Plastic | 1.545 | 55.987 | 6.540 |
| 12 | | 11.703 | 0.035 | G12 | | | | |
| 21 | Second Lens | 6.447 | 0.272 | T2 | Plastic | 1.671 | 19.243 | -16.128 |
| 22 | | 3.986 | 0.305 | G23 | | | | |
| 31 | Third Lens | 11.827 | 0.348 | T3 | Plastic | 1.545 | 55.987 | 58.158 |
| 32 | | 18.644 | 0.494 | G34 | | | | |
| 41 | Fourth Lens | -237.156 | 0.314 | T4 | Plastic | 1.671 | 19.243 | -101.962 |
| 42 | | 97.531 | 0.098 | G45 | | | | |
| 51 | Fifth Lens | -10.494 | 0.574 | T5 | Plastic | 1.545 | 55.987 | 72.420 |
| 52 | | -8.455 | 0.229 | G56 | | | | |
| 61 | Sixth Lens | 10.465 | 0.330 | T6 | Plastic | 1.661 | 20.373 | -114.082 |
| 62 | | 9.084 | 0.579 | G67 | | | | |
| 71 | Seventh Lens | 8.829 | 0.476 | T7 | Plastic | 1.545 | 55.987 | 7.994 |
| 72 | | -8.475 | 0.050 | G78 | | | | |
| 81 | Eighth Lens | -66.087 | 0.516 | T8 | Plastic | 1.545 | 55.987 | -38.969 |
| 82 | | 31.490 | 1.078 | G89 | | | | |
| 91 | Ninth Lens | -6.105 | 0.714 | T9 | Plastic | 1.545 | 55.987 | -4.350 |
| 92 | | 4.051 | 0.582 | G9F | | | | |
| 3 | Filter | Infinity | 0.210 | TF | | 1.517 | 64.167 | |
| | | Infinity | 0.426 | GFP | | | | |
| 4 | Image Plane | Infinity | | | | | | |

FIG. 60

| No. | K | $a_2$ | $a_4$ | $a_6$ | $a_8$ | $a_{10}$ |
|---|---|---|---|---|---|---|
| 11 | 0.000000E+00 | 0.000000E+00 | 1.518058E-03 | -4.183772E-04 | 3.516508E-04 | -7.755108E-05 |
| 12 | 0.000000E+00 | 0.000000E+00 | -2.365667E-03 | -9.793610E-03 | 1.444056E-02 | -8.414561E-03 |
| 21 | 0.000000E+00 | 0.000000E+00 | -6.508067E-03 | -1.842764E-02 | 2.468305E-02 | -1.429068E-02 |
| 22 | 2.147848E+00 | 0.000000E+00 | -5.737446E-03 | -1.240828E-02 | 1.272968E-02 | -6.118206E-03 |
| 31 | 0.000000E+00 | 0.000000E+00 | 1.502647E-03 | -4.609729E-03 | 7.365323E-04 | 1.435112E-03 |
| 32 | 0.000000E+00 | 0.000000E+00 | -1.295869E-03 | -4.518085E-03 | 3.466257E-03 | -1.644293E-03 |
| 41 | 0.000000E+00 | 0.000000E+00 | -1.906957E-02 | -1.593518E-02 | 5.673428E-03 | 5.778207E-03 |
| 42 | 0.000000E+00 | 0.000000E+00 | 1.961191E-02 | -7.205456E-02 | 7.390513E-02 | -5.550417E-02 |
| 51 | 0.000000E+00 | 0.000000E+00 | 4.183299E-02 | -6.864975E-02 | 5.462685E-02 | -3.211186E-02 |
| 52 | 0.000000E+00 | 0.000000E+00 | 1.248213E-02 | -3.111778E-02 | 1.422010E-02 | -2.718544E-03 |
| 61 | 0.000000E+00 | 0.000000E+00 | -1.519431E-02 | 8.964159E-04 | -3.820179E-03 | 2.834186E-03 |
| 62 | 0.000000E+00 | 0.000000E+00 | -3.802322E-02 | 1.794354E-02 | -9.659630E-03 | 3.642402E-03 |
| 71 | 0.000000E+00 | 0.000000E+00 | -2.199565E-02 | 5.733473E-03 | -7.630490E-04 | -2.710329E-04 |
| 72 | -6.794803E+01 | 0.000000E+00 | -1.433571E-02 | 9.067643E-03 | -2.658399E-03 | 3.193339E-04 |
| 81 | 0.000000E+00 | 0.000000E+00 | 8.547985E-03 | -6.116411E-03 | 6.416897E-04 | 8.121887E-05 |
| 82 | 0.000000E+00 | 0.000000E+00 | 1.551089E-02 | -9.359676E-03 | 1.918724E-03 | -2.154012E-04 |
| 91 | 0.000000E+00 | 0.000000E+00 | -1.819072E-02 | 4.596633E-03 | -1.282683E-03 | 2.423867E-04 |
| 92 | -1.955149E+01 | 0.000000E+00 | -1.375709E-02 | 2.055423E-03 | -3.529424E-04 | 4.303093E-05 |
| No. | $a_{12}$ | $a_{14}$ | $a_{16}$ | $a_{18}$ | $a_{20}$ | |
| 11 | 1.947447E-06 | 2.958930E-06 | -3.527093E-07 | | | |
| 12 | 2.622781E-03 | -4.261107E-04 | 2.835693E-05 | | | |
| 21 | 4.595988E-03 | -7.833803E-04 | 5.515259E-05 | | | |
| 22 | 1.425147E-03 | -7.930159E-05 | -1.170485E-05 | | | |
| 31 | -1.148047E-03 | 4.160359E-04 | -5.248506E-05 | | | |
| 32 | 5.460360E-04 | -6.065201E-05 | -7.811837E-07 | | | |
| 41 | -1.075717E-02 | 7.181935E-03 | -2.511263E-03 | 4.575370E-04 | -3.432778E-05 | |
| 42 | 2.870291E-02 | -9.804584E-03 | 2.102080E-03 | -2.555475E-04 | 1.349178E-05 | |
| 51 | 1.413365E-02 | -4.293863E-03 | 8.231727E-04 | -8.816324E-05 | 3.994744E-06 | |
| 52 | -3.504287E-04 | 3.815994E-04 | -1.090534E-04 | 1.472365E-05 | -7.767235E-07 | |
| 61 | -9.372326E-04 | 1.735738E-04 | -1.915017E-05 | 1.199625E-06 | -3.304840E-08 | |
| 62 | -8.421174E-04 | 1.177546E-04 | -9.726539E-06 | 4.364531E-07 | -8.176343E-09 | |
| 71 | 1.244561E-04 | -2.294921E-05 | 2.283720E-06 | -1.225758E-07 | 2.907143E-09 | |
| 72 | 9.111551E-07 | -4.309444E-06 | 4.659216E-07 | -2.125696E-08 | 3.692260E-10 | |
| 81 | -2.393914E-05 | 2.188842E-06 | -8.661529E-08 | 8.589060E-10 | 2.003200E-11 | |
| 82 | 1.312741E-05 | -3.096966E-07 | -9.423946E-09 | 7.504350E-10 | -1.343800E-11 | |
| 91 | -2.594110E-05 | 1.629550E-06 | -6.027286E-08 | 1.222038E-09 | -1.051800E-11 | |
| 92 | -3.540736E-06 | 1.903818E-07 | -6.351128E-09 | 1.197590E-10 | -9.830000E-13 | |

FIG. 61

| Embodiment | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| V3+V5+V8 | 167.961 | 167.961 | 167.961 | 167.961 | 149.507 | 167.961 | 167.961 | 167.961 | 167.961 | 167.961 | 167.961 | 167.961 | 167.961 | 167.961 |
| AAG/(T8+G89+T9) | 1.555 | 1.262 | 1.696 | 1.696 | 1.333 | 1.011 | 1.699 | 1.350 | 1.697 | 1.365 | 1.147 | 1.637 | 1.396 | 1.243 |
| ALT/(G12+T3) | 10.557 | 10.937 | 12.017 | 11.444 | 13.118 | 9.519 | 11.618 | 10.340 | 9.001 | 9.001 | 10.342 | 9.083 | 12.437 | 12.292 |
| TL/BFL | 7.832 | 11.042 | 9.770 | 9.016 | 9.234 | 12.674 | 8.379 | 8.450 | 7.837 | 9.909 | 7.998 | 8.126 | 6.002 | 6.228 |
| (T2+T3+T4+T6)/T1 | 1.091 | 1.212 | 1.399 | 1.041 | 1.114 | 1.725 | 1.177 | 1.337 | 1.370 | 2.595 | 1.934 | 1.368 | 1.099 | 1.082 |
| EFL/(G67+T7+G78) | 6.141 | 5.495 | 5.611 | 5.481 | 7.700 | 6.034 | 4.596 | 5.773 | 5.678 | 6.483 | 7.700 | 5.679 | 6.085 | 7.171 |
| V2+V3+V4 | 94.473 | 94.473 | 112.763 | 94.473 | 94.473 | 94.473 | 94.473 | 94.473 | 94.473 | 94.473 | 94.473 | 94.473 | 94.473 | 94.473 |
| AAG/(T1+G89) | 1.332 | 1.300 | 1.376 | 1.400 | 1.241 | 1.328 | 2.089 | 1.304 | 1.399 | 1.336 | 1.424 | 1.379 | 1.263 | 1.277 |
| ALT/(G23+G34+G67) | 2.716 | 3.663 | 3.388 | 2.665 | 3.962 | 5.998 | 2.332 | 3.723 | 3.373 | 4.521 | 5.301 | 3.485 | 3.429 | 3.419 |
| TL/(T1+G34) | 4.051 | 4.672 | 4.325 | 4.520 | 4.272 | 6.997 | 4.846 | 4.419 | 4.227 | 5.259 | 5.375 | 4.245 | 4.442 | 4.560 |
| T5/(G12+G56) | 1.574 | 1.179 | 1.001 | 1.174 | 1.326 | 1.001 | 1.005 | 1.596 | 1.369 | 2.658 | 1.852 | 1.368 | 2.337 | 2.177 |
| EFL/(AAG+BFL) | 1.667 | 1.884 | 1.698 | 1.487 | 1.782 | 1.864 | 1.587 | 1.830 | 1.689 | 1.892 | 1.778 | 1.705 | 1.751 | 1.940 |
| V3+V6+V9 | 132.347 | 132.347 | 132.347 | 132.347 | 132.347 | 132.347 | 132.347 | 132.347 | 149.507 | 132.347 | 132.347 | 131.052 | 132.347 | 132.347 |
| ALT/(T7+G78) | 7.454 | 7.113 | 6.601 | 6.601 | 8.436 | 6.601 | 6.601 | 7.359 | 6.601 | 8.002 | 7.237 | 6.601 | 7.555 | 8.956 |
| ALT/(G56+T9) | 8.883 | 5.374 | 7.347 | 6.498 | 6.464 | 7.470 | 5.330 | 6.644 | 7.630 | 12.890 | 5.433 | 7.453 | 6.521 | 5.000 |
| TTL/(T1+G67+T7) | 3.751 | 3.600 | 3.745 | 3.751 | 4.173 | 4.606 | 3.796 | 3.810 | 3.869 | 4.764 | 5.953 | 3.864 | 3.785 | 3.957 |
| (T3+G45+T8)/T5 | 2.043 | 2.141 | 1.843 | 1.481 | 1.852 | 2.998 | 2.641 | 1.852 | 1.669 | 1.887 | 1.585 | 1.717 | 1.462 | 1.677 |
| BFL/(T2+G45+G78) | 2.266 | 1.801 | 1.801 | 1.977 | 1.805 | 1.801 | 1.808 | 2.368 | 2.126 | 1.788 | 1.790 | 2.090 | 2.971 | 2.898 |
| (G34+T4+T6)/T7 | 2.611 | 1.940 | 2.505 | 2.108 | 2.557 | 1.556 | 2.177 | 2.461 | 2.438 | 3.599 | 3.564 | 2.368 | 2.100 | 2.393 |
| (T1+G12+T2)/T7 | 2.950 | 2.377 | 2.353 | 2.598 | 3.099 | 1.695 | 2.280 | 2.464 | 2.405 | 2.106 | 2.579 | 2.347 | 2.643 | 3.100 |
| TL/(G23+T5+G67) | 5.697 | 6.035 | 6.297 | 5.153 | 6.366 | 6.905 | 4.417 | 6.044 | 5.963 | 6.758 | 6.984 | 6.109 | 5.016 | 5.199 |
| EFL/Fno | 3.301 | 7.452 | 3.985 | 3.955 | 4.102 | 3.793 | 4.068 | 3.705 | 3.686 | 3.631 | 3.606 | 3.659 | 4.232 | 4.230 |
| ImgH/Fno | 3.000 | 3.750 | 3.750 | 3.750 | 3.750 | 3.750 | 3.750 | 1.625 | 3.250 | 3.125 | 3.250 | 3.250 | 3.625 | 3.201 |
| TTL/Fno | 3.911 | 9.375 | 5.145 | 5.056 | 5.162 | 5.097 | 5.215 | 4.707 | 4.677 | 4.788 | 4.785 | 4.672 | 5.183 | 4.695 |
| \|V6-V7\| | 35.614 | 35.614 | 35.614 | 35.614 | 35.614 | 35.614 | 35.614 | 35.614 | 18.454 | 35.614 | 17.160 | 18.454 | 35.614 | 35.614 |
| \|V2-V6\| | 1.130 | 1.130 | 1.130 | 1.130 | 1.130 | 1.130 | 1.130 | 1.130 | 18.290 | 1.130 | 1.130 | 18.290 | 1.130 | 1.130 |
| V3+V4+V7 | 131.217 | 131.217 | 149.507 | 131.217 | 131.217 | 131.217 | 131.217 | 131.217 | 131.217 | 131.217 | 112.763 | 131.217 | 131.217 | 131.217 |
| V1+V2+V4 | 94.473 | 94.473 | 112.763 | 94.473 | 94.473 | 94.473 | 94.473 | 94.473 | 94.473 | 94.473 | 94.473 | 94.473 | 94.473 | 94.473 |

FIG. 62

OPTICAL IMAGING LENS

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, a personal digital assistant (PDA), or a head mounted display (AR, VR, MR) for taking pictures or for recording videos.

2. Description of the Prior Art

In recent years, the optical imaging lens has been evolving and applied in a wider range. In addition to requiring the lens to be thinner and shorter, a smaller f-number (Fno) is conducive to improving the luminous flux of the optical imaging lens, and it has gradually become a trend to design a larger field of view. In addition, in order to improve the pixel and resolution, it is necessary to increase the image height of the lens and adopt a larger image sensor to receive the imaging rays to meet the high pixel demand.

Therefore, how to design an optical imaging lens which is light, thin, short, having small f-number, having large image height and good in imaging quality has become a problem to be challenged and solved.

SUMMARY OF THE INVENTION

In light of the above, the present invention proposes an optical imaging lens of nine lens elements which has smaller Fno, larger image height and good imaging quality. The optical imaging lens of nine lens elements of the present invention from an object side to an image side in order along an optical axis has a first lens element, a second lens element, a third lens element, a fourth lens element, a fifth lens element, a sixth lens element, a seventh lens element, an eight lens element and a ninth lens element. Each of the first lens element, second lens element, third lens element, fourth lens element, fifth lens element, sixth lens element, seventh lens element, eighth lens element and ninth lens element respectively has an object-side surface which faces toward the object side to allow imaging rays to pass through as well as an image-side surface which faces toward the image side to allow the imaging rays to pass through.

In one embodiment of the present invention, a periphery region of the image-side surface of the first lens element is concave, the second lens element has negative refracting power, the eighth lens element has negative refracting power, an optical axis region of the object-side surface of the ninth lens element is concave, wherein lens elements included by the optical imaging lens are only the nine lens elements described above, and wherein the optical imaging lens satisfies the distance from the object-side surface of the first lens element to an image plane along the optical axis is less than or equal to 15.000 mm.

In another embodiment of the present invention, the third lens element has positive refracting power, the seventh lens element has positive refracting power, an optical axis region of the object-side surface of the ninth lens element is concave, and an optical axis region of the image-side surface of the ninth lens element is concave, wherein lens elements included by the optical imaging lens are only the nine lens elements described above, and wherein the optical imaging lens satisfies the distance from the object-side surface of the first lens element to an image plane along the optical axis is less than or equal to 15.000 mm.

In another embodiment of the present invention, an optical axis region of the object-side surface of the fourth lens element is concave, the seventh lens element has positive refracting power, and a periphery region of the object-side surface of the seventh lens element is concave, a periphery region of the object-side surface of the ninth lens element is convex, and an optical axis region of the image-side surface of the ninth lens element is concave, wherein lens elements included by the optical imaging lens are only the nine lens elements described above.

In the optical imaging lens of the present invention, the embodiments may also selectively satisfy the following optical conditions:

$$V3+V5+V8 \geq 140.000;$$

$$AAG/(T8+G89+T9) \leq 1.700;$$

$$ALT/(G12+T3) \geq 9.000;$$

$$TL/BFL \geq 6.000;$$

$$(T2+T3+T4+T6)/T1 \leq 2.600;$$

$$EFL/(G67+T7+G78) \leq 7.700;$$

$$V2+V3+V4 \leq 120.000;$$

$$AAG/(T1+G89) \leq 2.100;$$

$$ALT/(G23+G34+G67) \leq 6.000;$$

$$TL/(T1+G34) \leq 7.000;$$

$$T5/(G12+G56) \geq 1.000;$$

$$EFL/(AAG+BFL) \geq 1.200;$$

$$V3+V6+V9 \geq 120.000;$$

$$ALT/(T7+G78) \geq 6.600;$$

$$ALT/(G56+T9) \geq 5.000;$$

$$TTL/(T1+G67+T7) \leq 6.000; \text{ and}$$

$$(T3+G45+T8)/T5 \leq 3.000.$$

In the present invention, T1 is a thickness of the first lens element along the optical axis, T2 is a thickness of the second lens element along the optical axis, T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, T7 is a thickness of the seventh lens element along the optical axis, T8 is a thickness of the eighth lens element along the optical axis, T9 is a thickness of the ninth lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis, G78 is an air gap between the seventh lens element and the eighth lens element along the optical axis, G89 is an air gap between the eighth lens element and the ninth lens element along the optical axis, ALT is a sum of the thicknesses of nine lens elements from the first lens element to the ninth lens element along the optical axis, TL is a distance from the object-side surface of the first lens element to the image-side surface of the ninth lens element along the optical axis, TTL is the distance from the object-side surface of the first lens element to an image plane along the optical axis, BFL is a distance from the image-side surface of the ninth lens element to an image plane along the optical axis, AAG is a sum of eight air gaps from the first lens element to the ninth lens element along the optical axis, EFL is an effective focal length of the optical imaging lens, ImgH is an image height of the optical imaging lens, and Fno is a f-number of the optical imaging lens.

Besides, an Abbe number of the first lens element is V1; an Abbe number of the second lens element is V2; an Abbe number of the third lens element is V3; an Abbe number of the fourth lens element is V4; an Abbe number of the fifth lens element is V5; an Abbe number of the sixth lens element is V6; an Abbe number of the seventh lens element is V7, an Abbe number of the eighth lens element is V8, and an Abbe number of the ninth lens element is V9.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 24 illustrates a tenth embodiment of the optical imaging lens of the present invention.

FIG. 25A illustrates the longitudinal spherical aberration on the image plane of the tenth embodiment.

FIG. 25B illustrates the field curvature aberration on the sagittal direction of the tenth embodiment.

FIG. 25C illustrates the field curvature aberration on the tangential direction of the tenth embodiment.

FIG. 25D illustrates the distortion of the tenth embodiment.

FIG. 32 illustrates a fourteenth embodiment of the optical imaging lens of the present invention.

FIG. 33A illustrates the longitudinal spherical aberration on the image plane of the fourteenth embodiment.

FIG. 33B illustrates the field curvature aberration on the sagittal direction of the fourteenth embodiment.

FIG. 33C illustrates the field curvature aberration on the tangential direction of the fourteenth embodiment.

FIG. 33D illustrates the distortion of the twelfth embodiment.

FIG. 34 shows the optical data of the first embodiment of the optical imaging lens.

FIG. 35 shows the aspheric surface data of the first embodiment.

FIG. 36 shows the optical data of the second embodiment of the optical imaging lens.

FIG. 37 shows the aspheric surface data of the second embodiment.

FIG. 38 shows the optical data of the third embodiment of the optical imaging lens.

FIG. 39 shows the aspheric surface data of the third embodiment.

FIG. 40 shows the optical data of the fourth embodiment of the optical imaging lens.

FIG. 41 shows the aspheric surface data of the fourth embodiment.

FIG. 42 shows the optical data of the fifth embodiment of the optical imaging lens.

FIG. 43 shows the aspheric surface data of the fifth embodiment.

FIG. 44 shows the optical data of the sixth embodiment of the optical imaging lens.

FIG. 45 shows the aspheric surface data of the sixth embodiment.

FIG. 46 shows the optical data of the seventh embodiment of the optical imaging lens.

FIG. 47 shows the aspheric surface data of the seventh embodiment.

FIG. 48 shows the optical data of the eighth embodiment of the optical imaging lens.

FIG. 49 shows the aspheric surface data of the eighth embodiment.

FIG. 50 shows the optical data of the ninth embodiment of the optical imaging lens.

FIG. 51 shows the aspheric surface data of the ninth embodiment.

FIG. 52 shows the optical data of the tenth embodiment of the optical imaging lens.

FIG. 53 shows the aspheric surface data of the tenth embodiment.

FIG. 54 shows the optical data of the eleventh embodiment of the optical imaging lens.

FIG. 55 shows the aspheric surface data of the eleventh embodiment.

FIG. 56 shows the optical data of the twelfth embodiment of the optical imaging lens.

FIG. 57 shows the aspheric surface data of the twelfth embodiment.

FIG. 58 shows the optical data of the thirteenth embodiment of the optical imaging lens.

FIG. 59 shows the aspheric surface data of the thirteenth embodiment.

FIG. 60 shows the optical data of the fourteenth embodiment of the optical imaging lens.

FIG. 61 shows the aspheric surface data of the fourteenth embodiment.

FIG. 62 shows some important ratios in the embodiments.

DETAILED DESCRIPTION

The terms "optical axis region", "periphery region", "concave", and "convex" used in this specification and claims should be interpreted based on the definition listed in the specification by the principle of lexicographer.

Figure 1:
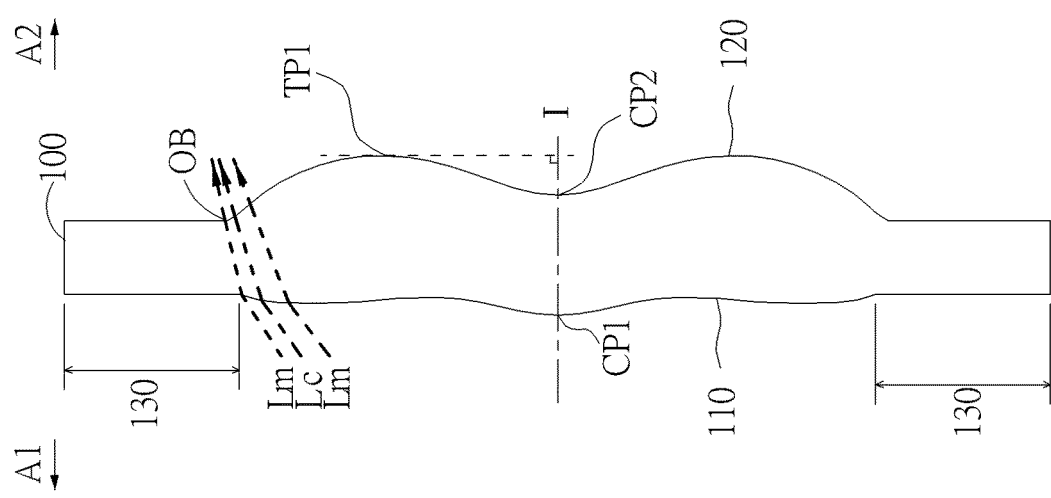

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
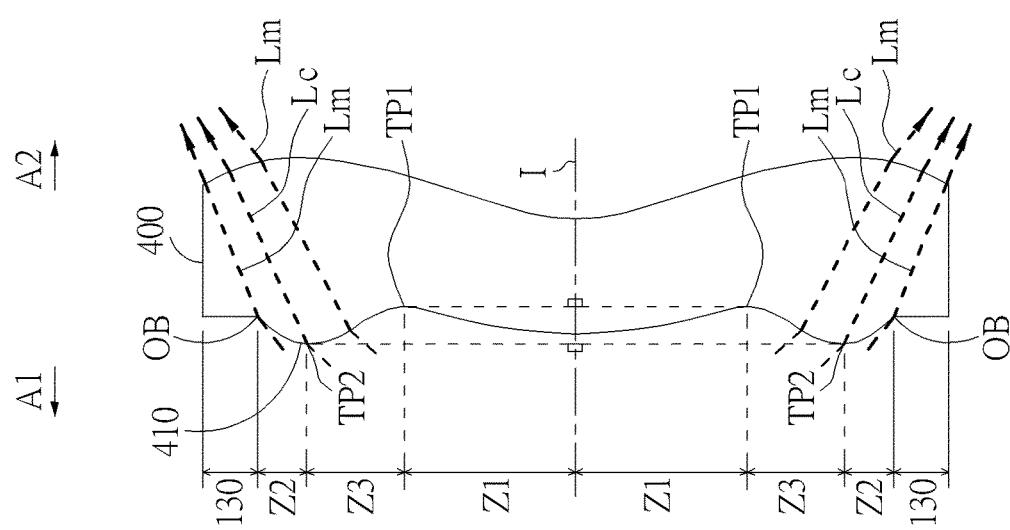

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
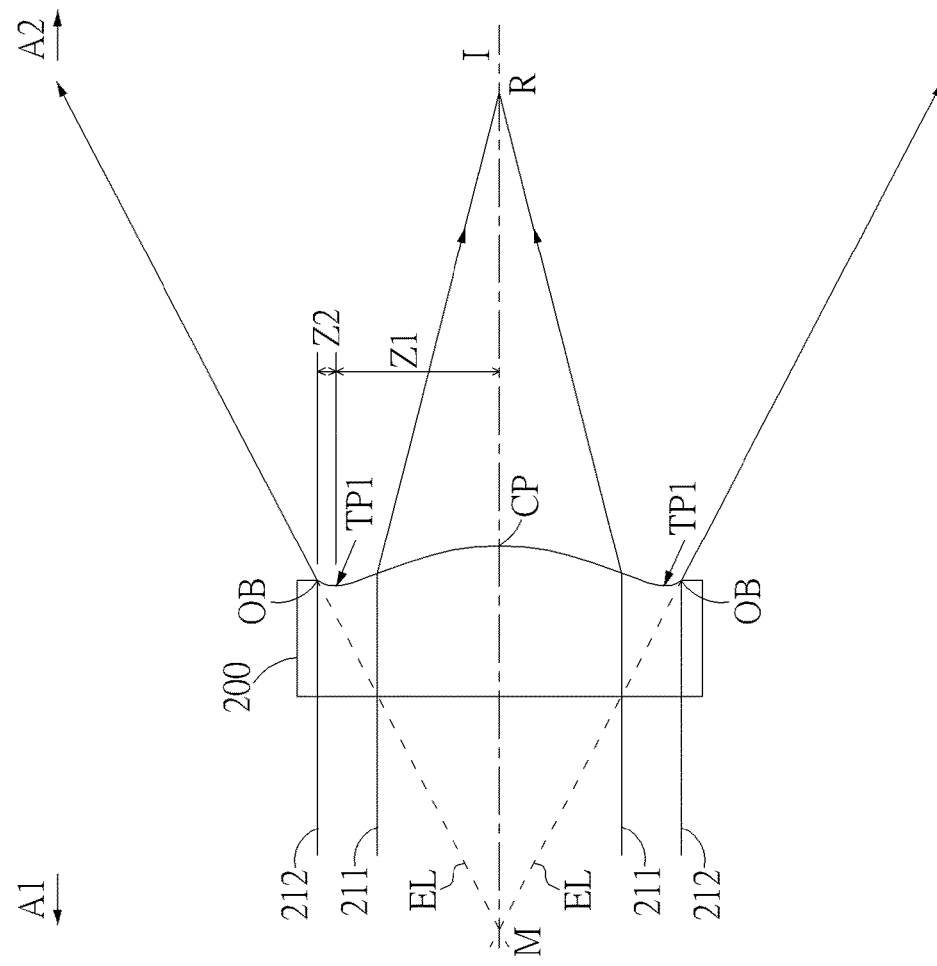
FIGS. 1-5 illustrate the methods for determining the surface shapes and for determining optical axis region or periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 3:
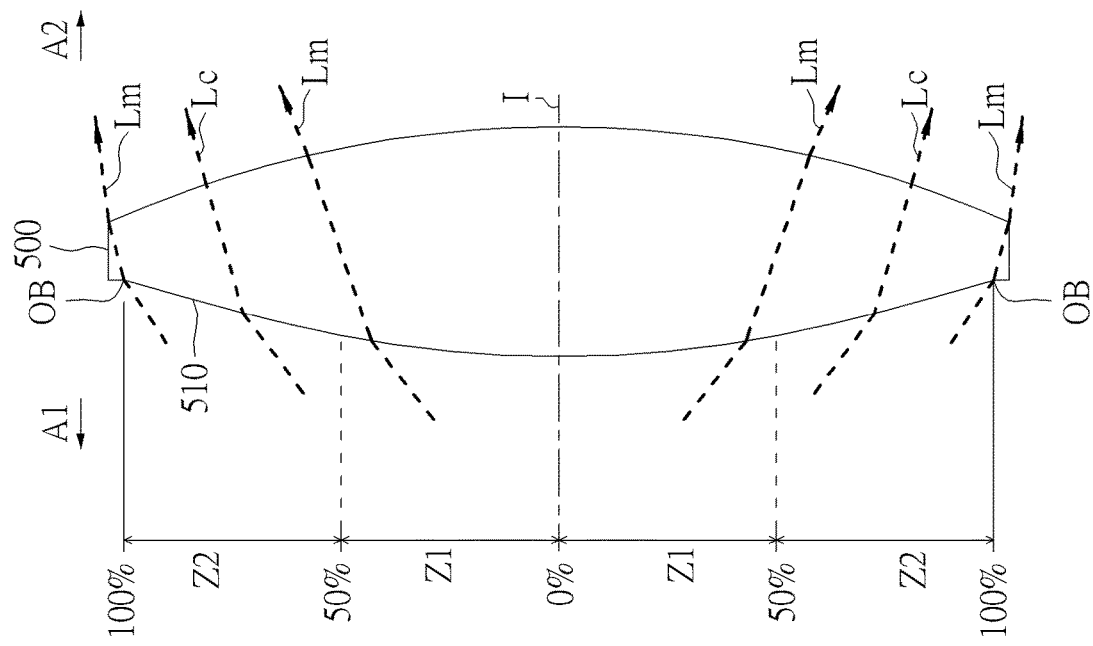
Figure 5:
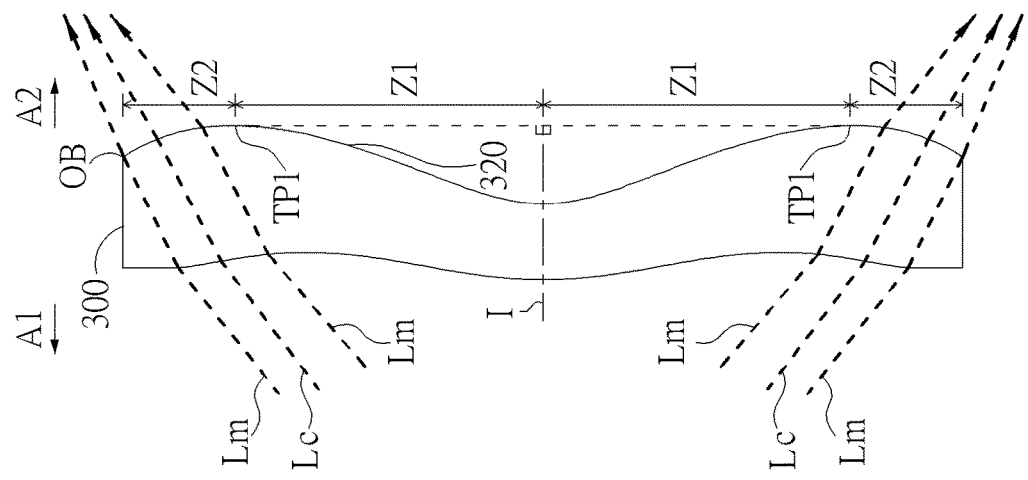

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
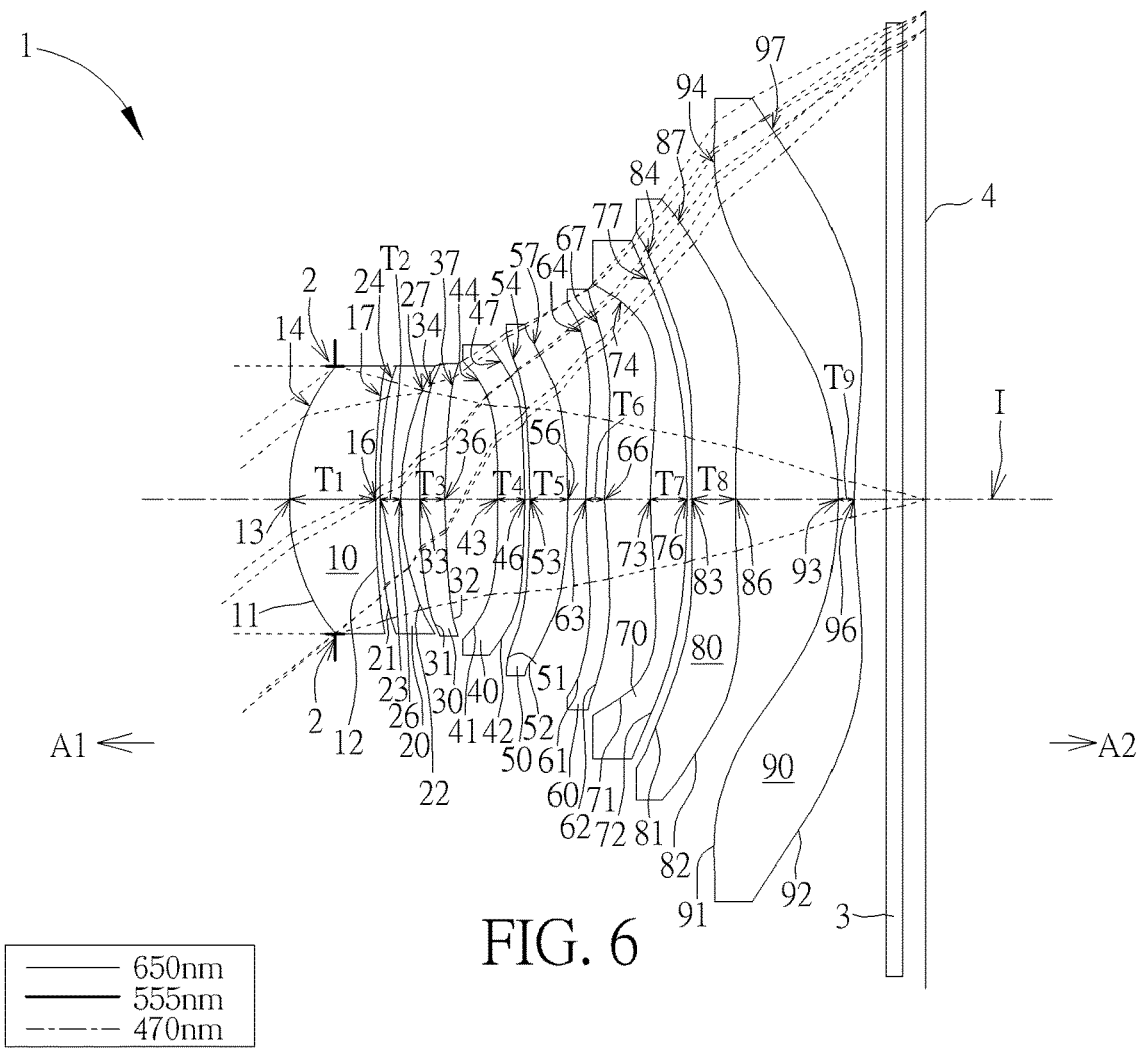
FIG. 6 illustrates a first embodiment of the optical imaging lens of the present invention.

As shown in FIG. 6, the optical imaging lens 1 of eight lens elements of the present invention, sequentially located from an object side A1 (where an object is located) to an image side A2 along an optical axis I, has an aperture stop (ape. stop) 2, a first lens element 10, a second lens element 20, a third lens element 30, a fourth lens element 40, a fifth lens element 50, a sixth lens element 60, a seventh lens element 70, an eighth lens element 80, a ninth lens element 90, a filter 3 and an image plane 4. Generally speaking, the first lens element 10, the second lens element 20, the third lens element 30, the fourth lens element 40, the fifth lens element 50, the sixth lens element 60, the seventh lens element 70, the eighth lens element 80 and the ninth lens element 90 may be made of a transparent plastic material but the present invention is not limited to this, and each has an appropriate refracting power. In the present invention, lens elements having refracting power included by the optical imaging lens 1 are only the nine lens elements described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 2 disposed in an appropriate position. In FIG. 6, the aperture stop 2 is disposed between the first lens element 10 and object side A1. When light emitted or reflected by an object (not shown) which is located at the object side A1 enters the optical imaging lens 1 of the present invention, it forms a clear and sharp image on the image plane 4 at the image side A2 after passing through the aperture stop 2, the first lens element 10, the second lens element 20, the third lens element 30, the fourth lens element 40, the fifth lens element 50, the sixth lens element 60, the seventh lens element 70, the eighth lens element 80, the ninth lens element 90 and the filter 3. In one embodiment of the present invention, the optional filter 3 may be a filter of various suitable functions, for example, the filter 3 may be an infrared cut-off filter (IR cut filter), placed between the ninth lens element 90 and the image plane 4.

Each lens element in the optical imaging lens 1 of the present invention has an object-side surface facing toward the object side A1 as well as an image-side surface facing toward the image side A2. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; the seventh lens element 70 has an object-side surface 71 and an image-side surface 72; the eighth lens element 80 has an object-side surface 81 and an image-side surface 82; and the ninth lens element 90 has an object-side surface 91 and an image-side surface 92. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element light thickness T7, the eighth lens element 80 has an eighth lens element thickness T8, the ninth lens element 90 has an ninth lens element thickness T9. Therefore, the sum of the thicknesses of nine lens elements from the first lens element 10 to the ninth lens element 90 in the optical imaging lens 1 along the optical axis I is ALT=T1+T2+T3+T4+T5+T6+T7+T8+T9.

In addition, between two adjacent lens elements in the optical imaging lens 1 of the present invention there may be an air gap along the optical axis I. For example, there is an air gap G12 between the first lens element 10 and the second lens element 20, an air gap G23 between the second lens element 20 and the third lens element 30, an air gap G34 between the third lens element 30 and the fourth lens element 40, an air gap G45 between the fourth lens element 40 and the fifth lens element 50, an air gap G56 between the fifth lens element 50 and the sixth lens element 60, an air gap G67 between the sixth lens element 60 and the seventh lens element 70, an air gap G78 between the seventh lens element 70 and the eighth lens element 80, and an air gap G89 between the eighth lens element 80 and the ninth lens element 90. Therefore, the sum of eight air gaps from the first lens element 10 to the ninth lens element 90 along the optical axis I is AAG=G12+G23+G34+G45+G56+G67+G78+G89.

In addition, a distance from the object-side surface 11 of the first lens element 10 to the image plane 4 along the optical axis I is TTL, namely a system length of the optical imaging lens 1; an effective focal length of the optical imaging lens 1 is EFL; a distance from the object-side surface 11 of the first lens element 10 to the image-side surface 92 of the ninth lens element 90 along the optical axis I is TL; HFOV stands for the half field of view which is half of the field of view of the entire optical imaging lens 1; ImgH is an image height of the optical imaging lens 1, and Fno is a f-number of the optical imaging lens 1.

When the filter 3 is placed between the ninth lens element 90 and the image plane 4, an air gap between the ninth lens element 90 and the filter 3 along the optical axis I is G9F; a thickness of the filter 3 along the optical axis I is TF; an air gap between the filter 3 and the image plane 4 along the optical axis I is GFP; and a distance from the image-side surface 92 of the ninth lens element 90 to the image plane 4 along the optical axis I is BFL. Therefore, BFL=G9F+TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a focal length of the sixth lens element 60 is f6; a focal length of the seventh lens element 70 is f7; a focal length of the eighth lens element 80 is f8; a focal length of the ninth lens element 90 is f9; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; a refractive index of the sixth lens element 60 is n6; a refractive index of the seventh lens element 70 is n7; a refractive index of the eighth lens element 80 is n8; a refractive index of the ninth lens element 90 is n9; an Abbe number of the first lens element 10 is V1; an Abbe number of the second lens element 20 is V2; an Abbe number of the third lens element 30 is V3; and an Abbe number of the fourth lens element 40 is V4; an Abbe number of the fifth lens element 50 is V5; an Abbe number of the sixth lens element 60 is V6; an Abbe number of the seventh lens element 70 is V7; an Abbe number of the eighth lens element 80 is V8; and an Abbe number of the ninth lens element 90 is V9.

First Embodiment

Figure 7A:
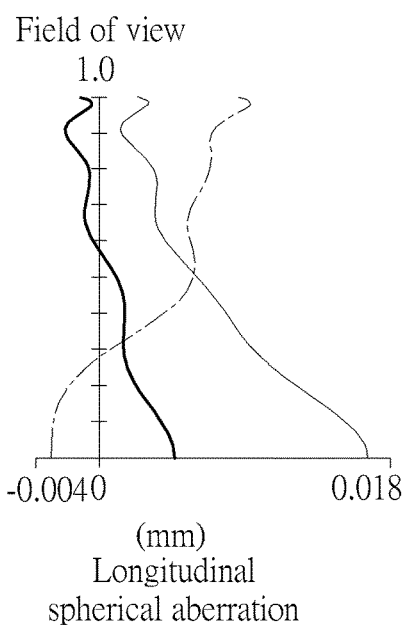
FIG. 7A illustrates the longitudinal spherical aberration on the image plane of the first embodiment.
Figures 7B, 7C, 7D:
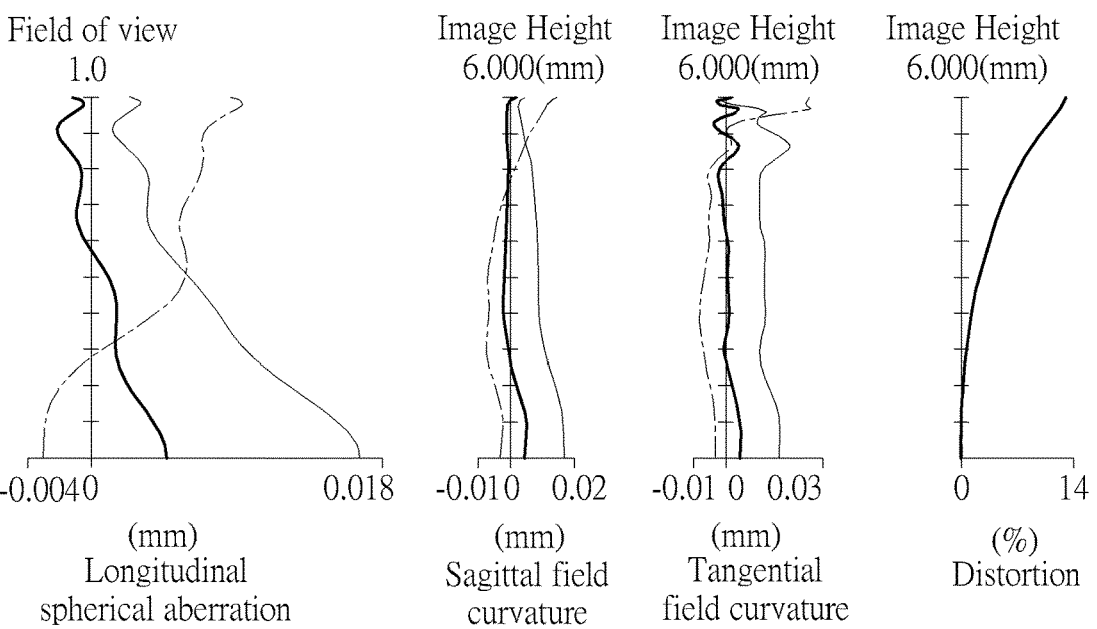
FIG. 7B illustrates the field curvature aberration on the sagittal direction of the first embodiment.
FIG. 7C illustrates the field curvature aberration on the tangential direction of the first embodiment.
FIG. 7D illustrates the distortion of the first embodiment.

Please refer to FIG. 6 which illustrates the first embodiment of the optical imaging lens 1 of the present invention. Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the astigmatic field and the distortion in each embodiment stands for "image height" (ImgH), and the image height in the first embodiment is 6.000 mm.

Lens elements in the optical imaging lens 1 of the first embodiment are only the nine lens elements 10, 20, 30, 40, 50, 60, 70, 80 and 90 with refracting power. The optical imaging lens 1 also has an aperture stop 2 and an image plane 4. The aperture stop 2 is provided between the first lens element 10 and the object side A1.

The first lens element 10 has positive refracting power. An optical axis region 13 of the object-side surface 11 of the first lens element 10 is convex, and a periphery region 14 of the object-side surface 11 of the first lens element 10 is convex. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspheric surfaces, but it is not limited thereto.

The second lens element 20 has negative refracting power. An optical axis region 23 of the object-side surface 21 of the second lens element 20 is convex, and a periphery region 24 of the object-side surface 21 of the second lens element 20 is convex. An optical axis region 26 of the image-side surface 22 of the second lens element 20 is concave, and a periphery region 27 of the image-side surface 22 of the second lens element 20 is concave. Besides, both the object-side surface 21 and the image-side surface 22 of the second lens element 20 are aspheric surfaces, but it is not limited thereto.

The third lens element 30 has positive refracting power. An optical axis region 33 of the object-side surface 31 of the third lens element 30 is convex, and a periphery region 34 of the object-side surface 31 of the third lens element 30 is convex. An optical axis region 36 of the image-side surface 32 of the third lens element 30 is concave, and a periphery region 37 of the image-side surface 32 of the third lens element 30 is concave. Besides, both the object-side surface 31 and the image-side surface 32 of the third lens element 30 are aspheric surfaces, but it is not limited thereto.

The fourth lens element 40 has negative refracting power. An optical axis region 43 of the object-side surface 41 of the fourth lens element 40 is concave, and a periphery region 44 of the object-side surface 41 of the fourth lens element 40 is concave. An optical axis region 46 of the image-side surface 42 of the fourth lens element 40 is convex, and a periphery region 47 of the image-side surface 42 of the fourth lens element 40 is convex. Besides, both the object-side surface 41 and the image-side surface 42 of the fourth lens element 40 are aspheric surfaces, but it is not limited thereto.

The fifth lens element 50 has positive refracting power. An optical axis region 53 of the object-side surface 51 of the fifth lens element 50 is concave, and a periphery region 54 of the object-side surface 51 of the fifth lens element 50 is concave. An optical axis region 56 of the image-side surface 52 of the fifth lens element 50 is convex, and a periphery region 57 of the image-side surface 52 of the fifth lens element 50 is convex. Besides, both the object-side surface 51 and the image-side surface 52 of the fifth lens element 50 are aspheric surfaces, but it is not limited thereto.

The sixth lens element 60 has negative refracting power. An optical axis region 63 of the object-side surface 61 of the sixth lens element 60 is convex, and a periphery region 64 of the object-side surface 61 of the sixth lens element 60 is concave. An optical axis region 66 of the image-side surface 62 of the sixth lens element 60 is concave, and a periphery region 67 of the image-side surface 62 of the sixth lens element 60 is convex. Besides, both the object-side surface 61 and the image-side surface 62 of the sixth lens element 60 are aspheric surfaces, but it is not limited thereto.

The seventh lens element 70 has positive refracting power. An optical axis region 73 of the object-side surface 71 of the seventh lens element 70 is convex, and a periphery region 74 of the object-side surface 71 of the seventh lens element 70 is concave. An optical axis region 76 of the image-side surface 72 of the seventh lens element 70 is convex, and a periphery region 77 of the image-side surface 72 of the seventh lens element 70 is convex. Besides, both the object-side surface 71 and the image-side surface 72 of the seventh lens element 70 are aspheric surfaces, but it is not limited thereto.

The eighth lens element 80 has negative refracting power. An optical axis region 83 of the object-side surface 81 of the eighth lens element 80 is concave, and a periphery region 84 of the object-side surface 81 of the eighth lens element 80 is concave. An optical axis region 86 of the image-side surface 82 of the eighth lens element 80 is concave, and a periphery region 87 of the image-side surface 82 of the eighth lens element 80 is convex. Besides, both the object-side surface 81 and the image-side surface 82 of the eighth lens element 80 are aspheric surfaces, but it is not limited thereto.

The ninth lens element 90 has negative refracting power. An optical axis region 93 of the object-side surface 91 of the ninth lens element 90 is concave, and a periphery region 94 of the object-side surface 91 of the ninth lens element 90 is convex. An optical axis region 96 of the image-side surface 92 of the ninth lens element 90 is concave, and a periphery region 97 of the image-side surface 92 of the ninth lens element 90 is convex. Besides, both the object-side surface 91 and the image-side surface 92 of the ninth lens element 90 are aspheric surfaces, but it is not limited thereto.

The first lens element 10, the second lens element 20, the third lens element 30, the fourth lens element 40, the fifth lens element 50, the sixth lens element 60, the seventh lens element 70, the eighth lens element 80 and the ninth lens element 90 of the optical imaging lens 1 of the present invention, there are 18 surfaces, such as the object-side surfaces 11/21/31/41/51/61/71/81/91 and the image-side surfaces 12/22/32/42/52/62/72/82/92. If a surface is aspheric, these aspheric coefficients are defined according to the following formula:

$$Z(Y) = \frac{Y^2}{R} \Bigg/ \left(1 + \sqrt{1 - (1+K)\frac{Y^2}{R^2}}\right) + \sum_{j=1}^{n} a_{2i} \times Y^{2i}$$

In which:
Y represents a perpendicular distance from a point on the aspheric surface to the optical axis;
Z represents the depth of an aspheric surface (the perpendicular distance between the point of the aspheric surface at a distance Y from the optical axis and the tangent plane of the vertex on the optical axis of the aspheric surface);
R represents the radius of curvature of the lens element surface;
K is a conic constant; and
$a_{2i}$ is the aspheric coefficient of the $2i^{th}$ order.

The optical data of the first embodiment of the optical imaging lens 1 are shown in FIG. 34 while the aspheric surface data are shown in FIG. 35. In the present embodiments of the optical imaging lens, the f-number of the entire optical imaging lens is Fno, EFL is the effective focal length, HFOV stands for the half field of view which is half of the field of view of the entire optical imaging lens, and the unit for the radius of curvature, the thickness and the focal length is in millimeters (mm). In this embodiment, EFL=6.602 mm; HFOV=38.836 degrees; TTL=7.822 mm; Fno=2.000; ImgH=6.000 mm.

Second Embodiment

Figure 8:
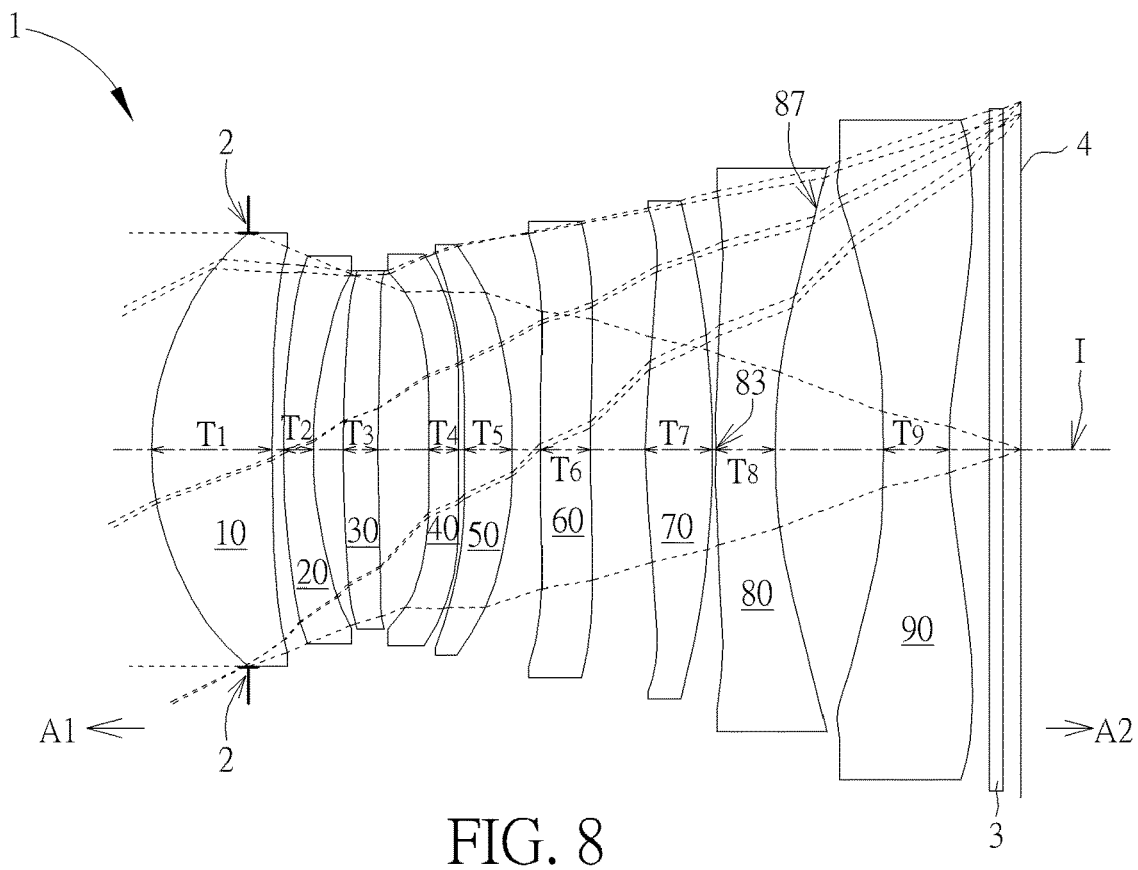
FIG. 8 illustrates a second embodiment of the optical imaging lens of the present invention.
Figures 9A, 9B, 9C, 9D:
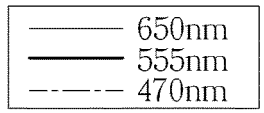
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the optical axis region and the periphery region will be omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 83 of the object-side surface 81 of the eighth lens element 80 is convex, the periphery region 87 of the image-side surface 82 of the eighth lens element 80 is concave.

The optical data of the second embodiment of the optical imaging lens are shown in FIG. 36 while the aspheric surface data are shown in FIG. 37. In this embodiment, EFL=11.923 mm; HFOV=26.578 degrees; TTL=14.999 mm; Fno=1.600; ImgH=6.000 mm. In particular: 1. The distortion aberration in this embodiment is smaller than the distortion aberration in the first embodiment; 2. The Fno in this embodiment is smaller than the Fno in the first embodiment.

Third Embodiment

Figure 10:
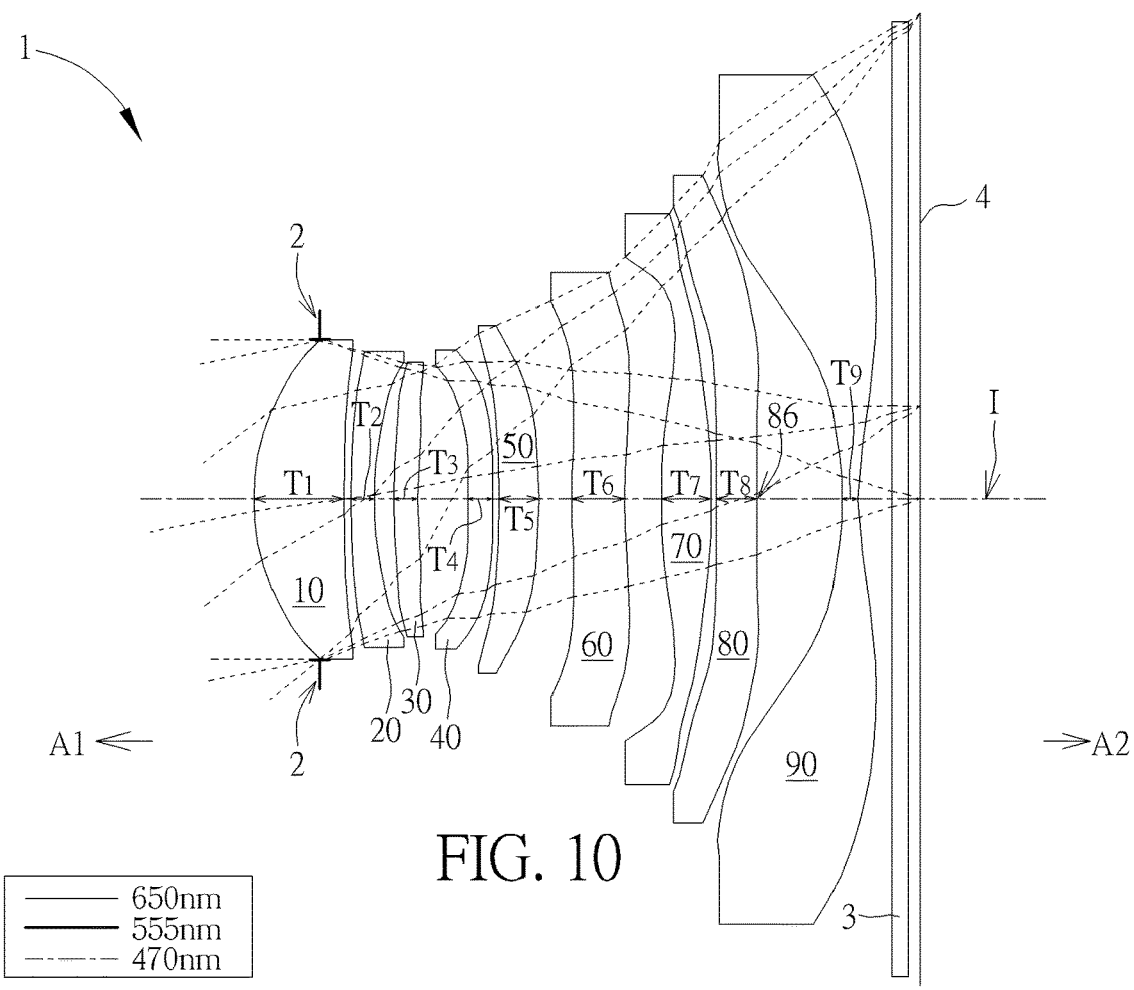
FIG. 10 illustrates a third embodiment of the optical imaging lens of the present invention.
Figures 11A, 11B, 11C, 11D:
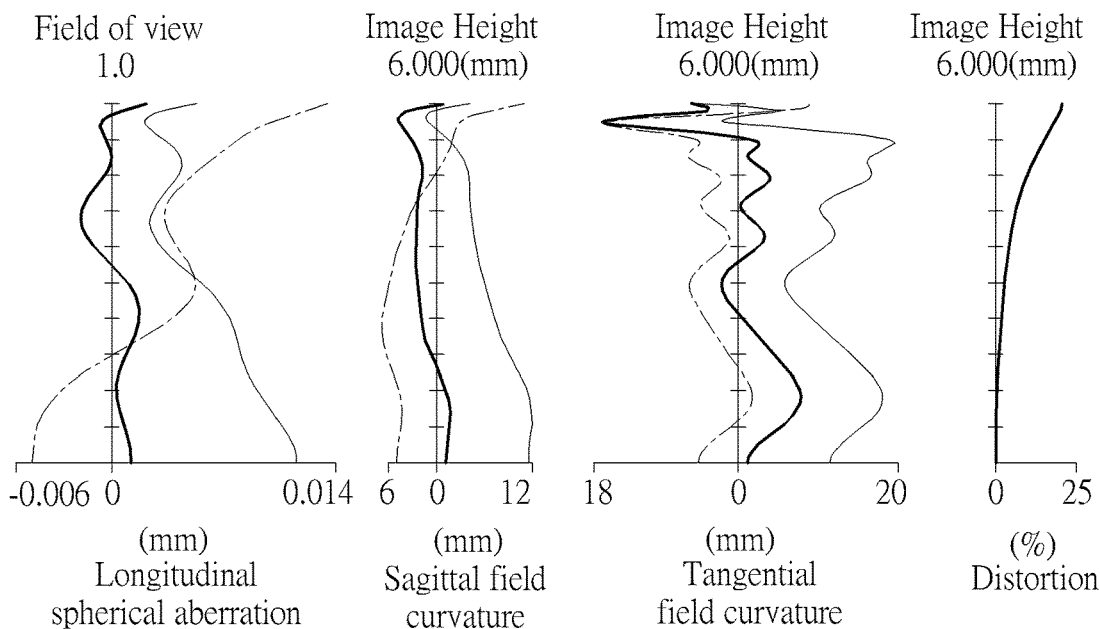
FIG. 11A illustrates the longitudinal spherical aberration on the image plane of the third embodiment.
FIG. 11B illustrates the field curvature aberration on the sagittal direction of the third embodiment.
FIG. 11C illustrates the field curvature aberration on the tangential direction of the third embodiment.
FIG. 11D illustrates the distortion of the third embodiment.

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the eighth lens element 80 has positive refracting power, the optical axis region 86 of the image-side surface 82 of the eighth lens element 80 is convex.

The optical data of the third embodiment of the optical imaging lens are shown in FIG. 38 while the aspheric surface data are shown in FIG. 39. In this embodiment, EFL=6.376 mm; HFOV=37.947 degrees; TTL=8.231 mm; Fno=1.600; ImgH=6.000 mm. In particular: 1. The longitudinal spherical aberration in this embodiment is smaller than the longitudinal spherical aberration in the first embodiment; 2. The field curvature aberration on the sagittal direction in this embodiment is smaller than the field curvature aberration on the sagittal direction in the first embodiment; 3. The field curvature aberration on the tangential direction in this embodiment is smaller than the field curvature aberration on the tangential direction in the first embodiment; 4. The Fno in this embodiment is smaller than the Fno in the first embodiment.

Fourth Embodiment

Figure 12:
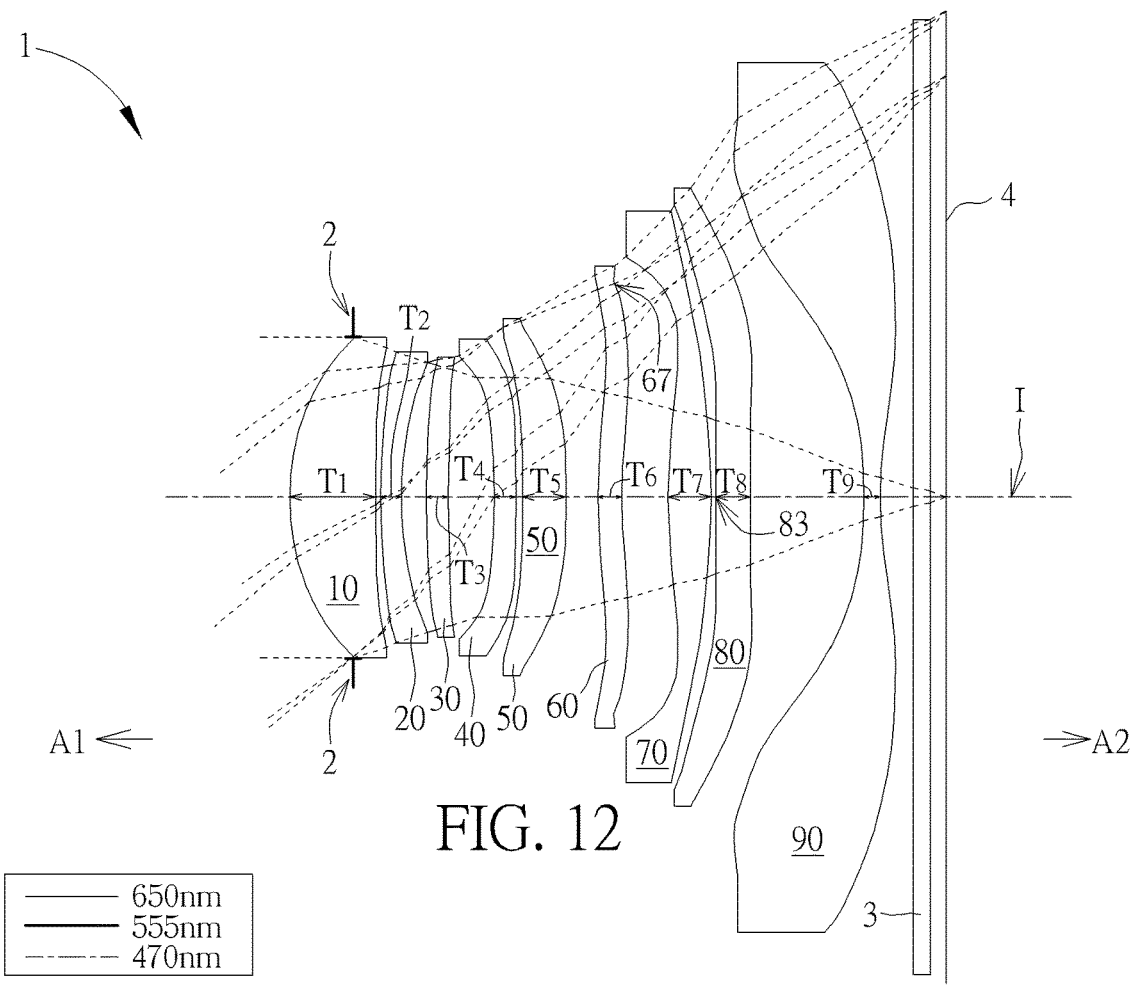
FIG. 12 illustrates a fourth embodiment of the optical imaging lens of the present invention.
Figures 13A, 13B, 13C, 13D:
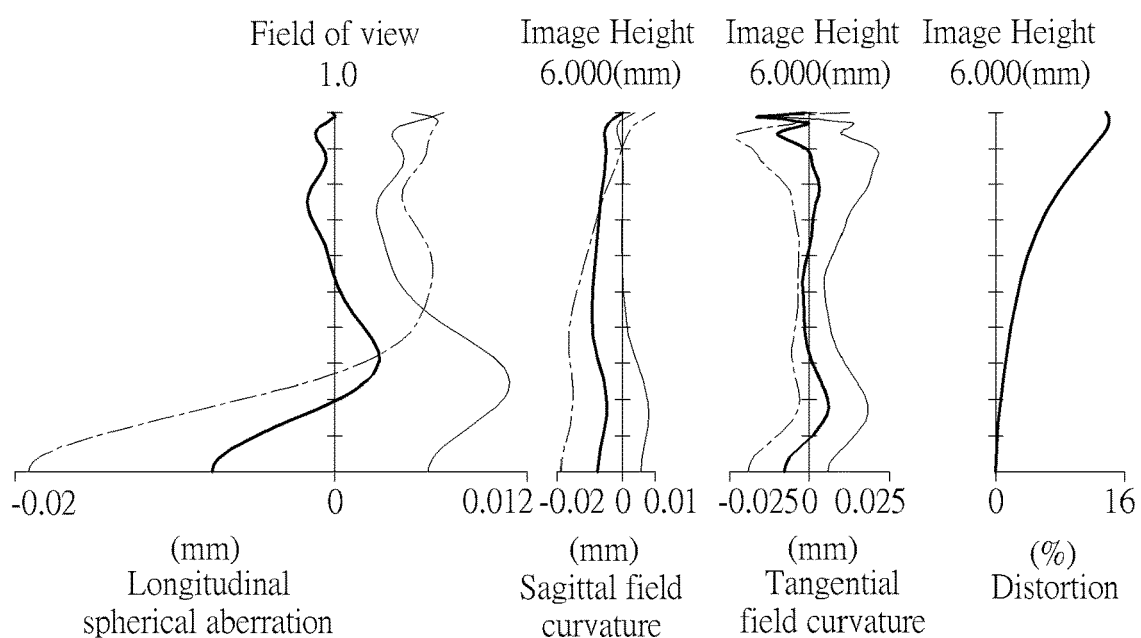
FIG. 13A illustrates the longitudinal spherical aberration on the image plane of the fourth embodiment.
FIG. 13B illustrates the field curvature aberration on the sagittal direction of the fourth embodiment.
FIG. 13C illustrates the field curvature aberration on the tangential direction of the fourth embodiment.
FIG. 13D illustrates the distortion of the fourth embodiment.

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the periphery region 67 of the image-side surface 62 of the sixth lens element 60 is concave, the optical axis region 83 of the object-side surface 81 of the eighth lens element 80 is convex.

The optical data of the fourth embodiment of the optical imaging lens are shown in FIG. 40 while the aspheric surface data are shown in FIG. 41. In this embodiment, EFL=6.328 mm; HFOV=39.707 degrees; TTL=8.090 mm; Fno=1.600; ImgH=6.000 mm. In particular: 1. The HFOV in this embodiment is larger than the HFOV in the first embodiment; 2. The longitudinal spherical aberration in this embodiment is smaller than the longitudinal spherical aberration in the first embodiment; 3. The Fno in this embodiment is smaller than the Fno in the first embodiment.

Fifth Embodiment

Figure 14:
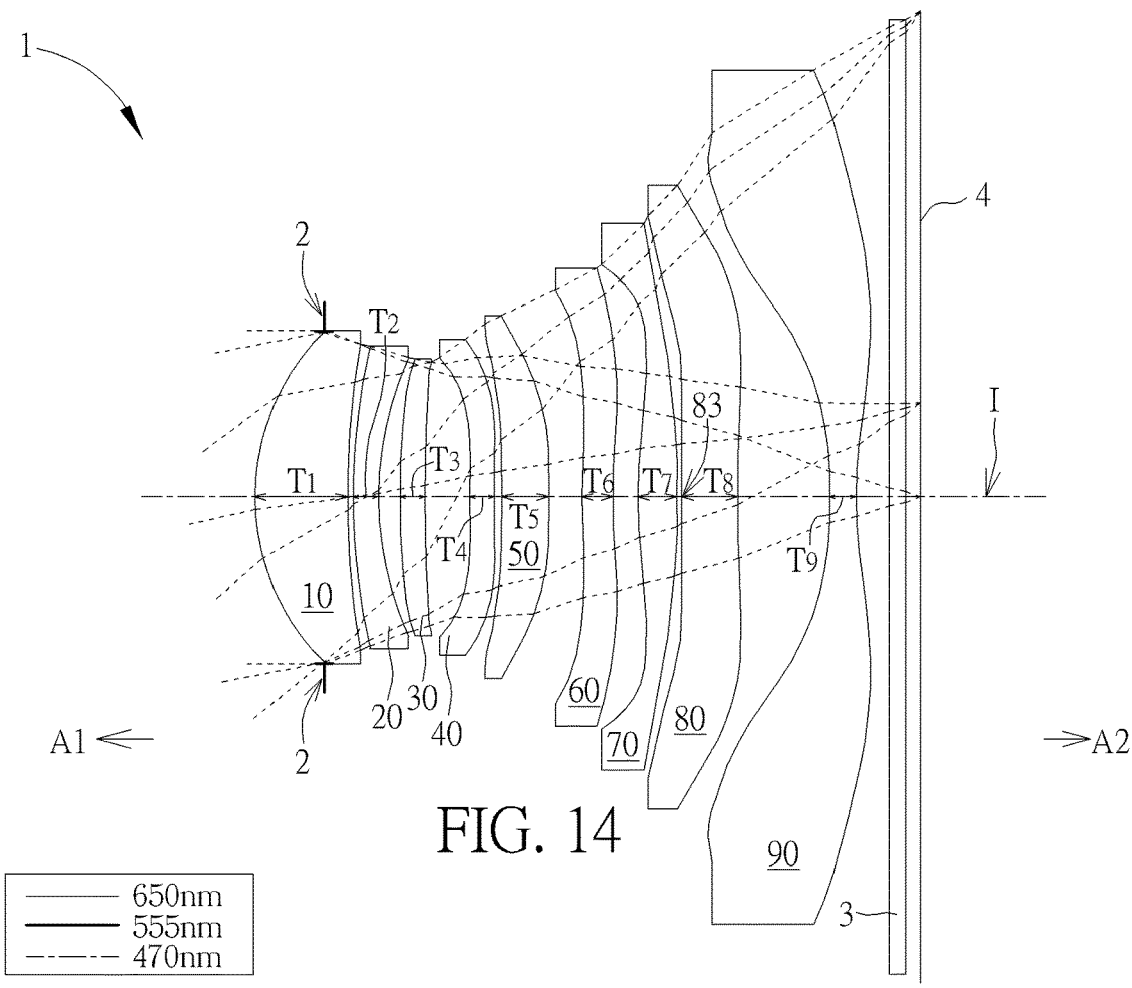
FIG. 14 illustrates a fifth embodiment of the optical imaging lens of the present invention.
Figure 15A:
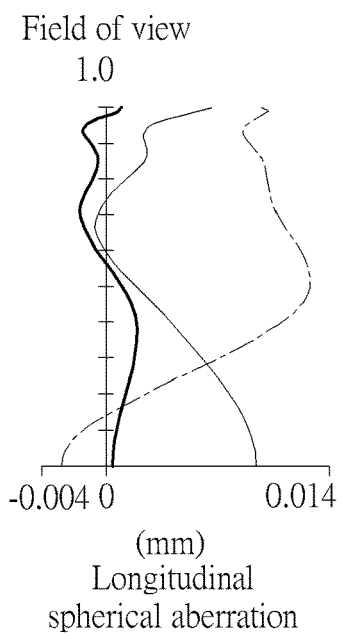
FIG. 15A illustrates the longitudinal spherical aberration on the image plane of the fifth embodiment.
Figure 15B:
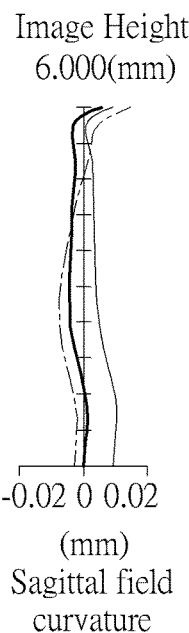
FIG. 15B illustrates the field curvature aberration on the sagittal direction of the fifth embodiment.
Figure 15C:
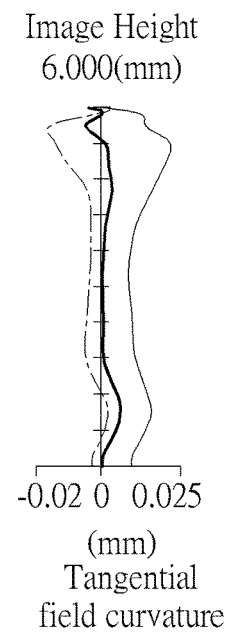
FIG. 15C illustrates the field curvature aberration on the tangential direction of the fifth embodiment.
Figure 15D:
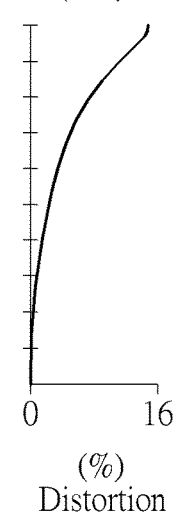
FIG. 15D illustrates the distortion of the fifth embodiment.

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 83 of the object-side surface 81 of the eighth lens element 80 is convex.

The optical data of the fifth embodiment of the optical imaging lens are shown in FIG. 42 while the aspheric surface data are shown in FIG. 43. In this embodiment, EFL=6.562 mm; HFOV=38.506 degrees; TTL=8.259 mm; Fno=1.600; ImgH=6.000 mm. In particular: 1. The longitudinal spherical aberration in this embodiment is smaller than the longitudinal spherical aberration in the first embodiment; 2. The field curvature aberration on the sagittal direction in this embodiment is smaller than the field curvature aberration on the sagittal direction in the first embodiment; 3. The field curvature aberration on the tangential direction in this embodiment is smaller than the field curvature aberration on the tangential direction in the first embodiment; 4. The Fno in this embodiment is smaller than the Fno in the first embodiment.

Sixth Embodiment

Figure 16:
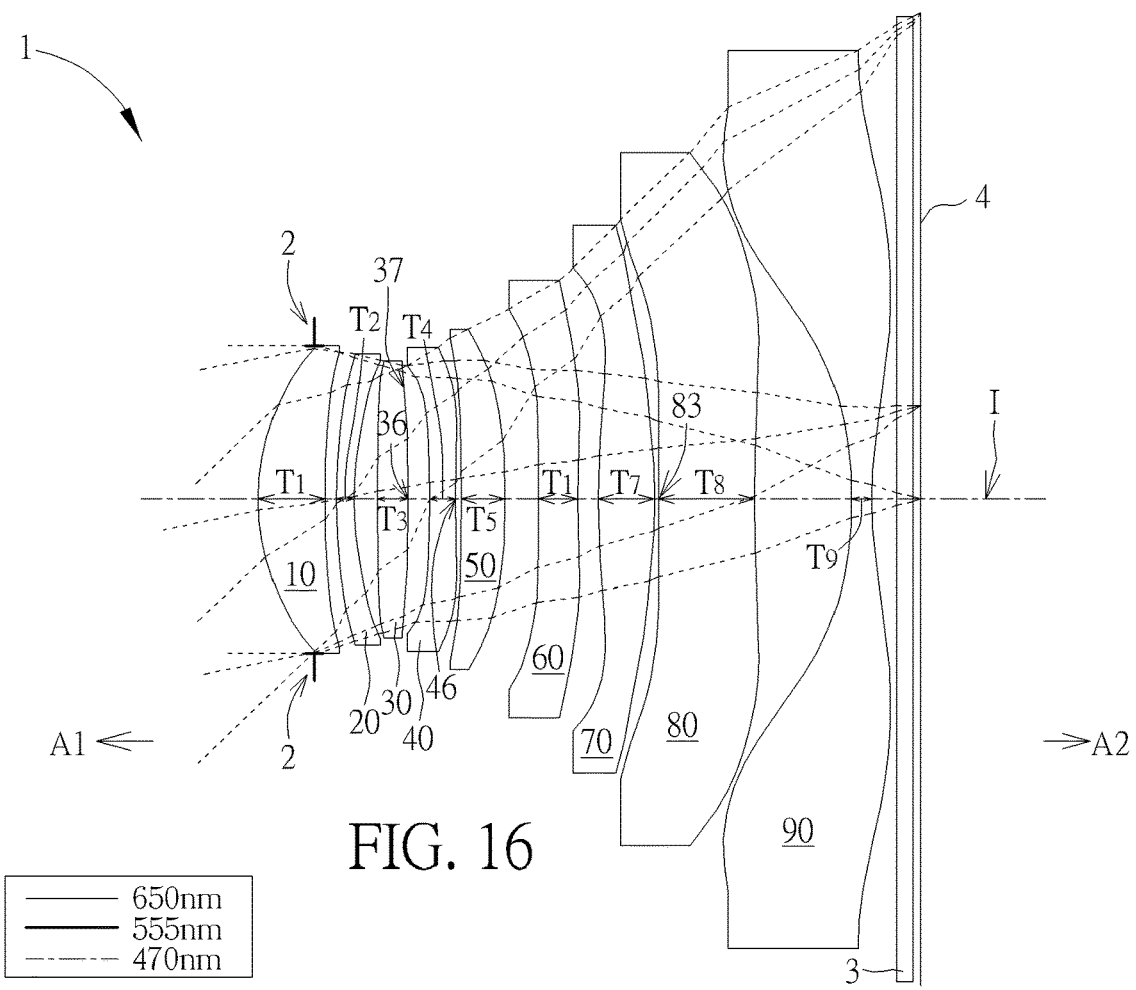
FIG. 16 illustrates a sixth embodiment of the optical imaging lens of the present invention.
Figures 17A, 17B, 17C, 17D:
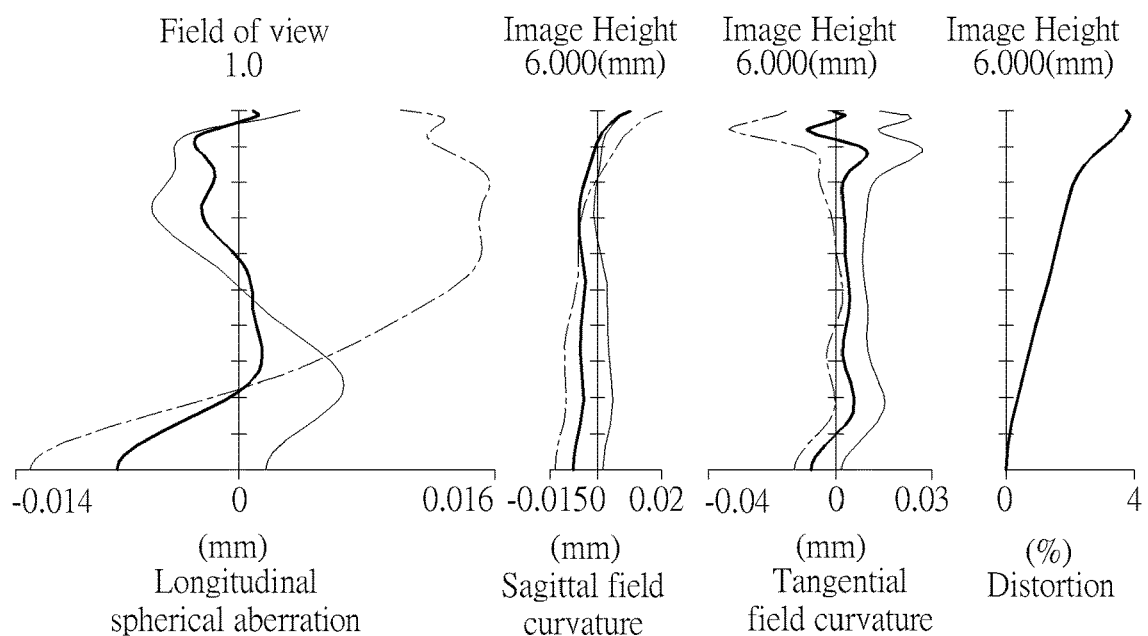
FIG. 17A illustrates the longitudinal spherical aberration on the image plane of the sixth embodiment.
FIG. 17B illustrates the field curvature aberration on the sagittal direction of the sixth embodiment.
FIG. 17C illustrates the field curvature aberration on the tangential direction of the sixth embodiment.
FIG. 17D illustrates the distortion of the sixth embodiment.

Please refer to FIG. 16 which illustrates the sixth embodiment of the optical imaging lens 1 of the present invention. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 36 of the image-side surface 32 of the third lens element 30 is convex, the periphery region 37 of the image-side surface 32 of the third lens element 30 is convex, the optical axis region 46 of the image-side surface 42 of the fourth lens element 40 is concave, the optical axis region 83 of the object-side surface 81 of the eighth lens element 80 is convex.

The optical data of the sixth embodiment of the optical imaging lens are shown in FIG. 44 while the aspheric surface data are shown in FIG. 45. In this embodiment, EFL=6.068 mm; HFOV=43.547 degrees; TTL=8.155 mm; Fno=1.600; ImgH=6.000 mm. In particular: 1. The HFOV in this embodiment is larger than the HFOV in the first embodiment; 2. The longitudinal spherical aberration in this embodiment is smaller than the longitudinal spherical aberration in the first embodiment; 3. The distortion aberration in this embodiment is smaller than the distortion aberration in the first embodiment; 4. The Fno in this embodiment is smaller than the Fno in the first embodiment.

Seventh Embodiment

Figure 18:
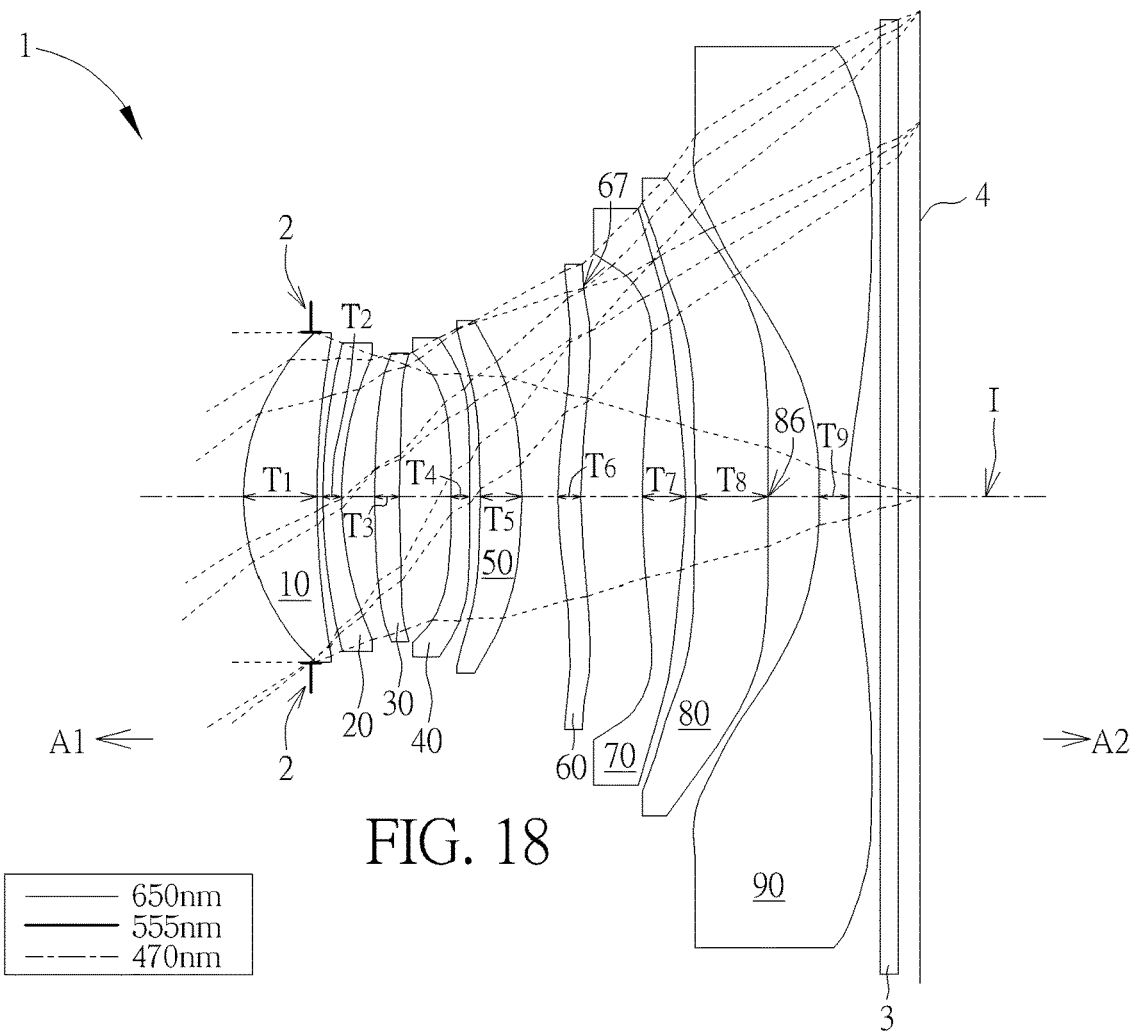
FIG. 18 illustrates a seventh embodiment of the optical imaging lens of the present invention.
Figures 19A, 19B, 19C, 19D:
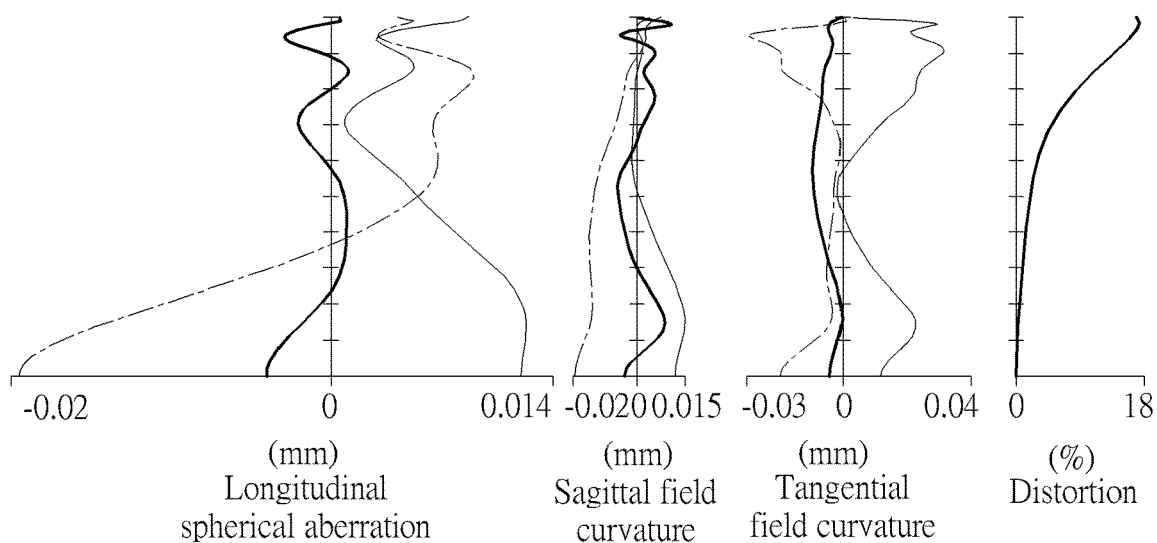
FIG. 19A illustrates the longitudinal spherical aberration on the image plane of the seventh embodiment.
FIG. 19B illustrates the field curvature aberration on the sagittal direction of the seventh embodiment.
FIG. 19C illustrates the field curvature aberration on the tangential direction of the seventh embodiment.
FIG. 19D illustrates the distortion of the seventh embodiment.

Please refer to FIG. 18 which illustrates the seventh embodiment of the optical imaging lens 1 of the present invention. Please refer to FIG. 19A for the longitudinal spherical aberration on the image plane 91 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the sixth lens element 60 has positive refracting power, the periphery region 67 of the image-side surface 62 of the sixth lens element 60 is concave, the optical axis region 86 of the image-side surface 82 of the eighth lens element 80 is convex.

The optical data of the seventh embodiment of the optical imaging lens are shown in FIG. 46 while the aspheric surface data are shown in FIG. 47. In this embodiment, EFL=6.508 mm; HFOV=38.644 degrees; TTL=8.344 mm; Fno=1.600; ImgH=6.000 mm.

Eighth Embodiment

Figure 20:
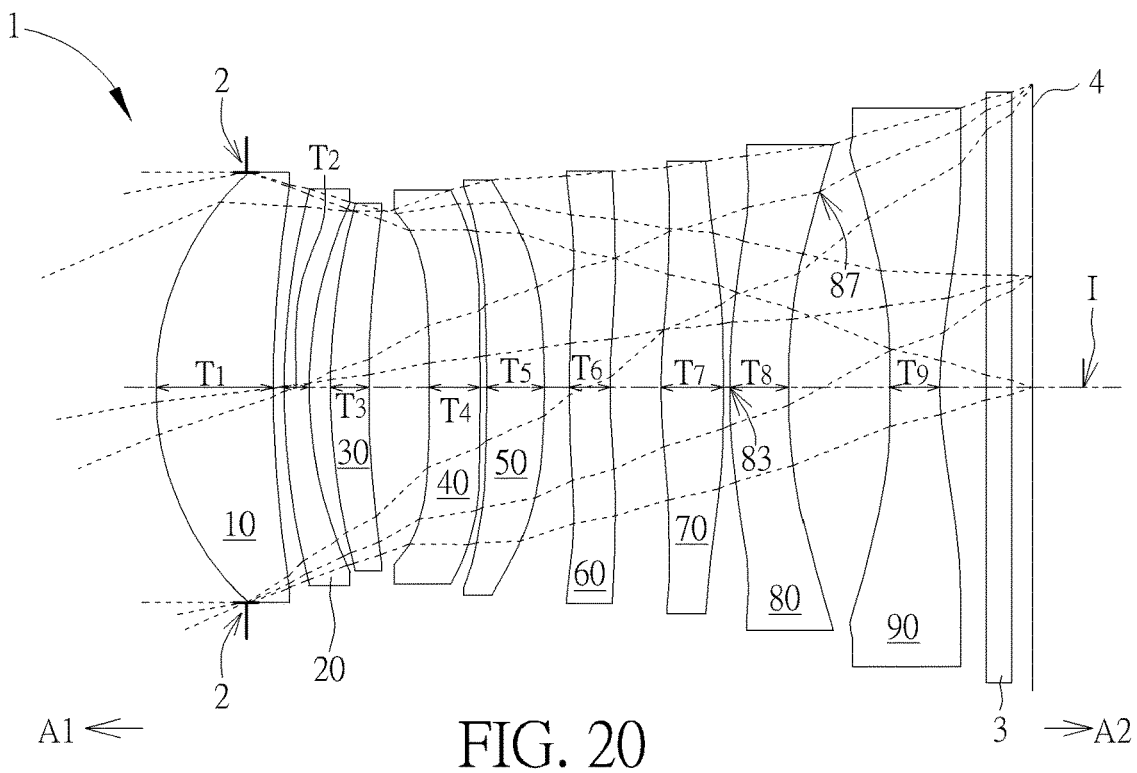
FIG. 20 illustrates an eighth embodiment of the optical imaging lens of the present invention.
Figure 21A:
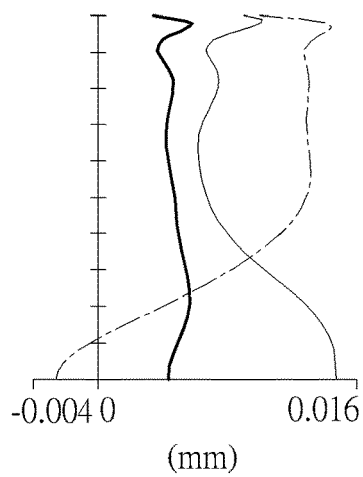
FIG. 21A illustrates the longitudinal spherical aberration on the image plane of the eighth embodiment.
Figure 21B:
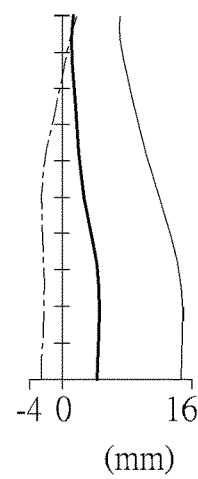
FIG. 21B illustrates the field curvature aberration on the sagittal direction of the eighth embodiment.
Figure 21C:
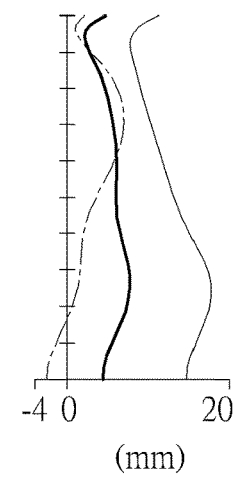
FIG. 21C illustrates the field curvature aberration on the tangential direction of the eighth embodiment.
Figure 21D:
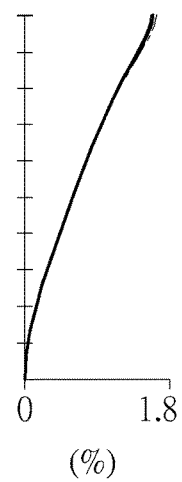
FIG. 21D illustrates the distortion of the eighth embodiment.

Please refer to FIG. 20 which illustrates the eighth embodiment of the optical imaging lens 1 of the present invention. Please refer to FIG. 21A for the longitudinal spherical aberration on the image plane 91 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 83 of the object-side surface 81 of the eighth lens element 80 is convex, the periphery region 87 of the image-side surface 82 of the eighth lens element 80 is concave.

The optical data of the eighth embodiment of the optical imaging lens are shown in FIG. 48 while the aspheric surface data are shown in FIG. 49. In this embodiment, EFL=5.927 mm; HFOV=23.383 degrees; TTL=7.530 mm; Fno=1.600; ImgH=2.600 mm. In particular: 1. The system length of the optical imaging lens TTL in this embodiment is shorter than the system length of the optical imaging lens TTL in the first embodiment; 2. The longitudinal spherical aberration in this embodiment is smaller than the longitudinal spherical aberration in the first embodiment; 3. The field curvature aberration on the sagittal direction in this embodiment is smaller than the field curvature aberration on the sagittal direction in the first embodiment; 4. The field curvature aberration on the tangential direction in this embodiment is smaller than the field curvature aberration on the tangential direction in the first embodiment; 5. The distortion aberration in this embodiment is smaller than the distortion aberration in the first embodiment; 6. The Fno in this embodiment is smaller than the Fno in the first embodiment.

Ninth Embodiment

Figure 22:
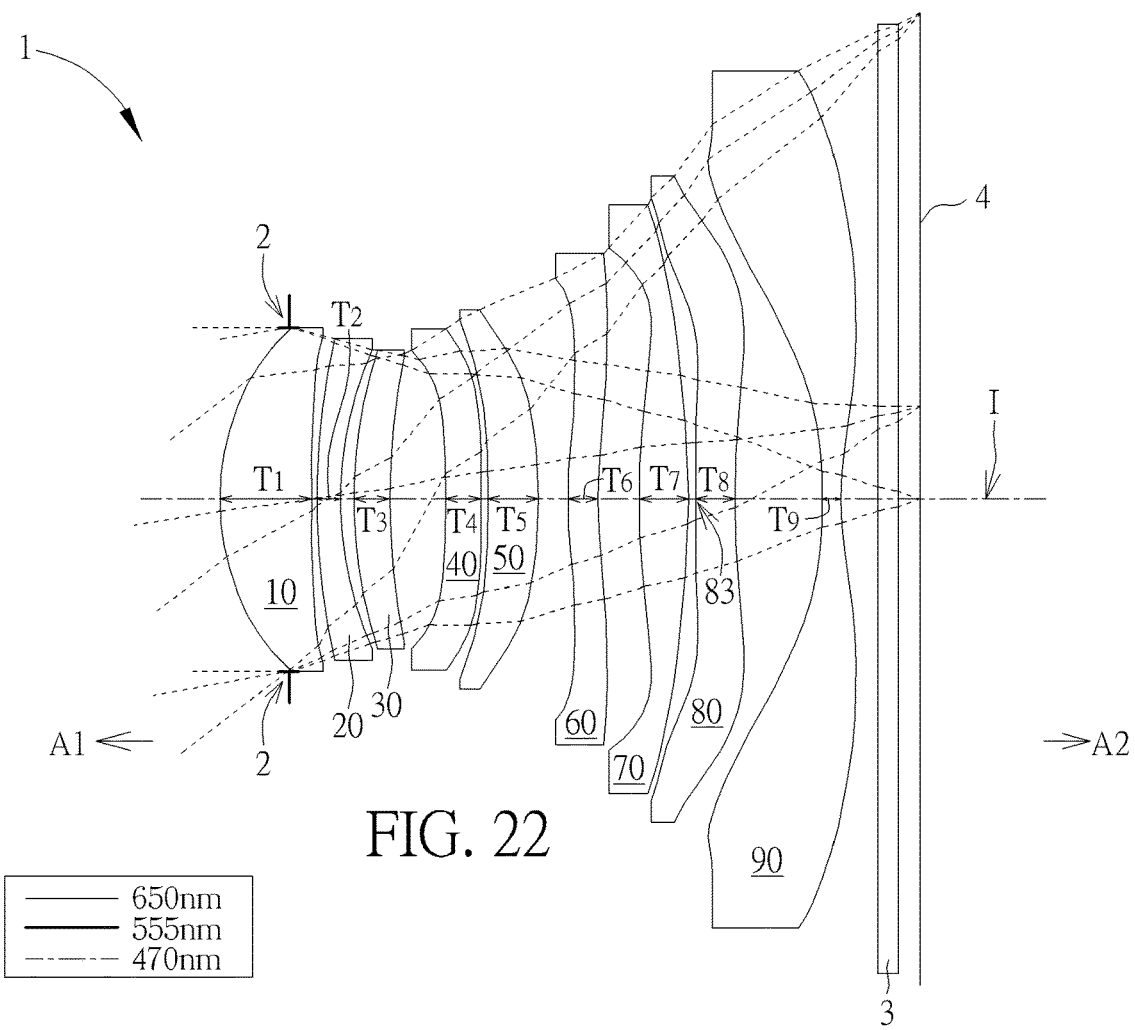
FIG. 22 illustrates a ninth embodiment of the optical imaging lens of the present invention.
Figure 23A:
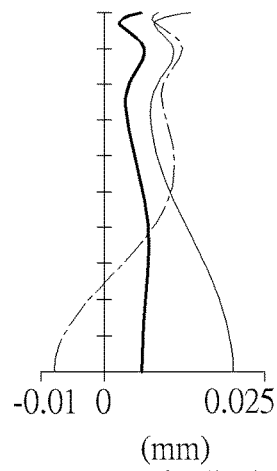
FIG. 23A illustrates the longitudinal spherical aberration on the image plane of the ninth embodiment.
Figure 23B:
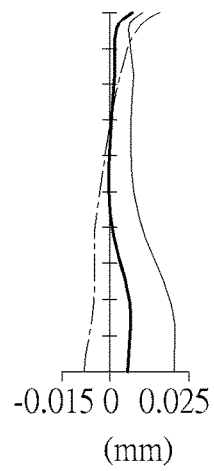
FIG. 23B illustrates the field curvature aberration on the sagittal direction of the ninth embodiment.
Figure 23C:
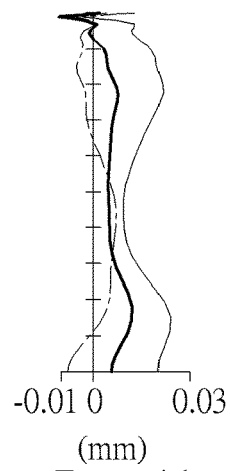
FIG. 23C illustrates the field curvature aberration on the tangential direction of the ninth embodiment.
Figure 23D:
FIG. 23D illustrates the distortion of the ninth embodiment.

Please refer to FIG. 22 which illustrates the ninth embodiment of the optical imaging lens 1 of the present invention. Please refer to FIG. 23A for the longitudinal spherical aberration on the image plane 91 of the ninth embodiment; please refer to FIG. 23B for the field curvature aberration on the sagittal direction; please refer to FIG. 23C for the field curvature aberration on the tangential direction, and please refer to FIG. 23D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the fourth lens element 40 has positive refracting power, the optical axis region 83 of the object-side surface 81 of the eighth lens element 80 is convex.

The optical data of the ninth embodiment of the optical imaging lens are shown in FIG. 50 while the aspheric surface data are shown in FIG. 51. In this embodiment, EFL=5.898 mm; HFOV=37.532 degrees; TTL=7.483 mm; Fno=1.600; ImgH=5.200 mm. In particular: 1. The system length of the optical imaging lens TTL in this embodiment is shorter than the system length of the optical imaging lens TTL in the first embodiment; 2. The Fno in this embodiment is smaller than the Fno in the first embodiment.

Tenth Embodiment

Please refer to FIG. 24 which illustrates the tenth embodiment of the optical imaging lens 1 of the present invention. Please refer to FIG. 25A for the longitudinal spherical aberration on the image plane 91 of the tenth embodiment; please refer to FIG. 25B for the field curvature aberration on the sagittal direction; please refer to FIG. 25C for the field curvature aberration on the tangential direction, and please refer to FIG. 25D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 83 of the object-side surface 81 of the eighth lens element 80 is convex.

The optical data of the tenth embodiment of the optical imaging lens are shown in FIG. 52 while the aspheric surface data are shown in FIG. 53. In this embodiment, EFL=5.809 mm; HFOV=38.236 degrees; TTL=7.660 mm; Fno=1.600; ImgH=5.000 mm. In particular: 1. The system length of the optical imaging lens TTL in this embodiment is shorter than the system length of the optical imaging lens TTL in the first embodiment; 2. The field curvature aberration on the tangential direction in this embodiment is smaller than the field curvature aberration on the tangential direction in the first embodiment; 3. The distortion aberration in this embodiment is smaller than the distortion aberration in the first embodiment; 4. The Fno in this embodiment is smaller than the Fno in the first embodiment.

Eleventh Embodiment

Figure 26:
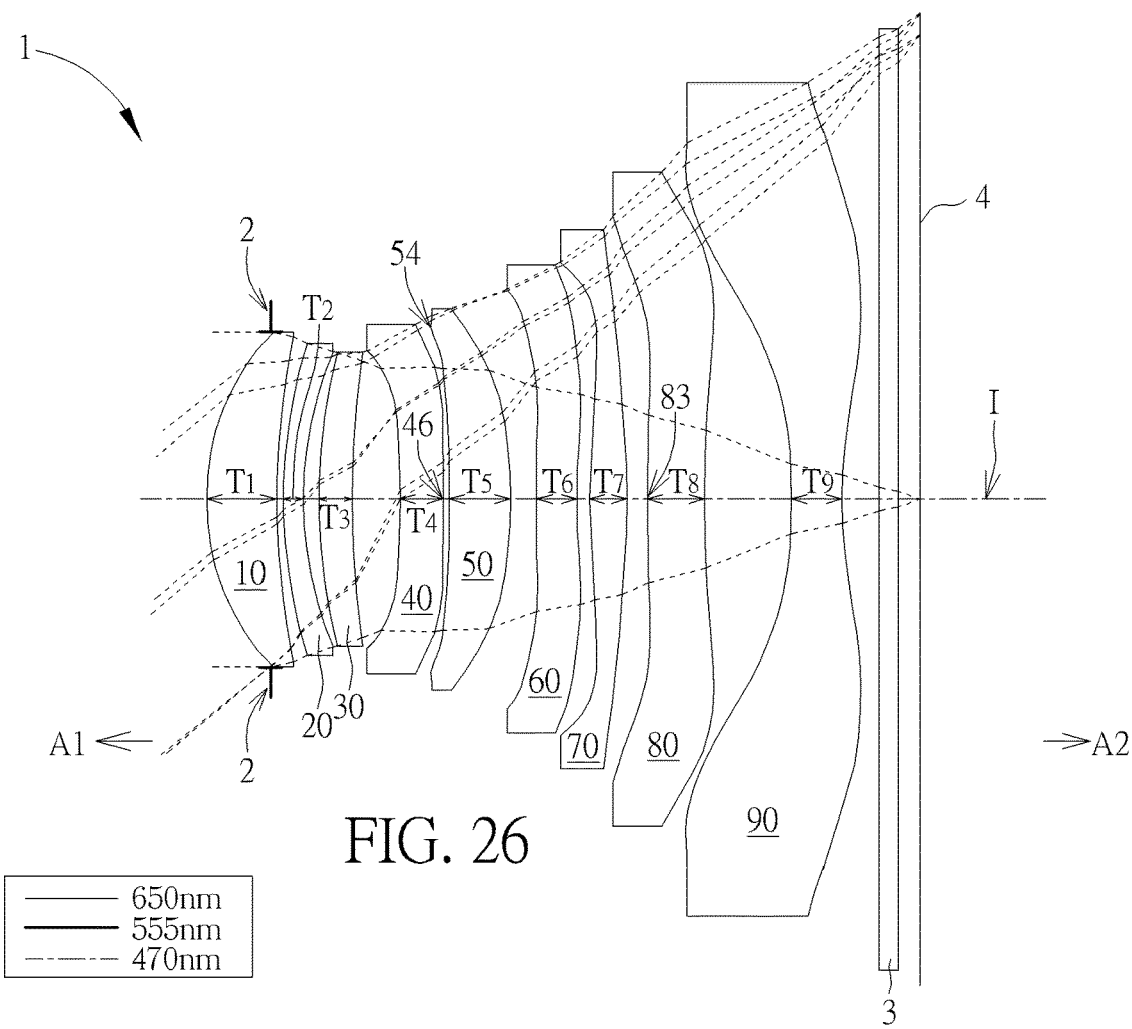
FIG. 26 illustrates an eleventh embodiment of the optical imaging lens of the present invention.
Figures 27A, 27B, 27C, 27D:
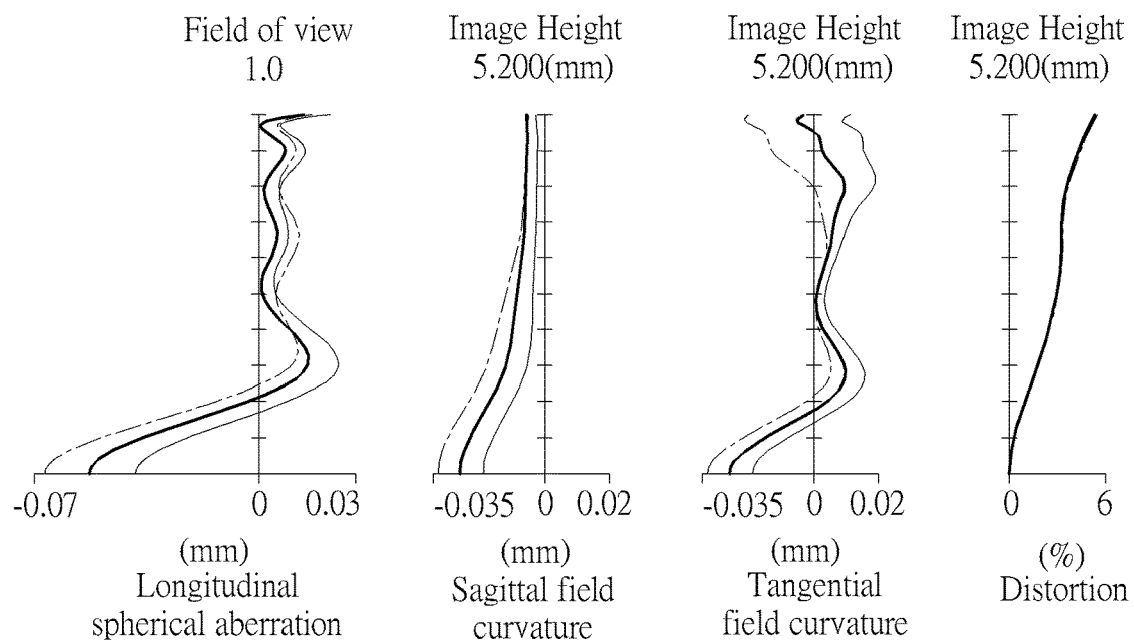
FIG. 27A illustrates the longitudinal spherical aberration on the image plane of the eleventh embodiment.
FIG. 27B illustrates the field curvature aberration on the sagittal direction of the eleventh embodiment.
FIG. 27C illustrates the field curvature aberration on the tangential direction of the eleventh embodiment.
FIG. 27D illustrates the distortion of the eleventh embodiment.

Please refer to FIG. 26 which illustrates the eleventh embodiment of the optical imaging lens 1 of the present invention. Please refer to FIG. 27A for the longitudinal spherical aberration on the image plane 91 of the eleventh embodiment; please refer to FIG. 27B for the field curvature aberration on the sagittal direction; please refer to FIG. 27C for the field curvature aberration on the tangential direction, and please refer to FIG. 27D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 46 of the image-side surface 42 of the fourth lens element 40 is concave, the periphery region 54 of the object-side surface 51 of the fifth lens element 50 is convex, the optical axis region 83 of the object-side surface 81 of the eighth lens element 80 is convex.

The optical data of the eleventh embodiment of the optical imaging lens are shown in FIG. 54 while the aspheric surface data are shown in FIG. 55. In this embodiment, EFL=5.770 mm; HFOV=40.120 degrees; TTL=7.655 mm; Fno=1.600; ImgH=5.200 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The distortion aberration in this embodiment is smaller than the distortion aberration in the first embodiment; 4. The Fno in this embodiment is smaller than the Fno in the first embodiment.

Twelfth Embodiment

Figure 28:
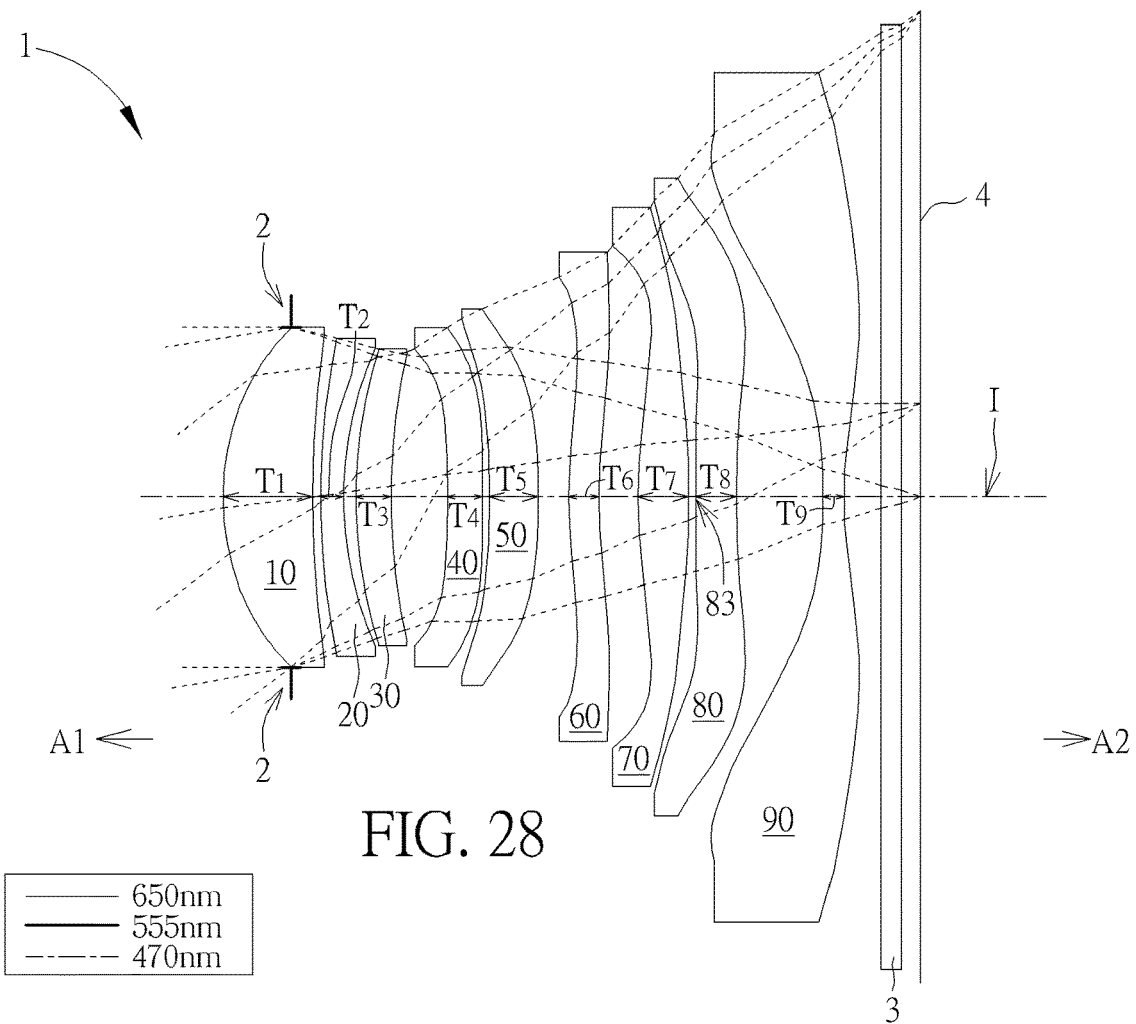
FIG. 28 illustrates a twelfth embodiment of the optical imaging lens of the present invention.
Figures 29A, 29B, 29C, 29D:
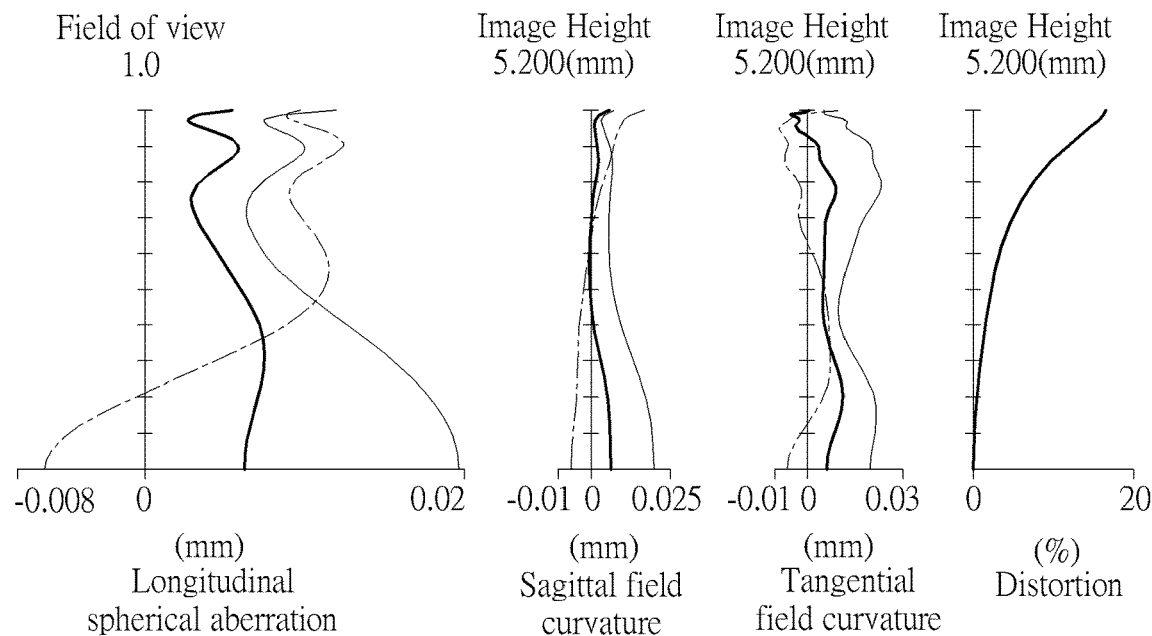
FIG. 29A illustrates the longitudinal spherical aberration on the image plane of the twelfth embodiment.
FIG. 29B illustrates the field curvature aberration on the sagittal direction of the twelfth embodiment.
FIG. 29C illustrates the field curvature aberration on the tangential direction of the twelfth embodiment.
FIG. 29D illustrates the distortion of the twelfth embodiment.

Please refer to FIG. 28 which illustrates the twelfth embodiment of the optical imaging lens 1 of the present invention. Please refer to FIG. 29A for the longitudinal spherical aberration on the image plane 91 of the twelfth embodiment; please refer to FIG. 29B for the field curvature aberration on the sagittal direction; please refer to FIG. 29C for the field curvature aberration on the tangential direction, and please refer to FIG. 29D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the fourth lens element 40 has positive refracting power, the optical axis region 83 of the object-side surface 81 of the eighth lens element 80 is convex.

The optical data of the twelfth embodiment of the optical imaging lens are shown in FIG. 56 while the aspheric surface data are shown in FIG. 57. In this embodiment, EFL=5.854 mm; HFOV=37.324 degrees; TTL=7.476 mm; Fno=1.600; ImgH=5.200 mm. In particular: 1. The system length of the optical imaging lens TTL in this embodiment is shorter than the system length of the optical imaging lens TTL in the first embodiment; 2. The Fno in this embodiment is smaller than the Fno in the first embodiment.

Thirteenth Embodiment

Figure 30:
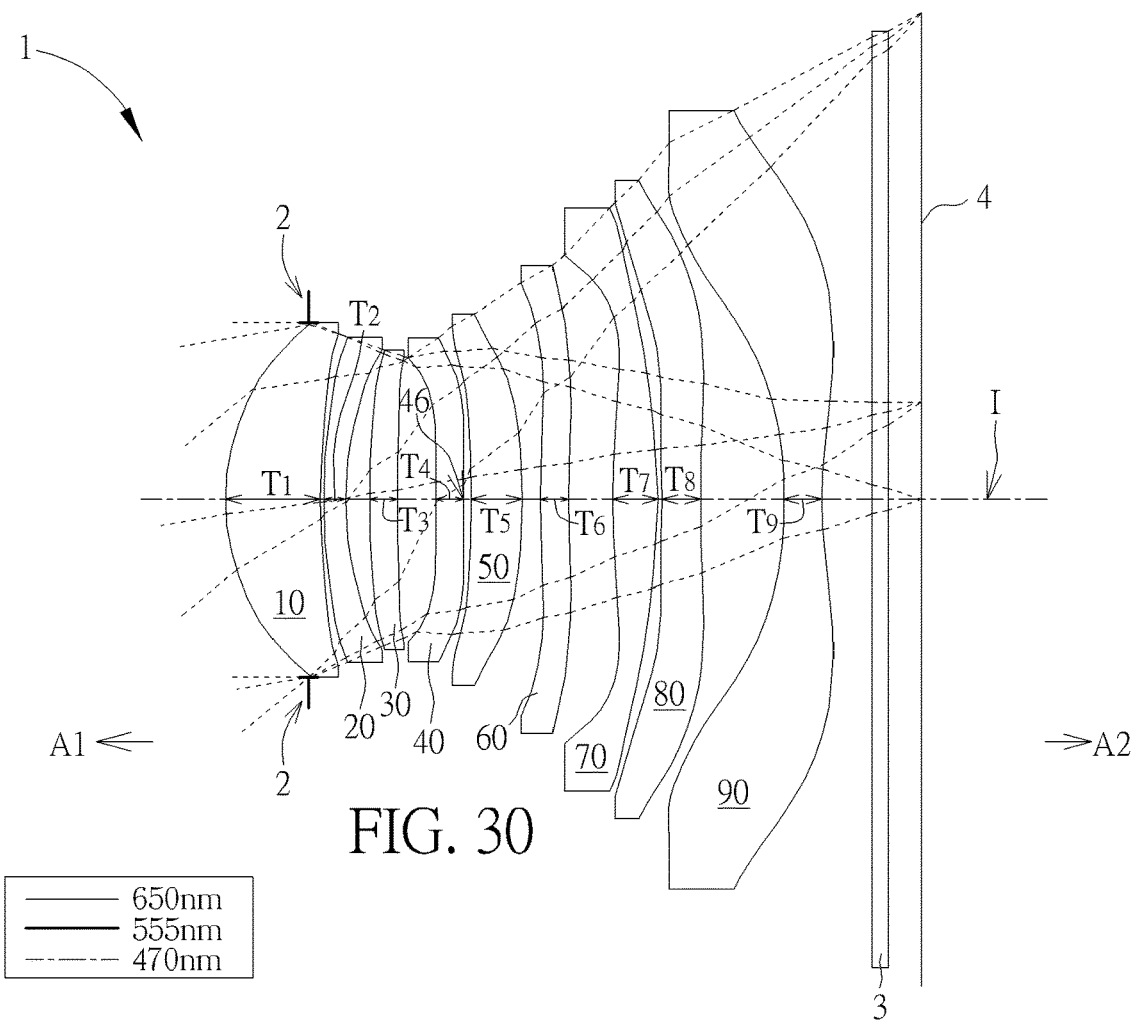
FIG. 30 illustrates a thirteenth embodiment of the optical imaging lens of the present invention.
Figures 31A, 31B, 31C, 31D:
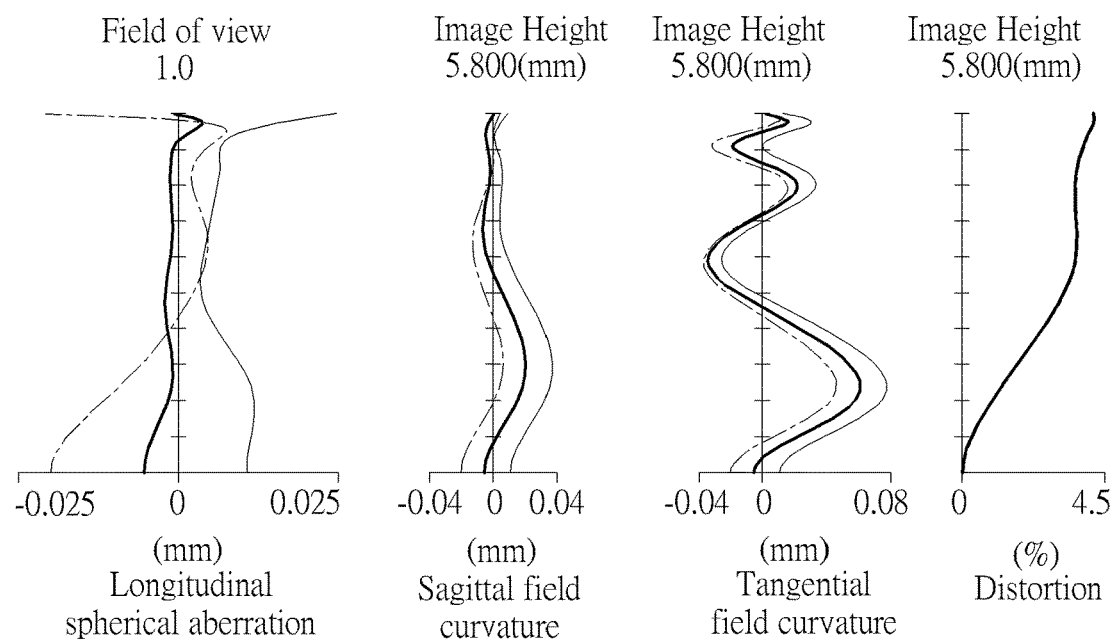
FIG. 31A illustrates the longitudinal spherical aberration on the image plane of the thirteenth embodiment.
FIG. 31B illustrates the field curvature aberration on the sagittal direction of the thirteenth embodiment.
FIG. 31C illustrates the field curvature aberration on the tangential direction of the thirteenth embodiment.
FIG. 31D illustrates the distortion of the twelfth embodiment.

Please refer to FIG. 30 which illustrates the thirteenth embodiment of the optical imaging lens 1 of the present invention. Please refer to FIG. 31A for the longitudinal spherical aberration on the image plane 91 of the thirteenth embodiment; please refer to FIG. 31B for the field curvature aberration on the sagittal direction; please refer to FIG. 31C for the field curvature aberration on the tangential direction, and please refer to FIG. 31D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 46 of the image-side surface 42 of the fourth lens element 40 is concave.

The optical data of the thirteenth embodiment of the optical imaging lens are shown in FIG. 58 while the aspheric surface data are shown in FIG. 59. In this embodiment, EFL=6.771 mm; HFOV=39.406 degrees; TTL=8.293 mm; Fno=1.600; ImgH=5.800 mm. In particular: 1. The HFOV in this embodiment is larger than the HFOV in the first embodiment; 2. The distortion aberration in this embodiment is smaller than the distortion aberration in the first embodiment; 3. The Fno in this embodiment is smaller than the Fno in the first embodiment.

Fourteenth Embodiment

Please refer to FIG. 32 which illustrates the fourteenth embodiment of the optical imaging lens 1 of the present invention. Please refer to FIG. 33A for the longitudinal spherical aberration on the image plane 91 of the fourteenth embodiment; please refer to FIG. 33B for the field curvature aberration on the sagittal direction; please refer to FIG. 33C for the field curvature aberration on the tangential direction, and please refer to FIG. 33D for the distortion aberration. The components in this embodiment are similar to those in the first embodiment, but the optical data such as the radius of curvature, the lens thickness, the aspheric surface or the back focal length in this embodiment are different from the optical data in the first embodiment. Besides, in this embodiment, the optical axis region 46 of the image-side surface 42 of the fourth lens element 40 is concave.

The optical data of the fourteenth embodiment of the optical imaging lens are shown in FIG. 60 while the aspheric surface data are shown in FIG. 61. In this embodiment, EFL=7.929 mm; HFOV=38.281 degrees; TTL=8.801 mm; Fno=1.875; ImgH=6.000 mm. In particular: 1. The distortion aberration in this embodiment is smaller than the distortion aberration in the first embodiment; 2. The Fno in this embodiment is smaller than the Fno in the first embodiment.

Some important ratios in each embodiment are shown in FIG. 62.

1. When the invention satisfies at least one of the following relationships (a) or (b), wherein (a) including: the periphery region 17 of the image-side surface 12 of the first lens element 10 is concave, the second lens element 20 has negative refracting power, the eighth lens element 80 has negative refracting power, and the optical axis region 93 of the object-side surface 91 of the ninth lens element 90 is concave, or (b) including: the third lens element 30 has positive refracting power, the seventh lens element 70 has positive refracting power, the optical axis region 93 of the object-side surface 91 of the ninth lens element 90 is concave, and the optical axis region 96 of the image-side surface 92 of the ninth lens element 90 is concave, it can effectively improve the aberration and distortion of the optical imaging lens, make it have good imaging quality, and control the system length of the optical imaging lens. For example, when the distance from the object-side surface of the first lens element to the image plane along the optical axis is less than or equal to 15.000 mm, it is helpful to make the lens element thinner and lighter. The better range of the distance from the object-side surface of the first lens element to the image plane along the optical axis is larger than or equal to 6.500 mm, and less than or equal to 15.000 mm. If further restrictions can satisfy that the distance from the object-side surface of the first lens element to the image plane along the optical axis is less than or equal to 10.000 mm, the better range of the distance from the object-side surface of the first lens element to the image plane along the optical axis is between 6.500 mm and 10.000 mm. When the optical imaging lens is a prime lens, it can have a shorter system length to achieve the goal of lightweight, which is more conducive to designing a smaller f number to increase the luminous flux. In addition, it can meet the configuration of relationship (a) or relationship (b) under the prime lens system, which can have better imaging quality.

When the following relationships are satisfied: the optical axis region 43 of the object-side surface 41 of the fourth lens element 40 is concave, the seventh lens element 70 has positive refracting power, the periphery region 74 of the object-side surface 71 of the seventh lens element 70 is concave, the periphery region 94 of the object-side surface 91 of the ninth lens element 90 is convex, the optical axis region 96 of the image-side surface 92 of the ninth lens element 90 is concave, it can effectively improve the aberration and distortion of the optical imaging lens, so as to have good imaging quality. When the periphery region 94 of the object-side surface 91 of the ninth lens element 90 is convex, it is beneficial for the light with a large field of view to converge and smoothly focus on the image plane.

3. When the material of the lens element satisfies the following configuration relationships, it is beneficial to the transmission and deflection of imaging rays, and effectively improves the chromatic aberration, so that the optical imaging lens has good imaging quality:

$V3+V5+V8 \geq 140.000$, the preferable range is $140.000 \leq V3+V5+V8 \leq 185.000$;

$V2+V3+V4 \leq 120.000$, the preferable range is $85.000 \leq V2+V3+V4 \leq 120.000$;

$V3+V6+V9 \geq 120.000$, the preferable range is $120.000 \leq V3+V6+V9 \leq 165.000$;

$|V6-V7| \geq 15.000$, the preferable range is $15.000 \leq |V6-V7| \leq 39.000$;

$|V2-V6| \leq 20.000$, the preferable range is $0.000 \leq |V2-V6| \leq 20.000$;

$V3+V4+V7 \geq 110.000$, the preferable range is $110.000 \leq V3+V4+V7 \leq 165.000$; and $V1+V2+V4 \leq 120.000$, the preferable range is $85.000 \leq V1+V2+V4 \leq 120.000$.

4. When the image height (ImgH) or the f-number (Fno) satisfies the following relationships, the image height of the optical imaging lens can be increased, and the f-number can be reduced to improve the imaging pixel and resolution:

$EFL/Fno \geq 3.300$ mm, the preferable range is $3.300$ mm $\leq EFL/Fno \leq 8.100$ mm;

$ImgH/Fno \geq 1.500$ mm, the preferable range is $1.500$ mm $\leq ImgH/Fno \leq 4.100$ mm; and $TTL/Fno \geq 3.900$ mm, the preferable range is $3.900$ mm $\leq TTL/Fno \leq 10.300$ mm.

5. In order to shorten the system length of optical imaging lens, the air gap between lens elements or lens thickness can be adjusted appropriately, but the difficulty of manufacturing and the imaging quality must be considered at the same time. Therefore, if the numerical limits of the following conditions are satisfied, the better configuration can be obtained:

$AAG/(T8+G89+T9) \leq 1.700$, the preferable range is $0.900 \leq AAG/(T8+G89+T9) \leq 1.700$;

$ALT/(G12+T3) \geq 9.000$, the preferable range is $9.000 \leq ALT/(G12+T3) \geq 14.400$;

$TL/BFL \geq 6.000$, the preferable range is $6.000 \leq TL/BFL \leq 13.900$;

$(T2+T3+T4+T6)/T1 \leq 2.600$, the preferable range is $0.900 \leq (T2+T3+T4+T6)/T1 \leq 2.600$;

$EFL/(G67+T7+G78) \leq 7.700$, the preferable range is $4.100 \leq EFL/(G67+T7+G78) \leq 7.700$;

$AAG/(T1+G89) \leq 2.100$, the preferable range is $1.100 \leq AAG/(T1+G89) \leq 2.100$;

$ALT/(G23+G34+G67) \leq 6.000$, the preferable range is $2.100 \leq ALT/(G23+G34+G67) \leq 6.000$;

$TL/(T1+G34) \leq 7.000$, the preferable range is $3.600 \leq TL/(T1+G34) \leq 7.000$;

$T5/(G12+G56) \geq 1.000$, the preferable range is $1.000 \leq T5/(G12+G56) \leq 2.900$;

$EFL/(AAG+BFL) \geq 1.200$, the preferable range is $1.200 \leq EFL/(AAG+BFL) \leq 2.100$;

$ALT/(T7+G78) \geq 6.600$, the preferable range is $6.600 \leq ALT/(T7+G78) \leq 9.800$;

$ALT/(G56+T9) \geq 5.000$, the preferable range is $5.000 \leq ALT/(G56+T9) \leq 14.100$;

$TTL/(T1+G67+T7) \leq 6.000$, the preferable range is $3.200 \leq TTL/(T1+G67+T7) \leq 6.000$;

$(T3+G45+T8)/T5 \leq 3.000$, the preferable range is $1.300 \leq (T3+G45+T8)/T5 \leq 3.000$;

$BFL/(T2+G45+G78) \geq 1.700$, the preferable range is $1.700 \leq BFL/(T2+G45+G78) \leq 3.200$;

$(G34+T4+T6)/T7 \leq 3.600$, the preferable range is $1.400 \leq (G34+T4+T6)/T7 \leq 3.600$;

$(T1+G12+T2)/T7 \leq 3.100$, the preferable range is $1.500 \leq (T1+G12+T2)/T7 \leq 3.100$; and $TL/(G23+T5+G67) \leq 7.000$, the preferable range is $4.000 \leq TL/(G23+T5+G67) \leq 7.000$.

By observing three representative wavelengths of 470 nm, 555 nm and 650 nm in each embodiment of the present invention, it is suggested off-axis light of different heights of every wavelength all concentrates on the image plane, and deviations of every curve also reveal that off-axis light of different heights are well controlled so the embodiments do improve the spherical aberration, the astigmatic aberration and the distortion aberration. In addition, by observing the imaging quality data the distances amongst the three representing different wavelengths of 470 nm, 555 nm and 650 nm are pretty close to one another, which means the embodiments of the present invention are able to concentrate light of the three representing different wavelengths so that the aberration is greatly improved. Given the above, it is understood that the embodiments of the present invention provides outstanding imaging quality.

In addition, any arbitrary combination of the parameters of the embodiments can be selected to increase the lens limitation so as to facilitate the design of the same structure of the present invention.

In the light of the unpredictability of the optical imaging lens, the present invention suggests the above principles to have a shorter system length of the optical imaging lens, a larger aperture, a larger field of view, better imaging quality or a better fabrication yield to overcome the drawbacks of prior art.

In addition to the above ratios, one or more conditional formulae may be optionally combined to be used in the embodiments of the present invention and the present invention is not limit to this. The concave or convex configuration of each lens element or multiple lens elements may be fine-tuned to enhance the performance and/or the resolution. The above limitations may be selectively combined in the embodiments without causing inconsistency.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or AB or A*B or (A*B) 1/2, and E satisfies a conditional expression E≤$\gamma_1$ or E≥$\gamma_2$ or $\gamma_2$≤E≤$\gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, a fifth lens element, a sixth lens element, a seventh lens element, an eight lens element and a ninth lens element, the first lens element to the ninth lens element each having an object-side surface facing toward the object side and allowing imaging rays to pass through as well as an image-side surface facing toward the image side and allowing the imaging rays to pass through, wherein:
   a periphery region of the image-side surface of the first lens element is concave;
   the second lens element has negative refracting power;
   the eighth lens element has negative refracting power;
   an optical axis region of the object-side surface of the ninth lens element is concave;
   wherein lens elements included by the optical imaging lens are only the nine lens elements described above, and wherein the optical imaging lens satisfies the distance from the object-side surface of the first lens element to an image plane along the optical axis is less than or equal to 15.000 mm, and a thickness of the third lens element along the optical axis is smaller than a thickness of the seventh lens element along the optical axis.

2. The optical imaging lens of claim 1, wherein V3 is an Abbe number of the third lens element, V5 is an Abbe number of the fifth lens element, V8 is an Abbe number of the eighth lens element, and the optical imaging lens satisfies the relationship: V3+V5+V8≥140.000.

3. The optical imaging lens of claim 1, wherein AAG is a sum of eight air gaps from the first lens element to the ninth lens element along the optical axis, T8 is a thickness of the eighth lens element along the optical axis, T9 is a thickness of the ninth lens element along the optical axis, G89 is an air gap between the eighth lens element and the ninth lens element along the optical axis, and the optical imaging lens satisfies the relationship: AAG/(T8+G89+T9)≤1.700.

4. The optical imaging lens of claim 1, wherein ALT is a sum of thicknesses of the nine lens elements from the first lens element to the ninth lens element along the optical axis, T3 is the thickness of the third lens element along the optical axis, G12 is an air gap between the first lens element and the second lens element along the optical axis, and the optical imaging lens satisfies the relationship: ALT/(G12+T3) ≥9.000.

5. The optical imaging lens of claim 1, wherein TL is a distance from the object-side surface of the first lens element to the image-side surface of the ninth lens element along the optical axis, BFL is a distance from the image-side surface of the ninth lens element to the image plane along the optical axis, and the optical imaging lens satisfies the relationship: TL/BFL≥6.000.

6. The optical imaging lens of claim 1, wherein T1 is a thickness of the first lens element along the optical axis, T2 is a thickness of the second lens element along the optical axis, T3 is the thickness of the third lens element along the optical axis, T4 is a thickness of the fourth lens element along the optical axis, T6 is a thickness of the sixth lens element along the optical axis, and the optical imaging lens satisfies the relationship: (T2+T3+T4+T6)/T1≤2.600.

7. The optical imaging lens of claim 1, wherein EFL is an effective focal length of the optical imaging lens, T7 is the thickness of the seventh lens element along the optical axis, G67 is an air gap between the sixth lens element and the seventh lens element along the optical axis, G78 is an air gap between the seventh lens element and the eighth lens element along the optical axis, and the optical imaging lens satisfies the relationship: EFL/(G67+T7+G78)≤7.700.

8. An optical imaging lens, from an object side to an image side in order along an optical axis comprising: a first lens element, a second lens element, a third lens element, a fourth lens element, a fifth lens element, a sixth lens element, a seventh lens element, an eight lens element and a ninth lens element, the first lens element to the ninth lens element each having an object-side surface facing toward the object side and allowing imaging rays to pass through as well as an image-side surface facing toward the image side and allowing the imaging rays to pass through, wherein:
   the third lens element has positive refracting power;
   the seventh lens element has positive refracting power;
   an optical axis region of the object-side surface of the ninth lens element is concave, and an optical axis region of the image-side surface of the ninth lens element is concave;

wherein lens elements included by the optical imaging lens are only the nine lens elements described above, and wherein the optical imaging lens satisfies the distance from the object-side surface of the first lens element to an image plane along the optical axis is less than or equal to 15.000 mm, and wherein V1 is an Abbe number of the first lens element, V2 is an Abbe number of the second lens element, V4 is an Abbe number of the fourth lens element, and the optical imaging lens satisfies the relationship: V1+V2+V4≤120.000.

9. The optical imaging lens of claim 8, wherein V3 is an Abbe number of the third lens element, and the optical imaging lens satisfies the relationship: V2+V3+V4≤120.000.

10. The optical imaging lens of claim 8, wherein AAG is a sum of eight air gaps from the first lens element to the ninth lens element along the optical axis, T1 is a thickness of the first lens element along the optical axis, G89 is an air gap between the eighth lens element and the ninth lens element along the optical axis, and the optical imaging lens satisfies the relationship: AAG/(T1+G89)≤2.100.

11. The optical imaging lens of claim 8, wherein ALT is a sum of thicknesses of the nine lens elements from the first lens element to the ninth lens element along the optical axis, G23 is an air gap between the second lens element and the third lens element along the optical axis, G34 is an air gap between the third lens element and the fourth lens element along the optical axis, G67 is an air gap between the sixth lens element and the seventh lens element along the optical axis, and the optical imaging lens satisfies the relationship: ALT/(G23+G34+G67)≤6.000.

12. The optical imaging lens of claim 8, wherein TL is a distance from the object-side surface of the first lens element to the image-side surface of the ninth lens element along the optical axis, T1 is a thickness of the first lens element along the optical axis, G34 is an air gap between the third lens element and the fourth lens element along the optical axis, and the optical imaging lens satisfies the relationship: TL/(T1+G34)≤7.000.

13. The optical imaging lens of claim 8, wherein T5 is a thickness of the fifth lens element along the optical axis, G12 is an air gap between the first lens element and the second lens element along the optical axis, G56 is an air gap between the fifth lens element and the sixth lens element along the optical axis, and the optical imaging lens satisfies the relationship: T5/(G12+G56)≥1.000.

14. The optical imaging lens of claim 8, wherein AAG is a sum of eight air gaps from the first lens element to the ninth lens element along the optical axis, BFL is a distance from the image-side surface of the ninth lens element to the image plane along the optical axis, EFL is an effective focal length of the optical imaging lens, and the optical imaging lens satisfies the relationship: EFL/(AAG+BFL)≥1.200.

15. An optical imaging lens, from an object side to an image side in order along an optical axis comprising: a first lens element, a second lens element, a third lens element, a fourth lens element, a fifth lens element, a sixth lens element, a seventh lens element, an eight lens element and a ninth lens element, the first lens element to the ninth lens element each having an object-side surface facing toward the object side and allowing imaging rays to pass through as well as an image-side surface facing toward the image side and allowing the imaging rays to pass through, wherein:

an optical axis region of the object-side surface of the third lens element is convex;

an optical axis region of the object-side surface of the fourth lens element is concave;

the seventh lens element has positive refracting power, and a periphery region of the object-side surface of the seventh lens element is concave;

a periphery region of the object-side surface of the ninth lens element is convex, and an optical axis region of the image-side surface of the ninth lens element is concave;

wherein lens elements included by the optical imaging lens are only the nine lens elements described above, and wherein EFL is an effective focal length of the optical imaging lens, T7 is a thickness of the seventh lens element along the optical axis, G67 is an air gap between the sixth lens element and the seventh lens element along the optical axis, G78 is an air gap between the seventh lens element and the eighth lens element along the optical axis, and the optical imaging lens satisfies the relationship: EFL/(G67+T7+G78)≤7.700.

16. The optical imaging lens of claim 15, wherein V3 is an Abbe number of the third lens element, V6 is an Abbe number of the sixth lens element, V9 is an Abbe number of the ninth lens element, and the optical imaging lens satisfies the relationship: V3+V6+V9≥120.000.

17. The optical imaging lens of claim 15, wherein ALT is a sum of thicknesses of the nine lens elements from the first lens element to the ninth lens element along the optical axis, and the optical imaging lens satisfies the relationship: ALT/(T7+G78)≥6.600.

18. The optical imaging lens of claim 15, wherein ALT is a sum of thicknesses of the nine lens elements from the first lens element to the ninth lens element along the optical axis, T9 is a thickness of the ninth lens element along the optical axis, G56 is an air gap between the fifth lens element and the sixth lens element along the optical axis, and the optical imaging lens satisfies the relationship: ALT/(G56+T9)≥5.000.

19. The optical imaging lens of claim 15, wherein TTL is a distance from the object-side surface of the first lens element to an image plane along the optical axis, T1 is a thickness of the first lens element along the optical axis, and the optical imaging lens satisfies the relationship: TTL/(T1+G67+T7)≤6.000.

20. The optical imaging lens of claim 15, wherein T3 is a thickness of the third lens element along the optical axis, T5 is a thickness of the fifth lens element along the optical axis, T8 is a thickness of the eighth lens element along the optical axis, G45 is an air gap between the fourth lens element and the fifth lens element along the optical axis, and the optical imaging lens satisfies the relationship: (T3+G45+T8)/T5≤3.000.

* * * * *